(12) United States Patent
Oka

(10) Patent No.: US 11,578,761 B2
(45) Date of Patent: *Feb. 14, 2023

(54) BICYCLE SPROCKET ARRANGEMENT

(71) Applicant: SHIMANO INC., Sakai (JP)

(72) Inventor: Tomonari Oka, Sakai (JP)

(73) Assignee: SHIMANO INC., Sakai (JP)

( * ) Notice: Subject to any disclaimer, the term of this patent is extended or adjusted under 35 U.S.C. 154(b) by 649 days.

This patent is subject to a terminal disclaimer.

(21) Appl. No.: 16/673,980

(22) Filed: Nov. 5, 2019

(65) Prior Publication Data

US 2020/0300307 A1  Sep. 24, 2020

Related U.S. Application Data

(63) Continuation-in-part of application No. 16/361,249, filed on Mar. 22, 2019, now abandoned.

(51) Int. Cl.
  *F16D 3/06* (2006.01)
  *B60B 27/04* (2006.01)
  *B62M 9/10* (2006.01)

(52) U.S. Cl.
  CPC ............... *F16D 3/06* (2013.01); *B60B 27/04* (2013.01); *B62M 9/10* (2013.01)

(58) Field of Classification Search
  CPC ........... F16D 3/06; F16H 55/30; B50B 27/04; B62M 9/10
  See application file for complete search history.

(56) References Cited

U.S. PATENT DOCUMENTS

| 4,869,710 | A  | * | 9/1989 | Iwasaki ............... F16D 41/30 |
| | | | | 474/160 |
| 11,179,967 | B2 | * | 11/2021 | Fujita ................ B60B 27/023 |
| 2016/0223033 | A1 | | 8/2016 | Fujita et al. |
| 2018/0346064 | A1 | * | 12/2018 | Fujita .................. B62M 9/10 |
| 2018/0346067 | A1 | * | 12/2018 | Fujita .................. B62M 9/10 |
| 2019/0127022 | A1 | * | 5/2019 | Komatsu ............... B62M 9/12 |
| 2020/0239106 | A1 | * | 7/2020 | Fukunaga ............. B62M 9/12 |
| 2020/0298619 | A1 | * | 9/2020 | Oka ................... B60B 27/023 |
| 2020/0300307 | A1 | * | 9/2020 | Oka ....................... F16D 3/06 |

FOREIGN PATENT DOCUMENTS

| CN | 105835619 | 8/2016 |
| CN | 108973524 | 12/2018 |

* cited by examiner

*Primary Examiner* — Vinh Luong

(74) *Attorney, Agent, or Firm* — Mori & Ward, LLP

(57) ABSTRACT

A bicycle sprocket arrangement comprises an internal spline configured to be engaged with an external spline of a sprocket support body of a bicycle hub assembly. The internal spline includes a plurality of internal-spline driving surfaces configured to transmit a rotational driving force between the bicycle sprocket arrangement and the bicycle hub assembly in a circumferential direction. The plurality of internal-spline driving surfaces includes at least four first internal-spline driving surfaces and at least one second internal-spline driving surface. The at least four first internal-spline driving surfaces are respectively arranged on at least four of nine first internal-spline driving positions equally arranged in the circumferential direction about a rotational center axis at a first internal-spline pitch angle which is equal to 40 degrees. The at least one second internal-spline driving surface is offset from the nine first internal-spline driving positions in the circumferential direction about the rotational center axis.

27 Claims, 36 Drawing Sheets

FIG. 19

BICYCLE SPROCKET ARRANGEMENT

CROSS-REFERENCE TO RELATED APPLICATIONS

The present application is a continuation-in-part application of the U.S. patent application Ser. No. 16/361,249 filed Mar. 22, 2019. The contents of this application are incorporated herein by reference in their entirety.

BACKGROUND OF THE INVENTION

Field of the Invention

The present invention relates to a bicycle sprocket arrangement.

Discussion of the Background

Bicycling is becoming an increasingly more popular form of recreation as well as a means of transportation. Moreover, bicycling has become a very popular competitive sport for both amateurs and professionals. Whether the bicycle is used for recreation, transportation or competition, the bicycle industry is constantly improving the various components of the bicycle. One bicycle component that has been extensively redesigned is a sprocket assembly.

SUMMARY OF THE INVENTION

In accordance with a first aspect of the present invention, a bicycle sprocket arrangement comprises an internal spline. The internal spline is configured to be engaged with an external spline of a sprocket support body of a bicycle hub assembly. The internal spline includes a plurality of internal-spline driving surfaces configured to transmit a rotational driving force between the bicycle sprocket arrangement and the bicycle hub assembly in a circumferential direction with respect to a rotational center axis of the bicycle sprocket arrangement. The plurality of internal-spline driving surfaces includes at least four first internal-spline driving surfaces and at least one second internal-spline driving surface. The at least four first internal-spline driving surfaces are respectively arranged on at least four of nine first internal-spline driving positions equally arranged in the circumferential direction about the rotational center axis at a first internal-spline pitch angle which is equal to 40 degrees. The at least one second internal-spline driving surface is offset from the nine first internal-spline driving positions in the circumferential direction about the rotational center axis.

With the bicycle sprocket arrangement according to the first aspect, the at least four first internal-spline driving surfaces and the at least one second internal-spline driving surface enable the internal spline of the bicycle sprocket arrangement which is compatible with at least two types of external splines of bicycle hub assemblies.

In accordance with a second aspect of the present invention, the bicycle sprocket arrangement according to the first aspect is configured so that the at least four first internal-spline driving surfaces include nine first internal-spline driving surfaces. The nine first internal-spline driving surfaces are equally arranged in the circumferential direction about the rotational center axis at the first internal-spline pitch angle.

With the bicycle sprocket arrangement according to the second aspect, the nine first internal-spline driving surfaces and the at least one second internal-spline driving surface effectively enable the internal spline of the bicycle sprocket arrangement which is compatible with at least two types of external splines of bicycle hub assemblies.

In accordance with a third aspect of the present invention, the bicycle sprocket arrangement according to the first or second aspect is configured so that the at least one second internal-spline driving surface includes at least three second internal-spline driving surfaces offset from the nine first internal-spline driving positions in the circumferential direction about the rotational center axis.

With the bicycle sprocket arrangement according to the third aspect, the at least four first internal-spline driving surfaces and the at least three second internal-spline driving surfaces effectively enable the internal spline of the bicycle sprocket arrangement which is compatible with at least two types of external splines of bicycle hub assemblies.

In accordance with a fourth aspect of the present invention, the bicycle sprocket arrangement according to the third aspect is configured so that the at least three second internal-spline driving surfaces are equally arranged in the circumferential direction about the rotational center axis at a second internal-spline pitch angle.

With the bicycle sprocket arrangement according to the fourth aspect, the at least four first internal-spline driving surfaces and the at least three second internal-spline driving surfaces reliably enable the internal spline of the bicycle sprocket arrangement which is compatible with at least two types of external splines of bicycle hub assemblies.

In accordance with a fifth aspect of the present invention, the bicycle sprocket arrangement according to the third or fourth aspect is configured so that the at least three second internal-spline driving surfaces include nine second internal-spline driving surfaces equally arranged in the circumferential direction about the rotational center axis at the second internal-spline pitch angle.

With the bicycle sprocket arrangement according to the fifth aspect, the at least four first internal-spline driving surfaces and the nine second internal-spline driving surfaces more reliably enable the internal spline of the bicycle sprocket arrangement which is compatible with at least two types of external splines of bicycle hub assemblies.

In accordance with a sixth aspect of the present invention, the bicycle sprocket arrangement according to the fourth or fifth aspect is configured so that the second internal-spline pitch angle is equal to 40 degrees.

With the bicycle sprocket arrangement according to the sixth aspect, the second internal-spline pitch angle more reliably enables the internal spline of the bicycle sprocket arrangement which is compatible with at least two types of external splines of bicycle hub assemblies.

In accordance with a seventh aspect of the present invention, the bicycle sprocket arrangement according to any one of the fourth to sixth aspects is configured so that the at least three second internal-spline driving surfaces are offset from the nine first internal-spline driving surfaces in the circumferential direction about the rotational center axis at a first internal-spline offset angle smaller than the second internal-spline pitch angle.

With the bicycle sprocket arrangement according to the seventh aspect, the at least four first internal-spline driving surfaces and the at least three second internal-spline driving surfaces more reliably enable the internal spline of the bicycle sprocket arrangement which is compatible with at least two types of external splines of bicycle hub assemblies.

In accordance with an eighth aspect of the present invention, the bicycle sprocket arrangement according to the seventh aspect is configured so that the first internal-spline offset angle is equal to or smaller than a half of the second internal-spline pitch angle.

With the bicycle sprocket arrangement according to the eighth aspect, it is possible to ensure a space where another internal-spline driving surface is provided.

In accordance with a ninth aspect of the present invention, the bicycle sprocket arrangement according to any one of the first to eighth aspects is configured so that the internal spline includes a plurality of internal-spline teeth.

With the bicycle sprocket arrangement according to the ninth aspect, the plurality of internal-spline teeth can improve strength of the internal spline.

In accordance with a tenth aspect of the present invention, the bicycle sprocket arrangement according to the ninth aspect is configured so that the plurality of internal-spline teeth includes at least four first internal-spline teeth and at least one second internal-spline tooth. The at least four first internal-spline teeth are respectively arranged on at least four of nine first internal-spline tooth positions equally arranged in the circumferential direction about the rotational center axis at the first internal-spline pitch angle. The at least one second internal-spline tooth is offset from the nine first internal-spline tooth positions in the circumferential direction about the rotational center axis. The at least four first internal-spline teeth respectively include the at least four first internal-spline driving surfaces. The at least one second internal-spline tooth respectively includes the at least one second internal-spline driving surface.

With the bicycle sprocket arrangement according to the tenth aspect, the at least four first internal-spline teeth can improve strength of the at least four first internal-spline driving surfaces, and the at least one second internal-spline tooth can improve the at least one second internal-spline driving surface.

In accordance with an eleventh aspect of the present invention, the bicycle sprocket arrangement according to the tenth aspect is configured so that the at least four first internal-spline teeth include nine first internal-spline teeth. The at least four first internal-spline driving surfaces include nine first internal-spline driving surfaces. The nine first internal-spline driving surfaces are equally arranged in the circumferential direction about the rotational center axis at the first internal-spline pitch angle. The nine first internal-spline teeth respectively include the nine first internal-spline driving surfaces.

With the bicycle sprocket arrangement according to the eleventh aspect, it is possible to provide the internal spline of the bicycle sprocket arrangement which is compatible with at least two types of external splines of bicycle hub assemblies with improving strength of the nine first internal-spline driving surfaces.

In accordance with a twelfth aspect of the present invention, the bicycle sprocket arrangement according to the tenth or eleventh aspect is configured so that the at least one second internal-spline driving surface includes at least three second internal-spline driving surfaces offset from the nine first internal-spline driving surfaces in the circumferential direction about the rotational center axis. The at least one second internal-spline tooth includes at least three second internal-spline teeth respectively including the at least three second internal-spline driving surfaces.

With the bicycle sprocket arrangement according to the twelfth aspect, it is possible to provide the internal spline of the bicycle sprocket arrangement which is compatible with at least two types of external splines of bicycle hub assemblies with improving strength of the at least three second internal-spline driving surfaces.

In accordance with a thirteenth aspect of the present invention, the bicycle sprocket arrangement according to the twelfth aspect is configured so that at least one spline tooth of the at least three second internal-spline teeth has a first internal-spline circumferential width defined in the circumferential direction. Another spline tooth of the at least three second internal-spline teeth has a second internal-spline circumferential width defined in the circumferential direction, the second internal-spline circumferential width being different from the first internal-spline circumferential width.

With the bicycle sprocket arrangement according to the thirteenth aspect, it is possible to reliably mount the bicycle sprocket arrangement to a bicycle hub assembly at a correct circumferential position.

In accordance with a fourteenth aspect of the present invention, the bicycle sprocket arrangement according to any one of the eleventh to thirteenth aspects is configured so that the nine first internal-spline teeth have the same cross-sectional shape as each other on a plane perpendicular to the rotational center axis.

With the bicycle sprocket arrangement according to the fourteenth aspect, it is possible to improve productivity of the bicycle sprocket arrangement.

In accordance with a fifteenth aspect of the present invention, the bicycle sprocket arrangement according to any one of the ninth to fourteenth aspect further comprises an annular body having the rotational center axis. The plurality of internal-spline teeth extends radially inwardly from the annular body with respect to the rotational center axis.

With the bicycle sprocket arrangement according to the fifteenth aspect, it is possible to improve strength of the internal spline.

In accordance with a sixteenth aspect of the present invention, the bicycle sprocket arrangement according to any one of the first to fifteenth aspects is configured so that the plurality of internal-spline driving surfaces faces in a driving rotational direction in which the bicycle sprocket rotates in response to the rotational driving force.

With the bicycle sprocket arrangement according to the sixteenth aspect, it is possible to effectively transmit the rotational driving force.

In accordance with a seventeenth aspect of the present invention, the bicycle sprocket arrangement according to any one of the ninth to sixteenth aspects is configured so that the plurality of internal-spline teeth defines a plurality of internal-spline recesses. Each of the plurality of internal-spline recesses is provided between adjacent two teeth of the plurality of internal-spline teeth in the circumferential direction. The plurality of internal-spline recesses includes a first internal-spline recess and a second internal-spline recess. The first internal-spline recess has a first internal-spline recess width defined in the circumferential direction. The second internal-spline recess has a second internal-spline recess width defined in the circumferential direction. The second internal-spline recess width is different from the first internal-spline recess width.

With the bicycle sprocket arrangement according to the seventeenth aspect, it is possible to reliably mount the bicycle sprocket arrangement to a bicycle hub assembly at a correct circumferential position.

In accordance with an eighteenth aspect of the present invention, the bicycle sprocket arrangement according to the seventeenth aspect is configured so that the at least one second internal-spline tooth is arranged between adjacent two first internal-spline teeth adjacently arranged in the circumferential direction at the first internal-spline pitch angle which is equal to 40 degrees. The at least one second internal-spline tooth and one of the adjacent two first internal-spline teeth defines the first internal-spline recess. The first internal-spline recess width defines a first clearance angle in the circumferential direction about the rotational center axis. The first clearance angle is larger than 15 degrees.

With the bicycle sprocket arrangement according to the eighteenth aspect, it is possible to provide the internal spline of the bicycle sprocket arrangement which is compatible with at least two types of external splines of bicycle hub assemblies.

In accordance with a nineteenth aspect of the present invention, the bicycle sprocket arrangement according to any one of the tenth to eighteenth aspects is configured so that the at least four first internal-spline teeth include a first innermost radius defined with respect to the rotational center axis. The first innermost radius is larger than 32 mm.

With the bicycle sprocket arrangement according to the nineteenth aspect, it is possible to reduce or prevent interference between the at least four first internal-spline teeth and another bicycle hub assembly.

In accordance with a twentieth aspect of the present invention, the bicycle sprocket arrangement according to any one of the tenth to nineteenth aspects is configured so that the at least one second internal-spline tooth includes a second innermost radius defined with respect to the rotational center axis. The second innermost radius is larger than 32 mm.

With the bicycle sprocket arrangement according to the twentieth aspect, it is possible to reduce or prevent interference between the at least one second internal-spline teeth and another bicycle hub assembly.

In accordance with a twenty-first aspect of the present invention, a bicycle sprocket arrangement comprises an internal spline. The internal spline is configured to be engaged with an external spline of a sprocket support body of a bicycle hub assembly in a first state where the bicycle sprocket arrangement is mounted to the bicycle hub assembly. The internal spline is configured to be engaged with an additional external spline of an additional sprocket support body of an additional bicycle hub assembly in a second state where the bicycle sprocket arrangement is mounted to the additional bicycle hub assembly. The external spline of the bicycle hub assembly and the additional external spline of the additional bicycle hub assembly are different from each other.

With the bicycle sprocket arrangement according to the twenty-first aspect, the internal spline enables the bicycle sprocket arrangement which is compatible with at least two types of external splines of bicycle hub assemblies such as the bicycle hub assembly and the additional bicycle hub assembly.

In accordance with a twenty-second aspect of the present invention, the bicycle sprocket arrangement according to the twenty-first aspect is configured so that the internal spline includes a plurality of internal-spline teeth. The plurality of internal-spline teeth includes at least one first internal-spline tooth and at least one second internal-spline tooth. The at least one first internal-spline tooth is configured to be engaged with at least one first external-spline tooth of the external spline in the first state where the bicycle sprocket arrangement is mounted to the bicycle hub assembly. The at least one first internal-spline tooth is configured to be engaged with at least one external-spline tooth of the additional external spline in the second state where the bicycle sprocket arrangement is mounted to the additional bicycle hub assembly. The at least one second internal-spline tooth is configured not to be engaged with the at least one external-spline tooth of the additional external spline in the second state where the bicycle sprocket arrangement is mounted to the additional bicycle hub assembly.

With the bicycle sprocket arrangement according to the twenty-second aspect, it is possible to reliably provide the bicycle sprocket arrangement which is compatible with at least two types of external splines of bicycle hub assemblies such as the bicycle hub assembly and the additional bicycle hub assembly.

In accordance with a twenty-third aspect of the present invention, a bicycle sprocket arrangement comprises an internal spline. The internal spline is configured to be engaged with an external spline of a sprocket support body of a bicycle hub assembly. The internal spline includes a first internal spline and a second internal spline different from the first internal spline. The first internal spline includes a first innermost radius and a first outermost radius which are defined with respect to a rotational center axis of the bicycle sprocket arrangement. The second internal spline includes a second innermost radius and a second outermost radius which are defined with respect to the rotational center axis. The first outermost radius is larger than the second innermost radius. The second outermost radius is larger than the first innermost radius.

With the bicycle sprocket arrangement according to the twenty-third aspect, it is possible to differ a structure of the first internal spline from a structure of the second internal spline. This can improve flexibility of designing the bicycle sprocket arrangement.

In accordance with a twenty-fourth aspect of the present invention, the bicycle sprocket arrangement according to the twenty-third aspect is configured so that the internal spline includes at least one first internal-spline tooth, at least one second internal-spline tooth and at least one third internal-spline tooth. The at least one first internal-spline tooth is configured to be engaged with at least one first external-spline tooth of the external spline. The at least one second internal-spline tooth is configured to be engaged with at least one second external-spline tooth of the external spline. The at least one third internal-spline tooth is configured to be engaged with at least one third external-spline tooth of the external spline.

With the bicycle sprocket arrangement according to the twenty-fourth aspect, it is possible to effectively improve flexibility of designing the bicycle sprocket arrangement.

In accordance with a twenty-fifth aspect of the present invention, the bicycle sprocket arrangement according to the twenty-third or twenty-fourth aspect is configured so that the first internal spline includes the at least one first internal-spline tooth. The second internal spline includes the at least one third internal-spline tooth. The first internal spline is free of the at least one third internal-spline tooth.

With the bicycle sprocket arrangement according to the twenty-fifth aspect, it is possible to effectively improve flexibility of designing the bicycle sprocket arrangement.

In accordance with a twenty-sixth aspect of the present invention, the bicycle sprocket arrangement according to any one of the twenty-third to twenty-fifth aspects is configured so that the first internal spline and the second internal spline are arranged in an axial direction with respect to a rotational center axis of the bicycle sprocket arrangement.

With the bicycle sprocket arrangement according to the twenty-sixth aspect, it is possible to arrange the first internal spline and the second internal spline in accordance with arrangement of a plurality of sprockets.

In accordance with a twenty-seventh aspect of the present invention, the bicycle sprocket arrangement according to any one of the twenty-third to twenty-sixth aspects is configured so that the first internal spline has a first total number of internal-spline teeth. The second internal spline has a second total number of internal-spline teeth. The second total number is larger than the first total number.

With the bicycle sprocket arrangement according to the twenty-seventh aspect, it is possible to save weight of the bicycle sprocket arrangement.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

FIG. 19 is an exploded perspective view showing compatibility of the bicycle sprocket arrangement with each of the bicycle hub assembly illustrated in FIG. 3 and an additional bicycle hub assembly.

DESCRIPTION OF THE EMBODIMENTS

Figure 1:
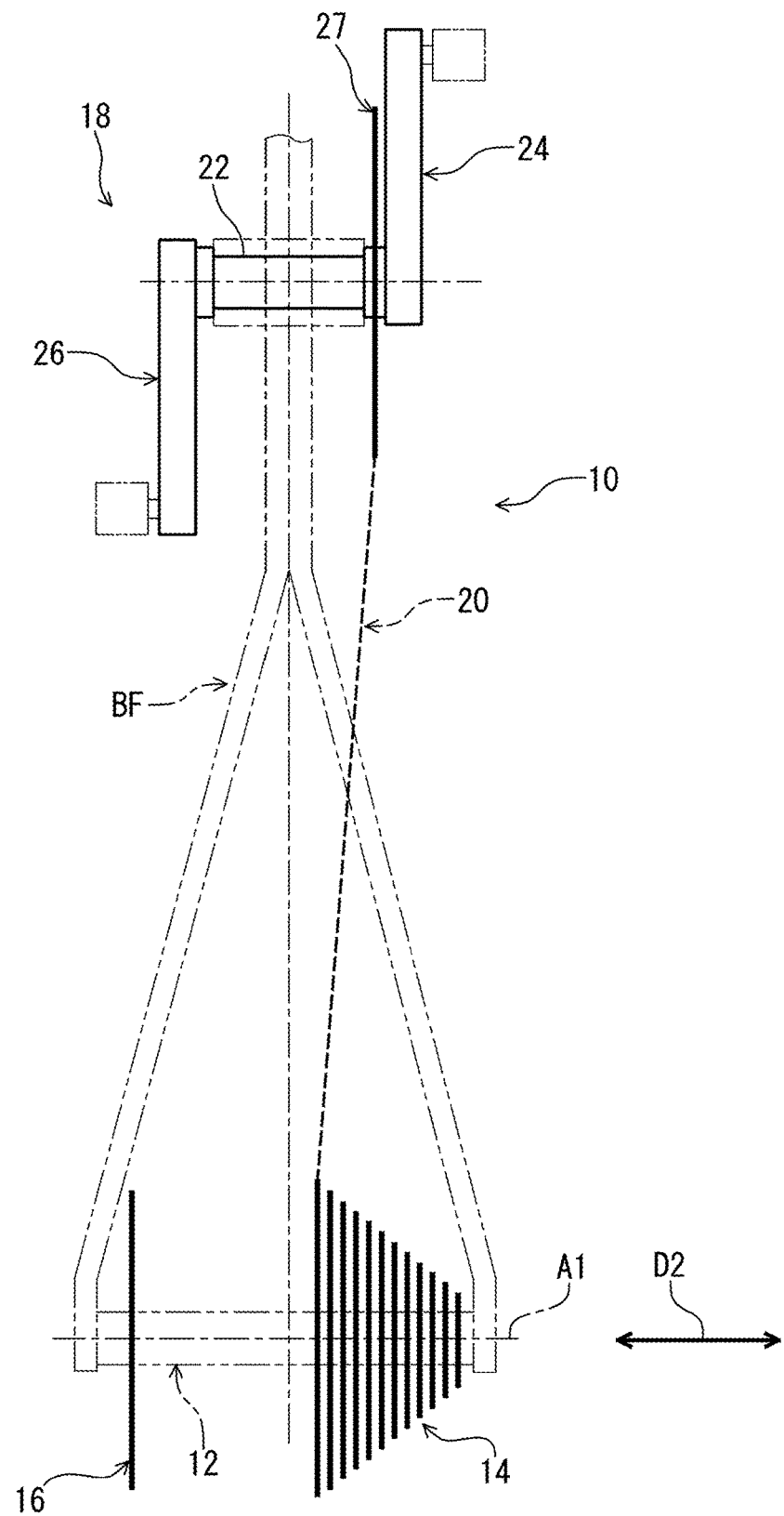
FIG. 1 is a schematic diagram of a bicycle drive train in accordance with a first embodiment.

The embodiment(s) will now be described with reference to the accompanying drawings, wherein like reference numerals designate corresponding or identical elements throughout the various drawings.

First Embodiment

Referring initially to FIG. 1, a bicycle drive train 10 in accordance with a first embodiment comprises a bicycle hub assembly 12 and a bicycle sprocket arrangement 14. The bicycle hub assembly 12 is secured to a bicycle frame BF. The bicycle sprocket arrangement 14 is mounted on the bicycle hub assembly 12. A bicycle brake rotor 16 is mounted on the bicycle hub assembly 12.

The bicycle drive train 10 further comprises a crank assembly 18 and a bicycle chain 20. The crank assembly 18 includes a crank axle 22, a right crank arm 24, a left crank arm 26, and a front sprocket 27. The right crank arm 24 and the left crank arm 26 are secured to the crank axle 22. The front sprocket 27 is secured to at least one of the crank axle 22 and the right crank arm 24. The bicycle chain 20 is engaged with the front sprocket 27 and the bicycle sprocket arrangement 14 to transmit a pedaling force from the front sprocket 27 to the bicycle sprocket arrangement 14. The crank assembly 18 includes the front sprocket 27 as a single sprocket in the illustrated embodiment. However, the crank assembly 18 can include a plurality of front sprockets. The bicycle sprocket arrangement 14 is a rear sprocket assembly. However, structures of the bicycle sprocket arrangement 14 can be applied to the front sprocket.

In the present application, the following directional terms "front," "rear," "forward," "rearward," "left," "right," "transverse," "upward" and "downward" as well as any other similar directional terms refer to those directions which are determined on the basis of a user (e.g., a rider) who sits on a saddle (not shown) of a bicycle with facing a handlebar (not shown). Accordingly, these terms, as utilized to describe the bicycle drive train 10, the bicycle hub assembly 12, or the bicycle sprocket arrangement 14, should be interpreted relative to the bicycle equipped with the bicycle drive train 10, the bicycle hub assembly 12, or the bicycle sprocket arrangement 14 as used in an upright riding position on a horizontal surface.

Figure 2:
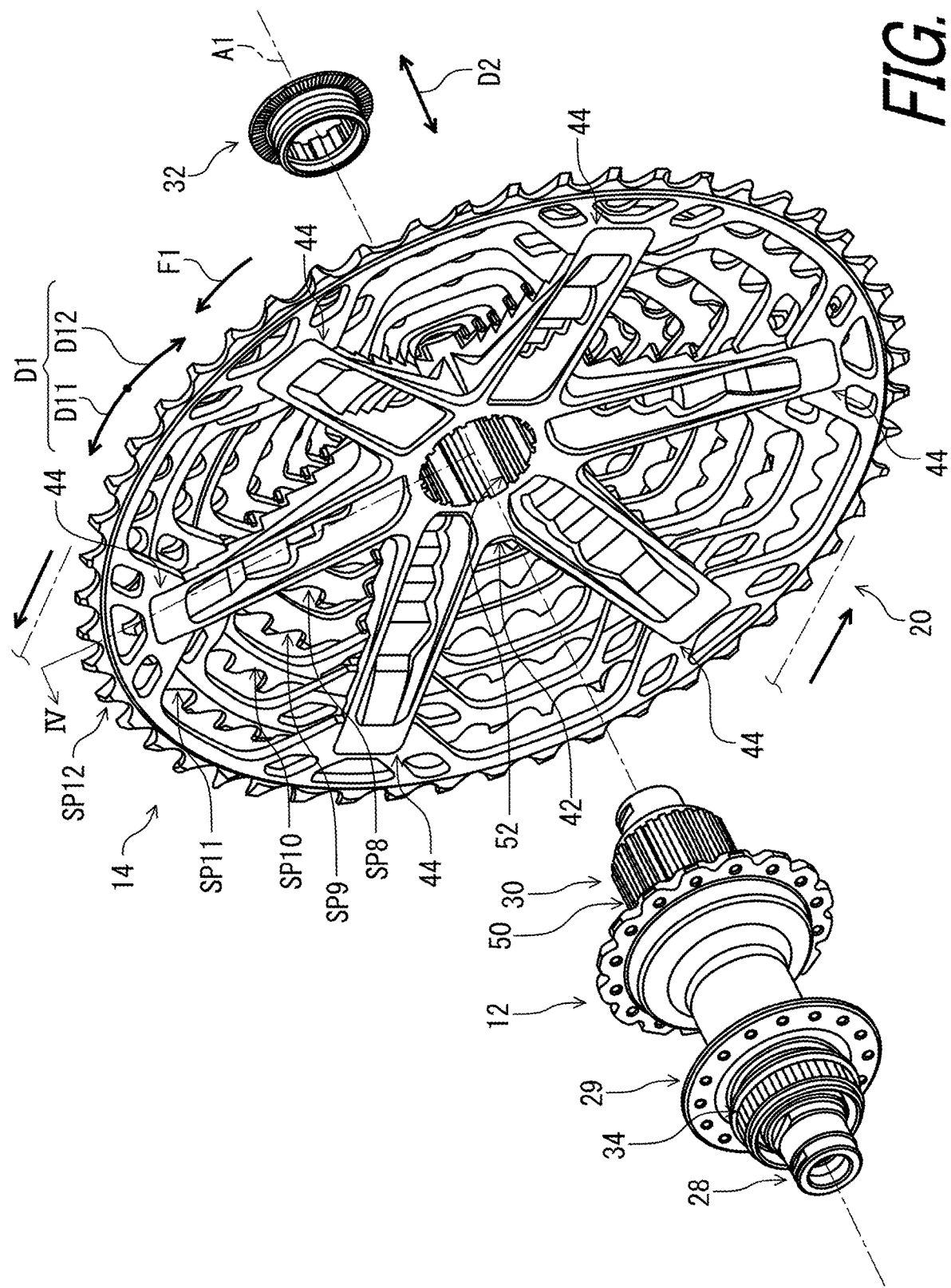
FIG. 2 is an exploded perspective view of the bicycle drive train illustrated in FIG. 1.

As seen in FIG. 2, the bicycle hub assembly 12 and the bicycle sprocket arrangement 14 have a rotational center axis A1. The bicycle sprocket arrangement 14 is rotatably supported by the bicycle hub assembly 12 relative to the bicycle frame BF (FIG. 1) about the rotational center axis A1. The bicycle sprocket arrangement 14 is configured to be engaged with the bicycle chain 20 to transmit a rotational driving force F1 between the bicycle chain 20 and the bicycle sprocket arrangement 14 during pedaling. The bicycle sprocket arrangement 14 is rotated about the rotational center axis A1 in a driving rotational direction D11 during pedaling. The driving rotational direction D11 is defined along a circumferential direction D1 of the bicycle hub assembly 12 or the bicycle sprocket arrangement 14. A reverse rotational direction D12 is an opposite direction of the driving rotational direction D11 and is defined along the circumferential direction D1.

Figure 3:
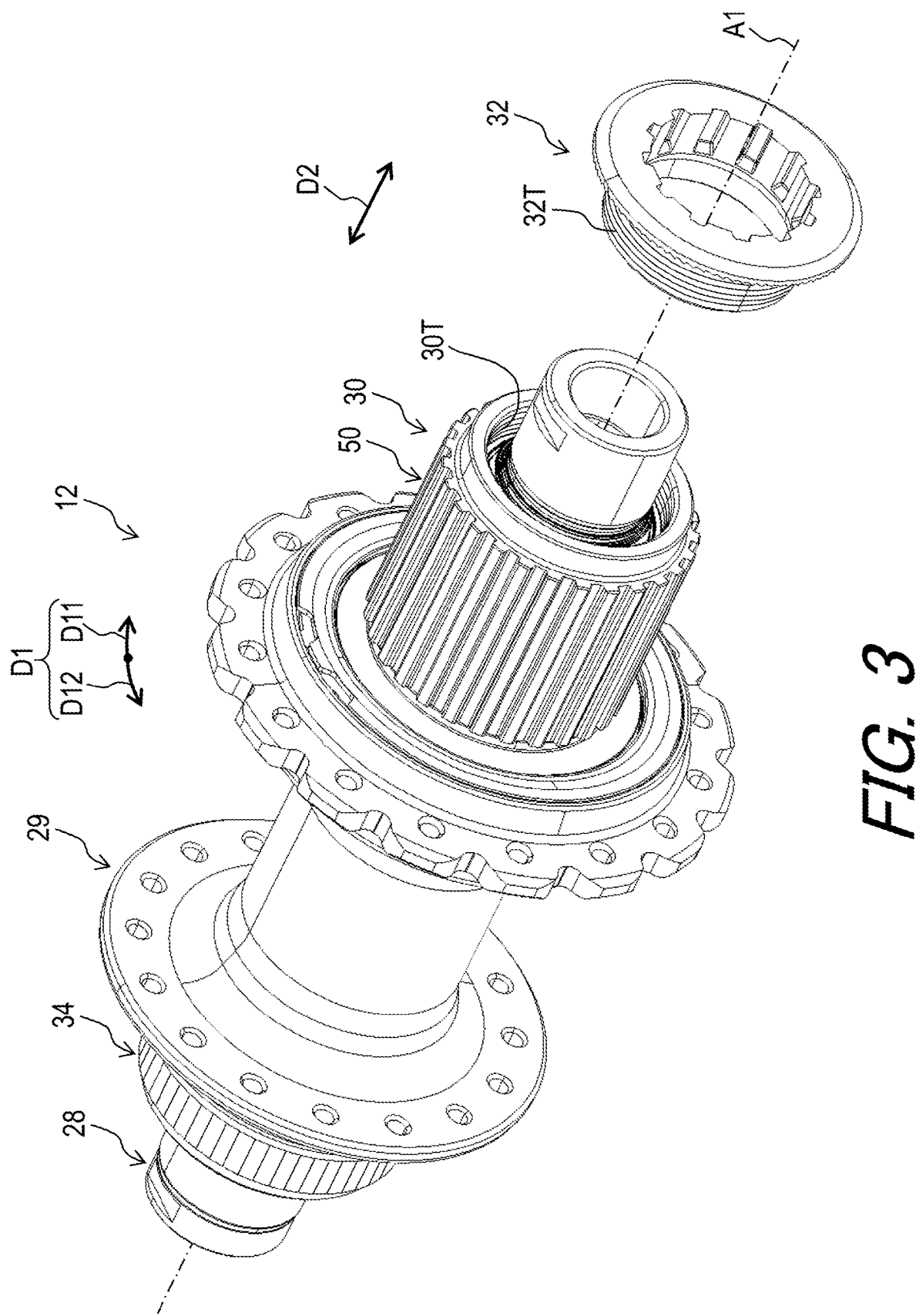
FIG. 3 is a perspective view of a bicycle hub assembly of the bicycle drive train illustrated in FIG. 2.

As seen in FIGS. 2 and 3, the bicycle hub assembly 12 comprises a hub axle 28, a hub body 29, and a sprocket support body 30. The hub body 29 is rotatably mounted on the hub axle 28 about the rotational center axis A1. The sprocket support body 30 is rotatably mounted on the hub axle 28 about the rotational center axis A1. As seen in FIG. 2, the bicycle sprocket arrangement 14 is configured to be mounted to the sprocket support body 30 of the bicycle hub assembly 12. The bicycle sprocket arrangement 14 is mounted on the sprocket support body 30 to transmit the rotational driving force F1 between the sprocket support body 30 and the bicycle sprocket arrangement 14. The bicycle hub assembly 12 further comprises a lock member 32. The lock member 32 is secured to the sprocket support body 30 to hold the bicycle sprocket arrangement 14 relative to the sprocket support body 30 in an axial direction D2 with respect to the rotational center axis A1.

As seen in FIG. 3, the sprocket support body includes an internal thread 30T. The lock member 32 includes an external thread 32T. The external thread 32T of the lock member 32 is configured to be threadedly engaged with the internal thread 30T of the sprocket support body 30.

The bicycle hub assembly 12 further comprises a brake-rotor support body 34. The brake-rotor support body 34 is rotatably mounted on the hub axle 28 about the rotational center axis A1. The brake-rotor support body 34 is coupled to the bicycle brake rotor 16 (FIG. 1) to transmit a braking rotational force from the bicycle brake rotor 16 to the brake-rotor support body 34.

The hub body 29 is rotatably mounted on the hub axle 28 about the rotational center axis A1 of the bicycle hub assembly 12. In this embodiment, the sprocket support body 30 is a separate member from the hub body 29. The brake-rotor support body 34 is integrally provided with the hub body 29 as a one-piece unitary member. However, the sprocket support body 30 can be integrally provided with the hub body 29. The brake-rotor support body 34 can be a separate member from the hub body 29. For example, the hub body 29 is made of a metallic material including aluminum.

Figure 4:
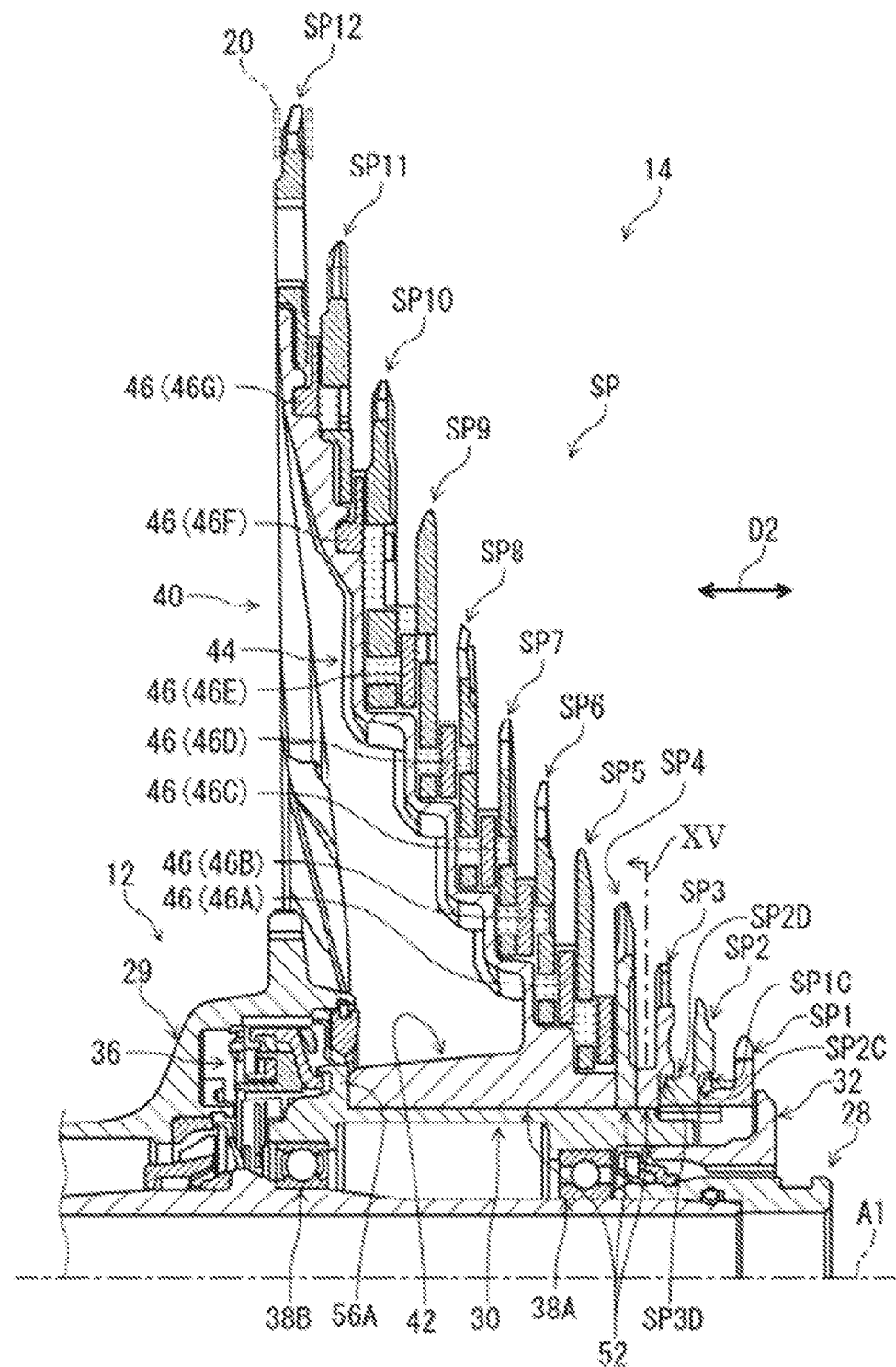
FIG. 4 is a cross-sectional view of the bicycle drive train taken along line IV-IV of FIG. 2.

As seen in FIG. 4, the bicycle hub assembly 12 further comprises a freewheel structure 36. The sprocket support body 30 is operatively coupled to the hub body 29 with the freewheel structure 36. The freewheel structure 36 is configured to couple the sprocket support body 30 to the hub body 29 to rotate the sprocket support body 30 along with the hub body 29 in the driving rotational direction D11 (see e.g., FIG. 3) during pedaling. The freewheel structure 36 is configured to allow the sprocket support body 30 to rotate relative to the hub body 29 in the reverse rotational direction D12 (see e.g., FIG. 3) during coasting. Accordingly, the freewheel structure 36 can also be referred to as a one-way clutch structure 36. The freewheel structure 36 includes structures that are known in the bicycle field. Thus, it will not be described in detail here for the sake of brevity.

The bicycle hub assembly 12 includes a first bearing 38A and a second bearing 38B. The first bearing 38A and the second bearing 38B are provided between the sprocket support body 30 and the hub axle 28 to rotatably support the sprocket support body 30 relative to the hub axle 28 about the rotational center axis A1.

In this embodiment, each of the sprocket support body 30, the brake-rotor support body 34, and the hub body 29 is made of a metallic material such as aluminum, iron, or titanium. However, at least one of the sprocket support body 30, the brake-rotor support body 34, and the hub body 29 can be made of a non-metallic material.

Figure 5:
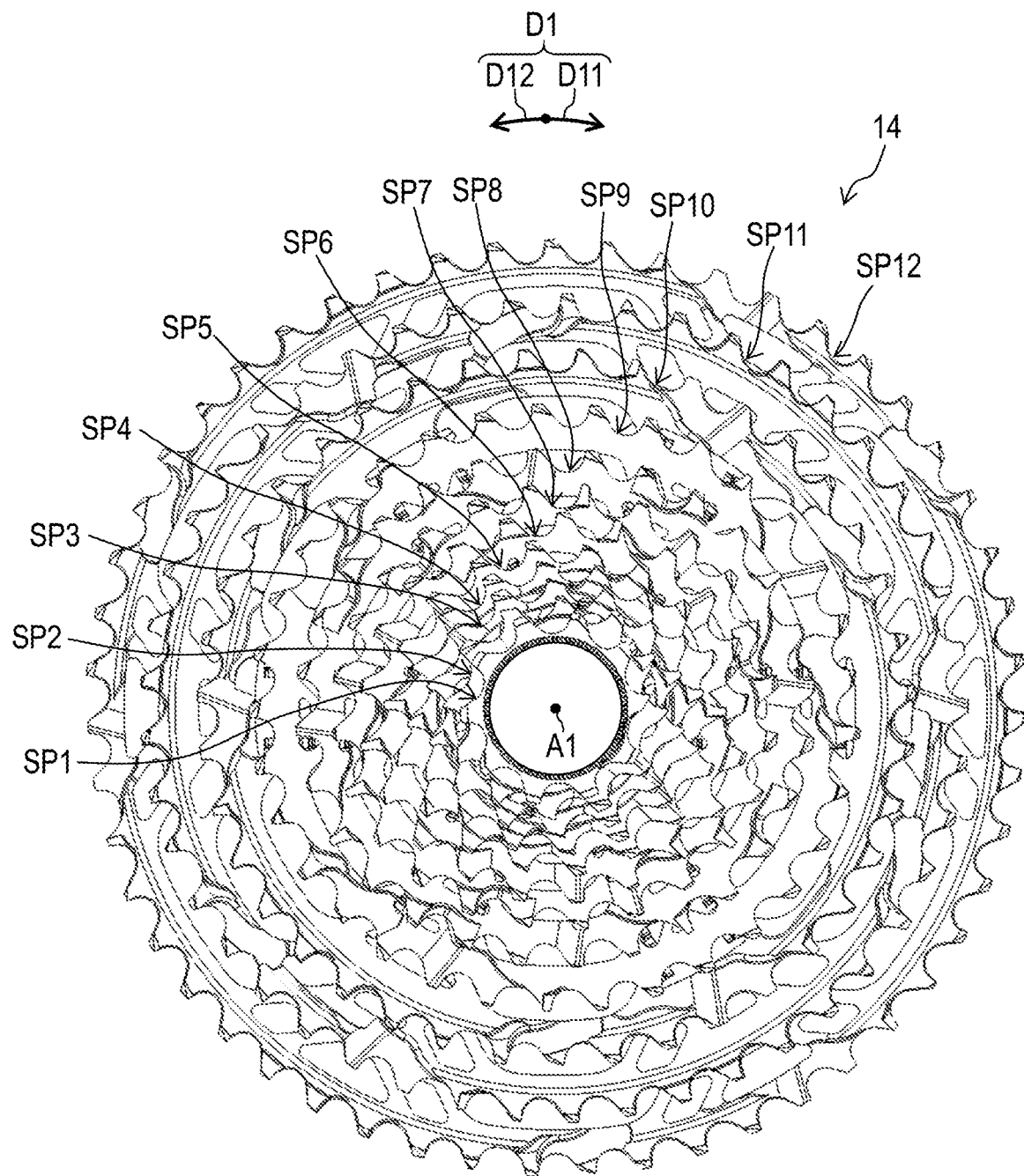
FIG. 5 is a side elevational view of a bicycle rear sprocket assembly of the bicycle drive train illustrated in FIG. 2.

As seen in FIGS. 4 and 5, the bicycle sprocket arrangement 14 comprises a plurality of sprockets SP. In this embodiment, the bicycle sprocket arrangement 14 comprises a plurality of sprockets SP1 to SP12 arranged in the axial direction D2. A total number of the plurality of sprockets SP is 12. However, the total number of the plurality of sprockets SP is not limited to this embodiment. For example, a total number of the plurality of sprockets SP is equal to or larger than 10. The total number of the plurality of sprockets SP can be equal to or larger than 11. The total number of the plurality of sprockets SP can be equal to or larger than 12. In this embodiment, the total number of the plurality of sprockets SP is 12. However, the total number of the plurality of sprockets SP is not limited to this embodiment. For example, the total number of the plurality of sprockets SP can be 13, 14, or equal to or larger than 15.

The sprocket SP1 is the smallest sprocket in the bicycle sprocket arrangement 14. The sprocket SP12 is the largest sprocket in the bicycle sprocket arrangement 14. The sprocket SP1 corresponds to top gear in the bicycle sprocket arrangement 14. The sprocket SP12 corresponds to low gear in the bicycle sprocket arrangement 14.

As seen in FIG. 4, the bicycle sprocket arrangement 14 comprises a sprocket carrier 40. At least one of the sprockets SP1 to SP12 is attached to the sprocket carrier 40. The sprockets SP5 to SP12 are attached to the sprocket carrier 40. The sprockets SP1 to SP4 are held between the sprocket carrier 40 and the lock member 32 in the axial direction D2. However, at least one of the sprockets SP5 to SP12 can be held between the sprocket carrier 40 and the lock member 32 in the axial direction D2. At least one of the sprockets SP1 to SP4 can be attached to the sprocket carrier 40. The sprocket carrier 40 can be omitted from the bicycle sprocket arrangement 14 in a case where the sprocket SP1 to SP12 are coupled to each other.

Figure 6:
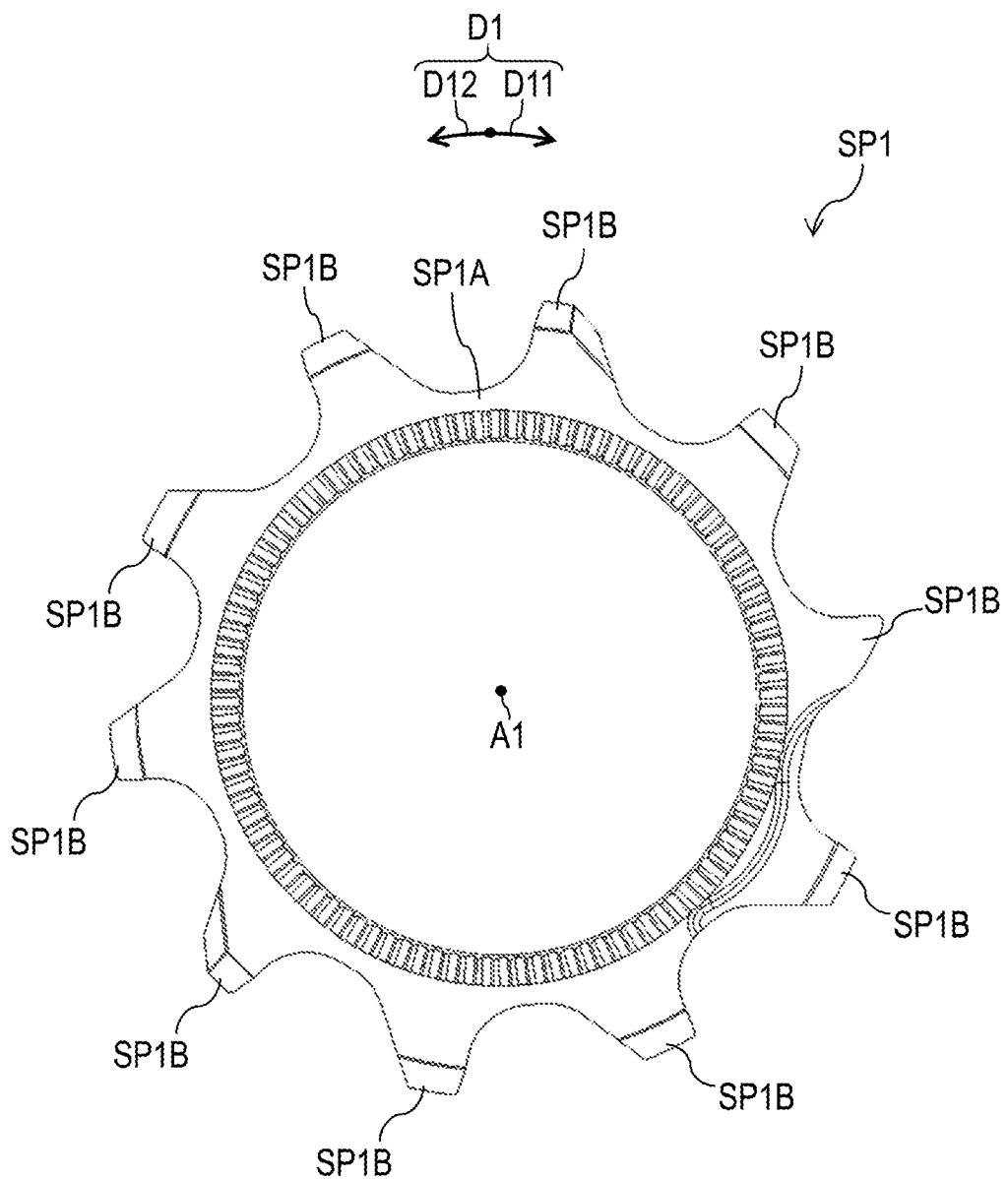
FIG. 6 is a side elevational view of a sprocket of the bicycle rear sprocket assembly illustrated in FIG. 5.

As seen in FIG. 6, the sprocket SP1 includes an annular body SP1A and a plurality of sprocket teeth SP1B. The plurality of sprocket teeth SP1B extends radially outwardly from the annular body SP1A with respect to the rotational center axis A1 of the bicycle sprocket arrangement 14. A total tooth number of the sprocket SP1 (a total number of the at least one sprocket teeth SP1B) is equal to or smaller than 10. In this embodiment, the total number of the at least one sprocket tooth SP1B of the sprocket SP1 is 10. However, the total number of the plurality of sprocket tooth SP1B of the sprocket SP1 is not limited to this embodiment and the above range. The annular body SP1A can also be referred to as a sprocket body SP1A.

Figure 7:
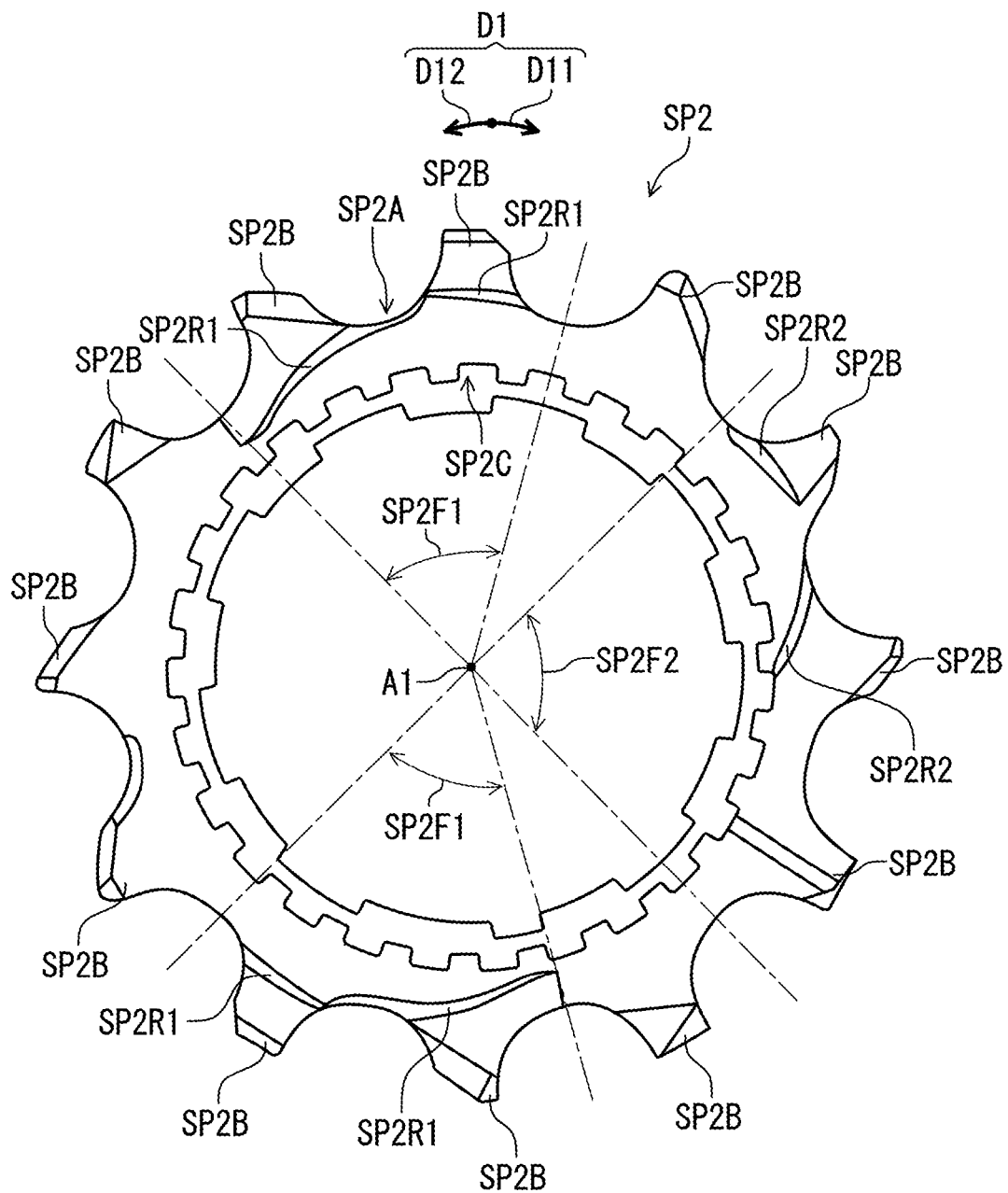
FIG. 7 is a side elevational view of a sprocket of the bicycle rear sprocket assembly illustrated in FIG. 5.

As seen in FIG. 7, the sprocket SP2 includes an annular body SP2A and a plurality of sprocket teeth SP2B. The plurality of sprocket teeth SP2B extends radially outwardly from the annular body SP2A with respect to the rotational center axis A1 of the bicycle sprocket arrangement 14. In this embodiment, a total number of the at least one sprocket tooth SP2B is 12. However, the total number of the plurality of sprocket tooth SP2B of the sprocket SP2 is not limited to this embodiment. The annular body SP2A can also be referred to as a sprocket body SP2A.

The sprocket SP2 includes at least one first shifting facilitation area SP2F1 to facilitate a first shifting operation in which the bicycle chain 20 shifts from the sprocket SP2 to the sprocket SP1 (FIG. 4). The sprocket SP2 includes at least one second shifting facilitation area SP2F2 to facilitate a second shifting operation in which the bicycle chain 20 shifts from the sprocket SP1 (FIG. 4) to the sprocket SP2. In this embodiment, the sprocket SP2 includes a plurality of first shifting facilitation areas SP2F1 to facilitate the first shifting operation. The sprocket SP2 includes a second shifting facilitation area SP2F2 to facilitate the second shifting operation. However, a total number of the first shifting facilitation areas SP2F1 is not limited to this embodiment. A total number of the second shifting facilitation area SP2F2 is not limited to this embodiment. At least one of the plurality of first shifting facilitation areas SP2F1 and the second shifting facilitation area SP2F2 can be omitted from the sprocket SP2. The term "shifting facilitation area," as used herein, is intended to be an area that is intentionally designed to facilitate a shifting operation of a bicycle chain from a sprocket to another axially adjacent sprocket in the area.

In this embodiment, the sprocket SP2 includes a plurality of first shifting facilitation recesses SP2R1 to facilitate the first shifting operation. The sprocket SP2 includes a plurality of second shifting facilitation recesses SP2R2 to facilitate the second shifting operation. The first shifting facilitation recess SP2R1 is provided in the first shifting facilitation area SP2F1. However, the first shifting facilitation area SP2F1 can include another structure instead of or in addition to the first shifting facilitation recess SP2R1. The second shifting facilitation area SP2F2 can include another structure instead of or in addition to the second shifting facilitation recess SP2R2.

As seen in FIG. 4, the sprocket SP1 includes a torque transmitting structure SP1C. The sprocket SP2 includes a torque transmitting structure SP2C configured to be engaged with the torque transmitting structure SP1C. For example, the torque transmitting structure SP includes a plurality of teeth, and the torque transmitting structure SP2C includes a plurality of recesses.

Figure 8:
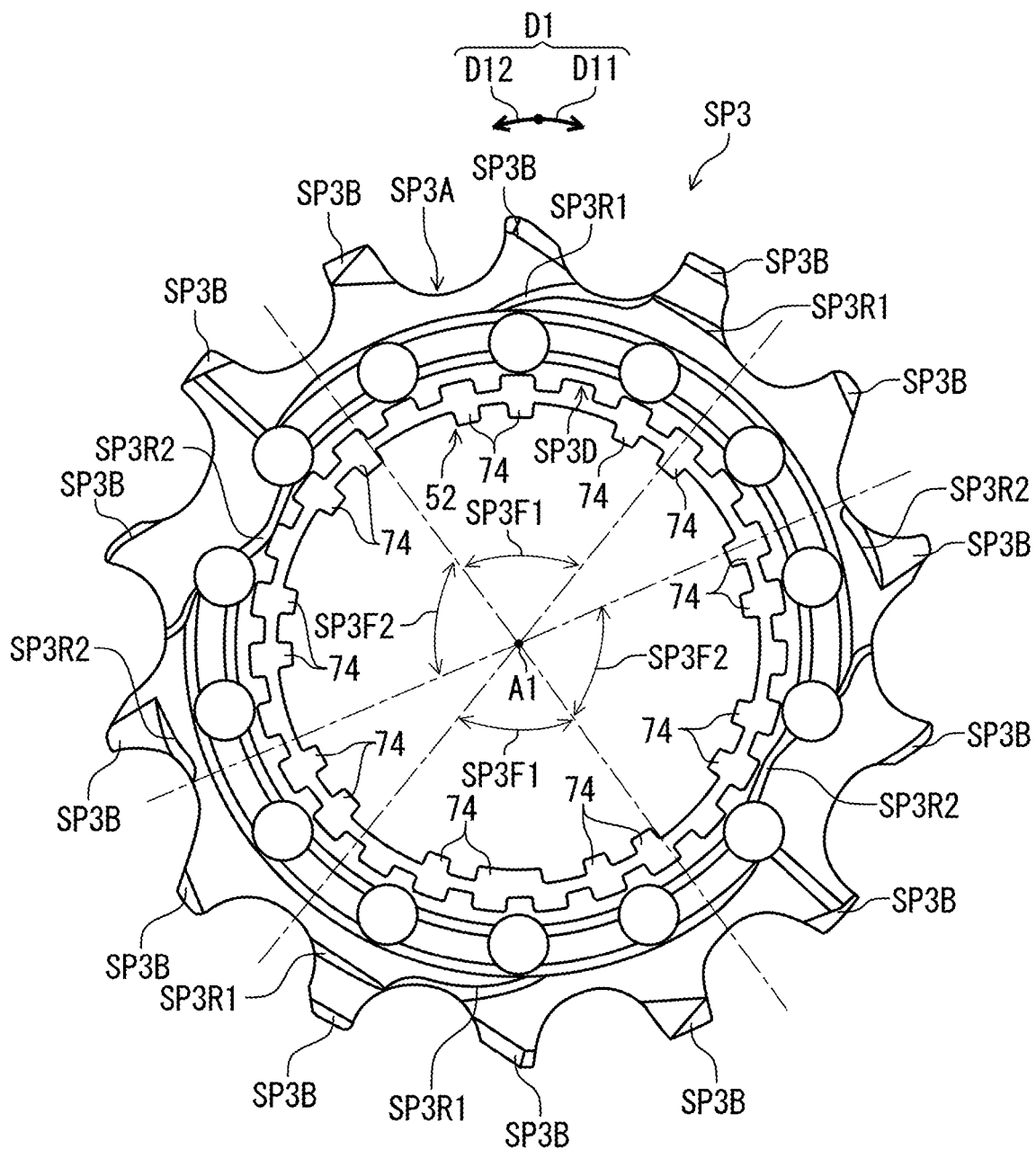
FIG. 8 is a side elevational view of a sprocket of the bicycle rear sprocket assembly illustrated in FIG. 5.

As seen in FIG. 8, the sprocket SP3 includes an annular body SP3A and a plurality of sprocket teeth SP3B. The plurality of sprocket teeth SP3B extends radially outwardly from the annular body SP3A with respect to the rotational center axis A1 of the bicycle sprocket arrangement 14. In this embodiment, a total number of the at least one sprocket tooth SP3B is 14. However, the total number of the plurality of sprocket tooth SP3B of the sprocket SP3 is not limited to this embodiment. The annular body SP3A can also be referred to as a sprocket body SP3A.

The sprocket SP3 includes at least one first shifting facilitation area SP3F1 to facilitate a first shifting operation in which the bicycle chain 20 shifts from the sprocket SP3 to the sprocket SP2 (FIG. 4). The sprocket SP3 includes at least one second shifting facilitation area SP3F2 to facilitate a second shifting operation in which the bicycle chain 20 shifts from the sprocket SP2 (FIG. 4) to the sprocket SP3. In this embodiment, the sprocket SP3 includes a plurality of first shifting facilitation areas SP3F1 to facilitate the first shifting operation. The sprocket SP3 includes a second shifting facilitation area SP3F2 to facilitate the second shifting operation. However, a total number of the first shifting facilitation areas SP3F1 is not limited to this embodiment. A total number of the second shifting facilitation area SP3F2 is not limited to this embodiment. At least one of the plurality of first shifting facilitation areas SP3F1 and the second shifting facilitation area SP3F2 can be omitted from the sprocket SP3.

In this embodiment, the sprocket SP3 includes a plurality of first shifting facilitation recesses SP3R1 to facilitate the first shifting operation. The sprocket SP3 includes a plurality of second shifting facilitation recesses SP3R2 to facilitate the second shifting operation. The first shifting facilitation recess SP3R1 is provided in the first shifting facilitation area SP3F1. However, the first shifting facilitation area SP3F1 can include another structure instead of or in addition to the first shifting facilitation recess SP3R1. The second shifting facilitation area SP3F2 can include another structure instead of or in addition to the second shifting facilitation recess SP3R2.

As seen in FIG. 4, the sprocket SP2 includes a torque transmitting structure SP2D. The sprocket SP3 includes a torque transmitting structure SP3D configured to be engaged with the torque transmitting structure SP2D. For example, the torque transmitting structure SP2D includes a plurality of teeth, and the torque transmitting structure SP3D includes a plurality of recesses.

Figure 9:
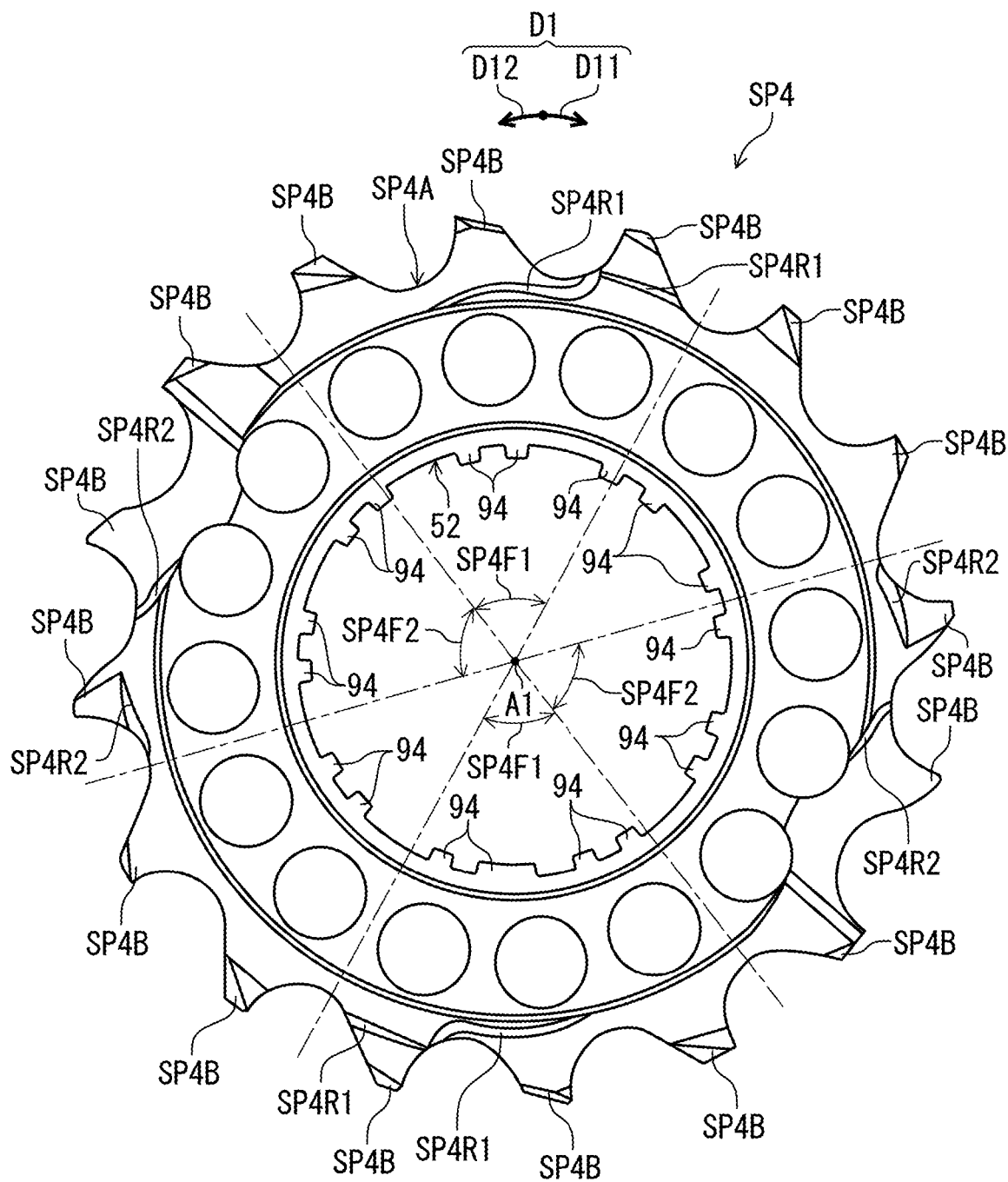
FIG. 9 is a side elevational view of a first sprocket of the bicycle rear sprocket assembly illustrated in FIG. 5.

As seen in FIG. 9, the sprocket SP4 includes an annular body SP4A and a plurality of sprocket teeth SP4B. The plurality of sprocket teeth SP4B extends radially outwardly from the annular body SP4A with respect to the rotational center axis A1 of the bicycle sprocket arrangement 14. In this embodiment, a total number of the at least one sprocket tooth SP4B is 16. However, the total number of the plurality of sprocket tooth SP4B of the sprocket SP4 is not limited to this embodiment. The annular body SP4A can also be referred to as a sprocket body SP4A.

The sprocket SP4 includes at least one first shifting facilitation area SP4F1 to facilitate a first shifting operation in which the bicycle chain 20 shifts from the sprocket SP4 to the sprocket SP3 (FIG. 4). The sprocket SP4 includes at least one second shifting facilitation area SP4F2 to facilitate a second shifting operation in which the bicycle chain 20 shifts from the sprocket SP3 (FIG. 4) to the sprocket SP4. In this embodiment, the sprocket SP4 includes a plurality of first shifting facilitation areas SP4F1 to facilitate the first shifting operation. The sprocket SP4 includes a second shifting facilitation area SP4F2 to facilitate the second shifting operation. However, a total number of the first shifting facilitation areas SP4F1 is not limited to this embodiment. A total number of the second shifting facilitation area SP4F2 is not limited to this embodiment. At least one of the plurality of first shifting facilitation areas SP4F1 and the plurality of second shifting facilitation area SP4F2 can be omitted from the sprocket SP4.

In this embodiment, the sprocket SP4 includes a plurality of first shifting facilitation recesses SP4R1 to facilitate the first shifting operation. The sprocket SP4 includes a plurality of second shifting facilitation recesses SP4R2 to facilitate the second shifting operation. The first shifting facilitation recess SP4R1 is provided in the first shifting facilitation area SP4F1. However, the first shifting facilitation area SP4F1 can include another structure instead of or in addition to the first shifting facilitation recess SP4R1. The second shifting facilitation area SP4F2 can include another structure instead of or in addition to the second shifting facilitation recess SP4R2.

Figure 10:
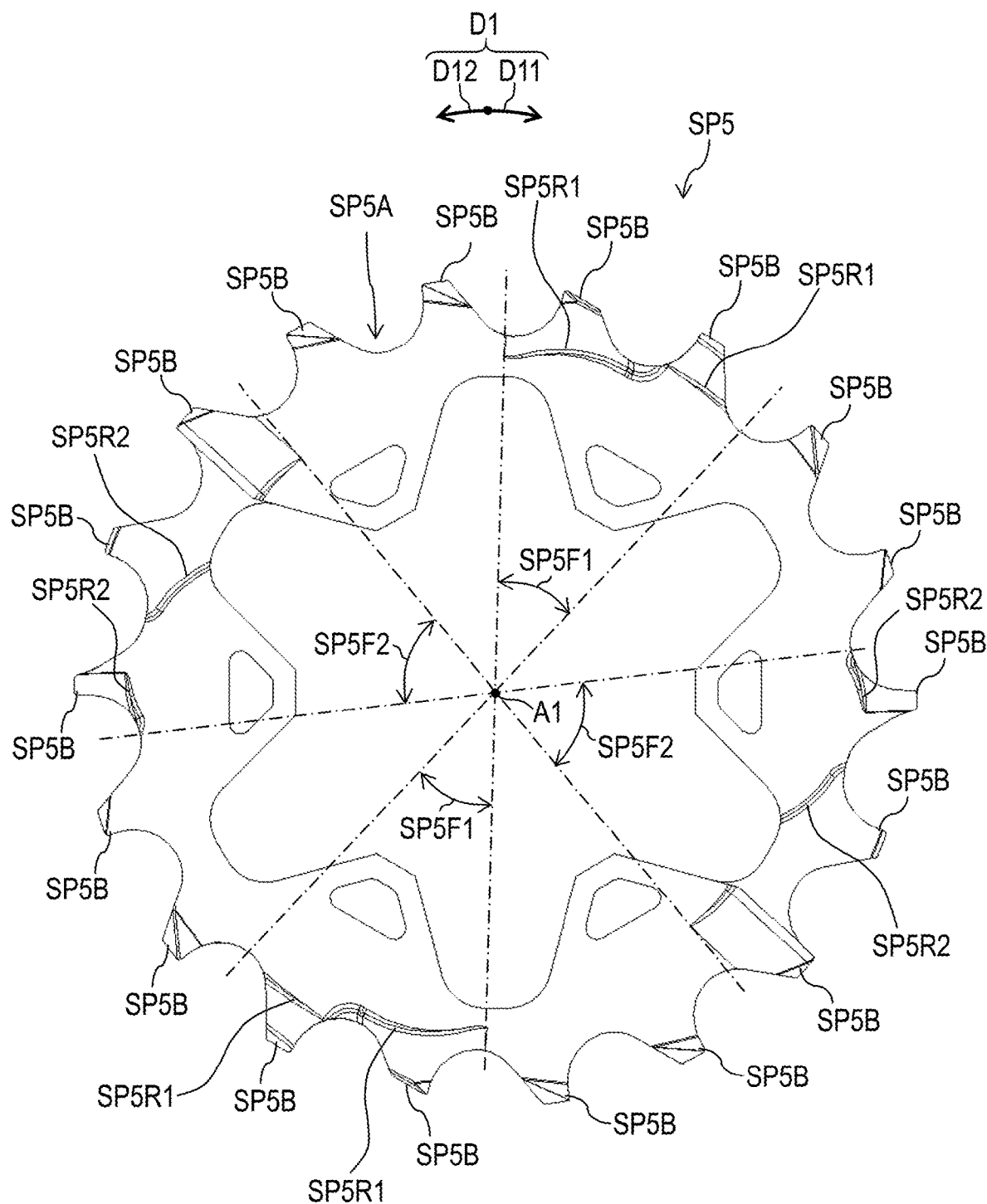
FIG. 10 is a side elevational view of a sprocket of the bicycle rear sprocket assembly illustrated in FIG. 5.

As seen in FIG. 10, the sprocket SP5 includes an annular body SP5A and a plurality of sprocket teeth SP5B. The plurality of sprocket teeth SP5B extends radially outwardly from the annular body SP5A with respect to the rotational center axis A1 of the bicycle sprocket arrangement 14. In this embodiment, a total number of the at least one sprocket tooth SP5B is 18. However, the total number of the plurality of sprocket tooth SP5B of the sprocket SP5 is not limited to this embodiment. The annular body SP5A can also be referred to as a sprocket body SP5A.

The sprocket SP5 includes at least one first shifting facilitation area SP5F1 to facilitate a first shifting operation in which the bicycle chain 20 shifts from the sprocket SP5 to the sprocket SP4 (FIG. 4). The sprocket SP5 includes at least one second shifting facilitation area SP5F2 to facilitate a second shifting operation in which the bicycle chain 20 shifts from the sprocket SP4 to (FIG. 4) the sprocket SP5. The sprocket SP4 is adjacent to the sprocket SP5 without another sprocket between the sprocket SP5 and the sprocket SP4 in the axial direction D2 with respect to the rotational center axis A1 of the bicycle sprocket arrangement 14. In this embodiment, the sprocket SP5 includes a plurality of first shifting facilitation areas SP5F1 to facilitate the first shifting operation. The sprocket SP5 includes a plurality of second shifting facilitation areas SP5F2 to facilitate the second shifting operation. However, a total number of the first shifting facilitation areas SP5F1 is not limited to this embodiment. A total number of the second shifting facilitation areas SP5F2 is not limited to this embodiment. At least one of the plurality of first shifting facilitation areas SP5F1 and the plurality of second shifting facilitation area SP5F2 can be omitted from the sprocket SP5.

In this embodiment, the sprocket SP5 includes a plurality of first shifting facilitation recesses SP5R1 to facilitate the first shifting operation. The sprocket SP5 includes a plurality of second shifting facilitation recesses SP5R2 to facilitate the second shifting operation. The first shifting facilitation recess SP5R1 is provided in the first shifting facilitation area SP5F1. The second shifting facilitation recess SP5R2 is provided in the second shifting facilitation area SP5F2. However, the first shifting facilitation area SP5F1 can include another structure instead of or in addition to the first shifting facilitation recess SP5R1. The second shifting facilitation area SP5F2 can include another structure instead of or in addition to the second shifting facilitation recess SP5R2.

As seen in FIGS. 2 and 5, since the sprockets SP6 to SP12 have substantially the same structures as the structure of the sprocket SP5 except for a total number of sprocket teeth, they will not be described in detail here for the sake of brevity.

As seen in FIG. 4, in this embodiment, the sprockets SP1 to SP12 are separate members from each other. However, at least one of the sprockets SP1 to SP12 can be at least partly provided integrally with another of the sprockets SP1 to SP12. All of the sprockets SP1 to SP12 can be integrally formed with each other as a one-piece unitary unit.

As seen in FIG. 2, the sprocket carrier 40 includes an annular body 42 and a plurality of support arms 44. The plurality of support arms 44 extends radially outwardly from the annular body 42. As seen in FIG. 4, the sprocket carrier 40 includes a plurality of spacers 46. The plurality of spacers 46 includes a plurality of first spacers 46A, a plurality of second spacers 46B, a plurality of third spacers 46C, a plurality of fourth spacers 46D, a plurality of fifth spacers 46E, a plurality of sixth spacers 46F, and a plurality of seventh spacers 46G. The first spacers 46A are provided between the sprockets SP5 and SP6. The second spacers 46B are provided between the sprockets SP6 and SP7. The third spacers 46C are provided between the sprockets SP7 and SP8. The fourth spacers 46D are provided between the sprockets SP8 and SP9. The fifth spacers 46E are provided between the sprockets SP9 and SP10. The sixth spacers 46F are provided between the sprockets SP10 and SP11. The seventh spacers 46G are provided between the sprockets SP11 and SP12. The spacers 46 and the sprockets SP5 to SP12 are attached to the plurality of support arms 44 with adhesive, for example.

As seen in FIG. 2, the sprocket support body 30 for the bicycle hub assembly 12 comprises an external spline 50. The bicycle sprocket arrangement 14 comprises an internal spline 52. The external spline 50 is configured to be engaged with the internal spline 52 of the bicycle sprocket arrangement 14. The internal spline 52 is configured to be engaged with the external spline 50 of the sprocket support body 30 of the bicycle hub assembly 12.

Figure 11:
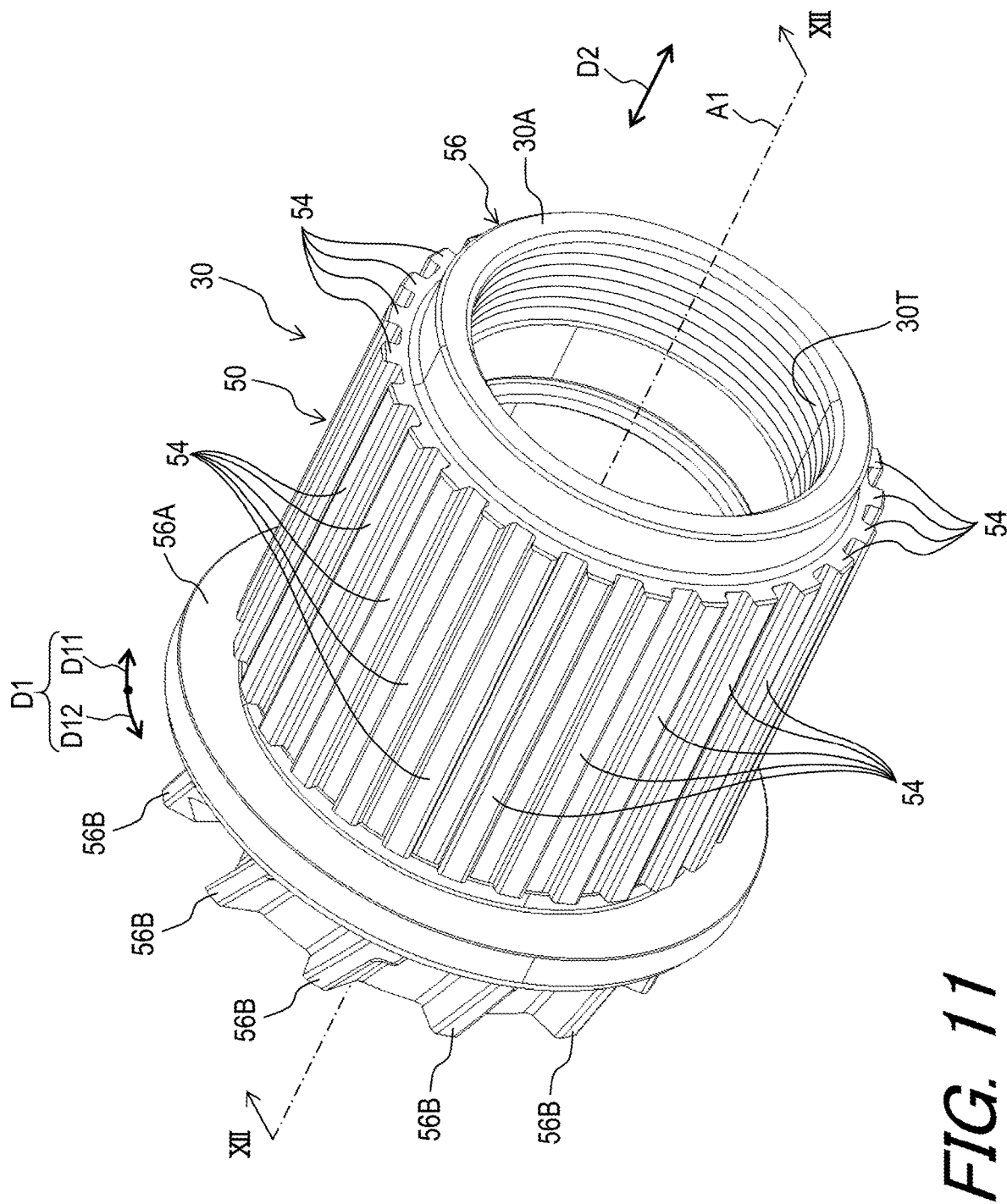
FIG. 11 is a perspective view of a sprocket support body of the bicycle hub assembly illustrated in FIG. 3.

As seen in FIG. 11, the external spline 50 includes a plurality of external-spline teeth 54. The sprocket support body 30 further comprises a tubular body 56 having the rotational center axis A1. The external spline 50 is provided on the tubular body 56. The plurality of external-spline teeth 54 extends radially outwardly from the tubular body 56 with respect to the rotational center axis A1.

Figure 12:
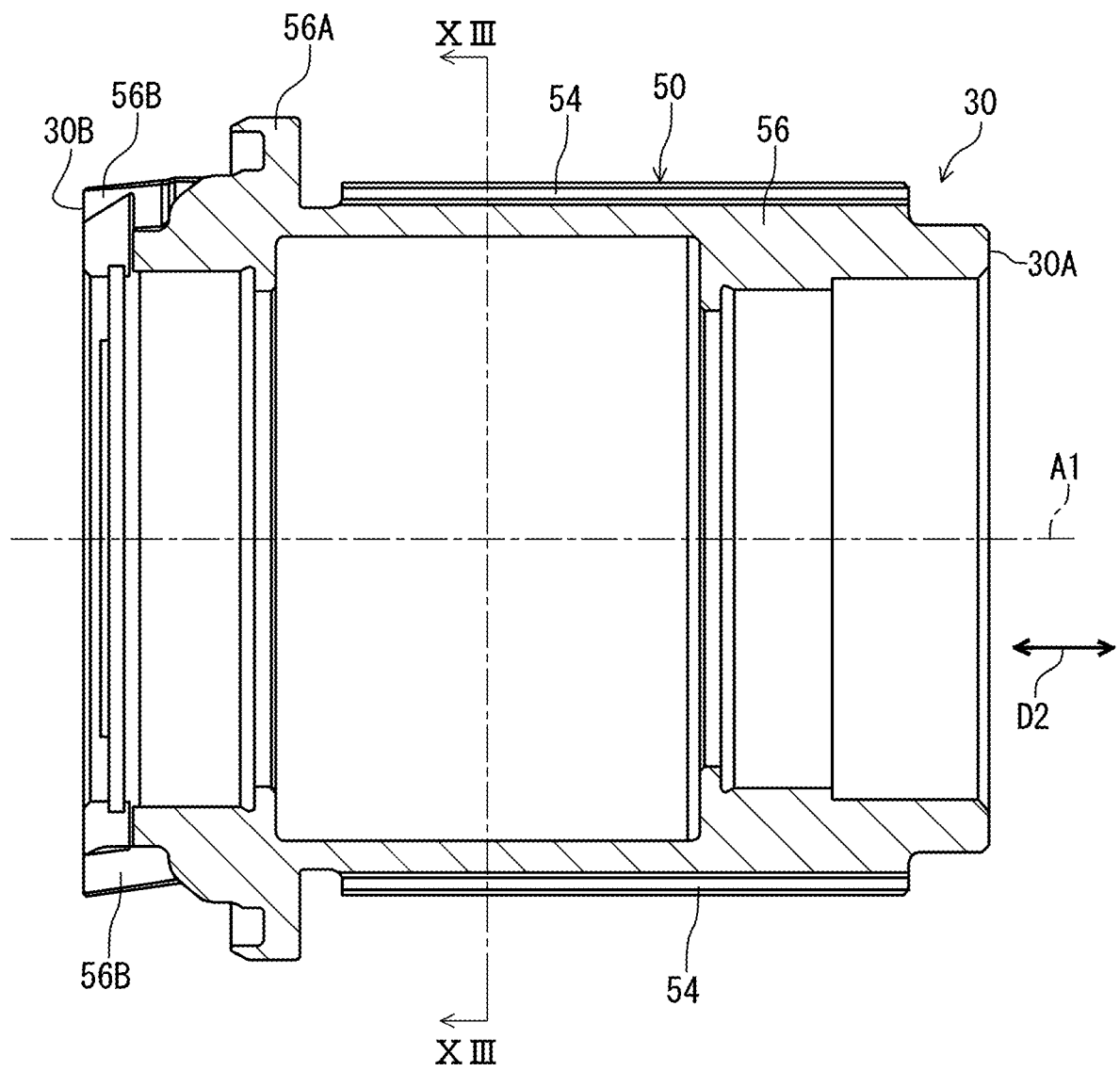
FIG. 12 is a cross-sectional view of the sprocket support body taken along line XII-XII of FIG. 11.

As seen in FIG. 12, the tubular body 56 extends in the axial direction D2. The sprocket support body 30 includes a first axial end 30A and a second axial end 30B. The sprocket support body 30 extends between the first axial end 30A and the second axial end 30B in the axial direction D2. The sprocket support body 30 includes an axial support 56A and a plurality of helical external spline teeth 56B. The axial support 56A extends radially outwardly from the tubular body 56 with respect to the rotational center axis A1. As seen in FIG. 4, the axial support 56A is in contact with the bicycle sprocket arrangement 14 in the axial direction D2 in a state where the bicycle sprocket arrangement 14 is mounted to the sprocket support body 30. As seen in FIG. 11, the plurality of helical external spline teeth 56B extends radially outwardly from the tubular body 56 with respect to the rotational center axis A1.

Figure 13:
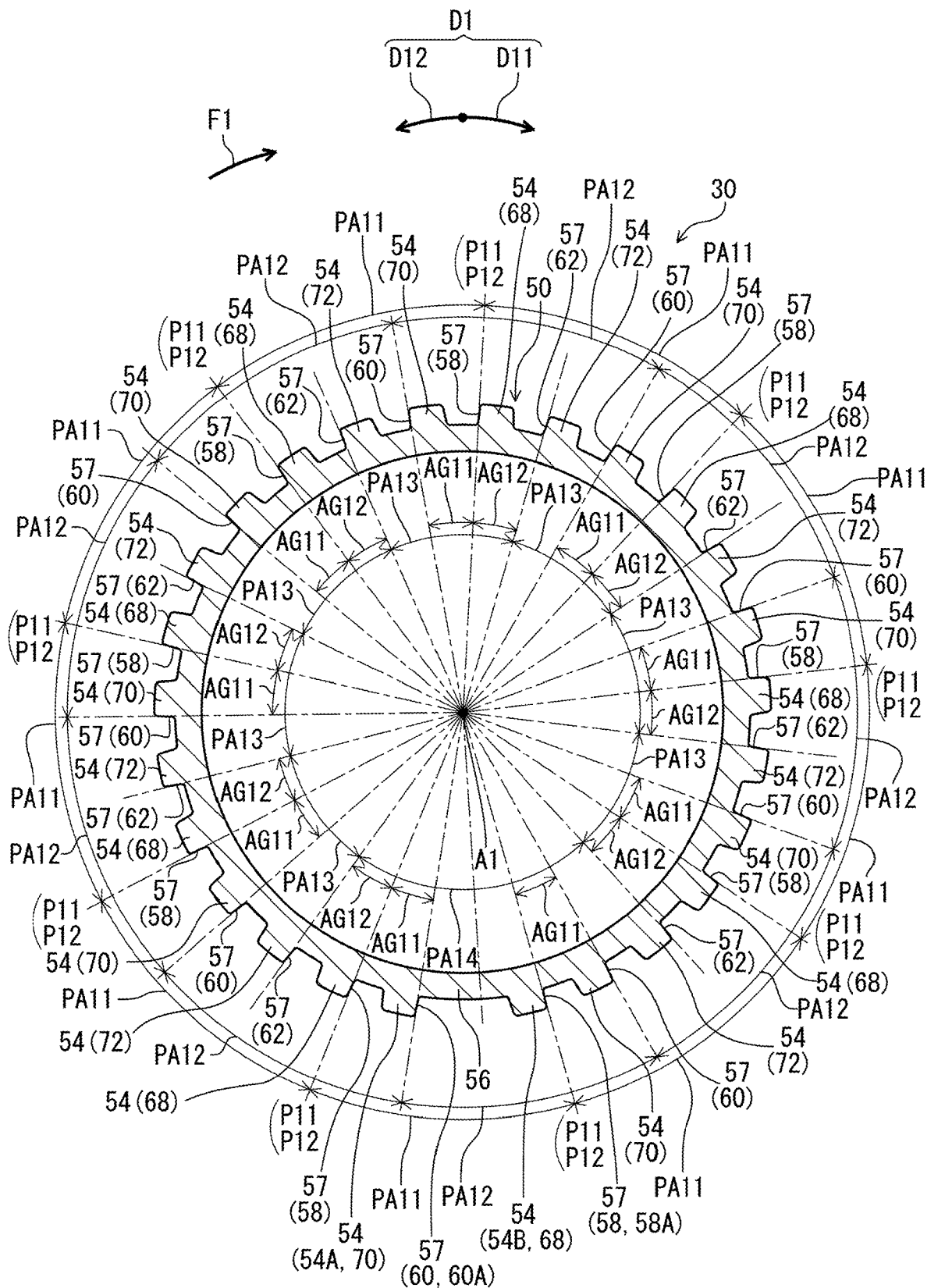
FIG. 13 is a cross-sectional view of the sprocket support body taken along line XIII-XIII of FIG. 12.

As seen in FIG. 13, the external spline 50 includes a plurality of external-spline driving surfaces 57. The plurality of external-spline driving surfaces 57 is configured to transmit the rotational driving force F1 between the sprocket support body 30 and the bicycle sprocket arrangement 14 (see e.g., FIG. 2) in the circumferential direction D1 with respect to the rotational center axis A1 of the sprocket support body 30. In this embodiment, the plurality of external-spline driving surfaces 57 faces in the reverse rotational direction D12 which is an opposite direction of the driving rotational direction D11 in which the sprocket support body 30 rotates in response to the rotational driving force F1.

The plurality of external-spline driving surfaces 57 includes at least four first external-spline driving surfaces 58. The at least four first external-spline driving surfaces 58 are respectively arranged on at least four of nine first external-spline driving positions P11 equally arranged in the circumferential direction D1 about the rotational center axis A1 at a first external-spline pitch angle PA11 which is equal to 40 degrees. In this embodiment, the at least four first external-spline driving surfaces 58 include nine first external-spline driving surfaces 58. The nine first external-spline driving surfaces 58 are equally arranged in the circumferential direction D1 about the rotational center axis A1 at the first external-spline pitch angle PA11. However, a total number of the first external-spline driving surfaces 58 is not limited to this embodiment. The first external-spline pitch angle PA11 is not limited to this embodiment.

For example, the nine first external-spline driving position P11 are defined by nine radial lines extending radially outwardly from the rotational center axis A1 when viewed along the rotational center axis A1. The nine radial lines are equally arranged in the circumferential direction D1 about the rotational center axis A1 at the first external-spline pitch angle PA11 which is equal to 40 degrees.

The plurality of external-spline driving surfaces 57 includes at least one second external-spline driving surface 60. The at least one second external-spline driving surface 60 is offset from the nine first external-spline driving positions P11 in the circumferential direction D1 about the rotational center axis A1. In this embodiment, the at least one second external-spline driving surface 60 includes at least three second external-spline driving surfaces 60. The at least three second external-spline driving surfaces 60 are offset from the nine first external-spline driving positions P11 in the circumferential direction D1 about the rotational center axis A1. The at least three second external-spline driving surfaces 60 are equally arranged in the circumferential direction D1 about the rotational center axis A1 at a second external-spline pitch angle PA12.

In this embodiment, the at least three second external-spline driving surfaces 60 include nine second external-spline driving surfaces 60. The nine second external-spline driving surfaces 60 are equally arranged in the circumferential direction D1 about the rotational center axis A1 at the second external-spline pitch angle PA12. The second external-spline pitch angle PA12 is equal to 40 degrees. However, a total number of the second external-spline driving surfaces 60 is not limited to this embodiment. The second external-spline pitch angle PA12 is not limited to this embodiment.

The at least three second external-spline driving surfaces 60 are offset from the nine first external-spline driving surfaces 58 in the circumferential direction D1 about the rotational center axis A1 at a first external-spline offset angle AG11 smaller than the second external-spline pitch angle PA12. The nine second external-spline driving surfaces 60 are offset from the nine first external-spline driving surfaces 58 in the circumferential direction D1 about the rotational center axis A1 at the first external-spline offset angle AG11. The first external-spline offset angle AG11 is equal to or smaller than a half of the second external-spline pitch angle PA12. In this embodiment, the first external-spline offset angle AG11 is smaller than the half of the second external-spline pitch angle PA12. The first external-spline offset angle AG11 is 360/27 degrees. However, the first external-spline offset angle AG11 is not limited to this embodiment.

The plurality of external-spline driving surfaces 57 includes at least one third external-spline driving surface 62. The at least one third external-spline driving surface 62 are offset from the nine first external-spline driving positions P11 and the at least three second external-spline driving surfaces 60 in the circumferential direction D1 about the rotational center axis A1. In this embodiment, the at least one third external-spline driving surface 62 includes at least three third external-spline driving surfaces 62. The at least three third external-spline driving surfaces 62 are offset from the nine first external-spline driving surfaces 58 and the at least three second external-spline driving surfaces 60 in the circumferential direction D1 about the rotational center axis A1. The at least three third external-spline driving surfaces 62 are equally arranged in the circumferential direction D1 about the rotational center axis A1 at a third external-spline pitch angle PA13. The third external-spline pitch angle PA13 is equal to 40 degrees.

In this embodiment, the at least three third external-spline driving surfaces 62 includes eight third external-spline driving surfaces 62. The eight third external-spline driving surfaces 62 are equally arranged in the circumferential direction D1 about the rotational center axis A1 at a third external-spline pitch angle PA13. However, a total number of the third external-spline driving surfaces 62 is not limited to this embodiment. The third external-spline pitch angle PA13 is not limited to this embodiment.

The at least three third external-spline driving surfaces 62 are offset from the nine first external-spline driving surfaces 58 in the circumferential direction D1 about the rotational center axis A1 at a second external-spline offset angle AG12 smaller than the third external-spline pitch angle PA13. The eight third external-spline driving surfaces 62 are offset from the nine first external-spline driving surfaces 58 in the circumferential direction D1 about the rotational center axis A1 at the second external-spline offset angle AG12. The second external-spline offset angle AG12 is equal to or smaller than a half of the third external-spline pitch angle PA13. In this embodiment, the second external-spline offset angle AG12 is smaller than the half of the third external-spline pitch angle PA13. The second external-spline offset angle AG12 is 360/27 degrees. However, the second external-spline offset angle AG12 is not limited to this embodiment.

Adjacent two driving surfaces of the at least three third external-spline driving surfaces 62 are equally arranged in the circumferential direction D1 about the rotational center axis A1 at an additional third external-spline pitch angle PA14 different from the third external-spline pitch angle PA13. In this embodiment, the additional third external-spline pitch angle PA14 is larger than the third external-spline pitch angle PA13. However, the additional third external-spline pitch angle PA14 can be equal to or smaller than the third external-spline pitch angle PA13.

The plurality of external-spline teeth 54 includes at least four first external-spline teeth 68 and at least one second external-spline tooth 70. The at least four first external-spline teeth 68 are respectively arranged on at least four of nine first external-spline tooth positions P12 equally arranged in the circumferential direction D1 about the rotational center axis A1 at the first external-spline pitch angle PA11. The at least four first external-spline teeth 68 respectively include the at least four first external-spline driving surfaces 58. In this embodiment, the at least four first external-spline teeth 68 include nine first external-spline teeth 68. The nine first external-spline teeth 68 respectively include the nine first external-spline driving surfaces 58. However, a total number of the first external-spline teeth 68 is not limited to this embodiment.

For example, the nine first external-spline tooth positions P12 are defined by nine additional radial lines extending radially outwardly from the rotational center axis A1 when viewed along the rotational center axis A1. The nine additional radial lines are equally arranged in the circumferential direction D1 about the rotational center axis A1 at the first external-spline pitch angle PA11 which is equal to 40 degrees. In this embodiment, the additional radial line indicating the first external-spline tooth positions P12 coincides with the radial line indicating the first external-spline driving position P11 when viewed along the rotational center axis A1.

The at least one second external-spline tooth 70 is offset from the nine first external-spline tooth positions P12 in the circumferential direction D1 about the rotational center axis A1. The at least one second external-spline tooth 70 respectively includes the at least one second external-spline driving surface 60. The at least one second external-spline tooth 70 includes at least three second external-spline teeth 70. The at least three second external-spline teeth 70 are offset from the nine first external-spline tooth positions P12 in the circumferential direction D1 about the rotational center axis A1. The at least three second external-spline teeth 70 respectively include the at least three second external-spline driving surfaces 70. In this embodiment, the at least three second external-spline teeth 70 include nine second external-spline teeth 70. The nine second external-spline teeth 70 are offset from the nine first external-spline tooth positions P12 in the circumferential direction D1 about the rotational center axis A1. The nine second external-spline teeth 70 respectively include the nine second external-spline driving surfaces 70. However, a total number of the second external-spline teeth 70 is not limited to this embodiment.

The plurality of external-spline teeth 54 includes at least one third external-spline teeth 72. The at least one third external-spline tooth 72 is offset from the nine first external-spline tooth positions P12 in the circumferential direction D1 about the rotational center axis A1. The at least one third external-spline tooth 72 respectively includes the at least one third external-spline driving surface 62. The at least one third external-spline tooth 72 includes at least three third external-spline teeth 72. The at least three third external-spline teeth 72 are offset from the nine first external-spline tooth positions P12 in the circumferential direction D1 about the rotational center axis A1. The at least three third external-spline teeth 72 respectively include the at least three third external-spline driving surfaces 72. In this embodiment, the at least three third external-spline teeth 72 include nine third external-spline teeth 72. The nine third external-spline teeth 72 are offset from the nine first external-spline tooth positions P12 in the circumferential direction D1 about the rotational center axis A1. The nine third external-spline teeth 72 respectively include the nine third external-spline driving surfaces 72. However, a total number of the third external-spline teeth 72 is not limited to this embodiment.

The external spline 50 includes 27 external-spline driving positions equally arranged in the circumferential direction D1 about the rotational center axis A1. In FIG. 13, the 27 external-spline driving positions are indicated with chain lines extending radially outwardly from the rotational center axis A1. Nine of the 27 external-spline driving positions respectively coincide with the nine first external-spline driving positions P11. Each of the nine first external-spline driving surfaces 58, the nine second external-spline driving surfaces 60, and the eight third external-spline driving surfaces 62 is arranged on any one of the 27 external-spline driving positions. Thus, the nine first external-spline driving surfaces 58, the nine second external-spline driving surfaces 60, and the eight third external-spline driving surfaces 62 are equally arranged in the circumferential direction D1 about the rotational center axis A1 at 360/27 degrees from the second external-spline driving surface 60B to the first external-spline driving surface 58A in the driving rotational direction D11. The plurality of external-spline teeth 54 is equally arranged in the circumferential direction D1 about the rotational center axis A1 at 360/27 degrees from the external-spline tooth 54A to the external-spline tooth 54B in the driving rotational direction D11.

In this embodiment, the nine first external-spline teeth 68 have the same cross-sectional shape as each other on a plane perpendicular to the rotational center axis A1. The plurality of external-spline teeth 54 has the same cross-sectional shape as each other on the plane perpendicular to the rotational center axis A1. The nine second external-spline teeth 70 have the same cross-sectional shape as each other on the plane perpendicular to the rotational center axis A1. The eight third external-spline teeth 72 have the same cross-sectional shape as each other on the plane perpendicular to the rotational center axis A1. The first external-spline tooth 68, the second external-spline tooth 70, and the third external-spline tooth 72 have the same cross-sectional shape as each other on the plane perpendicular to the rotational center axis A1.

However, at least one external-spline tooth of the plurality of external-spline teeth 54 can have a cross-sectional shape different from a cross-sectional shape of another of the plurality of external-spline teeth 54. At least one first external-spline tooth of the nine first external-spline teeth 68 can have a cross-sectional shape different from a cross-sectional shape of another of the nine first external-spline teeth 68. At least one second external-spline tooth of the nine second external-spline teeth 70 can have a cross-sectional shape different from a cross-sectional shape of another of the nine second external-spline teeth 70. At least one third external-spline tooth of the eight third external-spline teeth 72 can have a cross-sectional shape different from a cross-sectional shape of another of the eight third external-spline teeth 72. At least one of the first external-spline tooth 68, the second external-spline tooth 70, and the third external-spline tooth 72 can have a cross-sectional shape different from a cross-sectional shape of another of the first external-spline tooth 68, the second external-spline tooth 70, and the third external-spline tooth 72.

Figure 14:
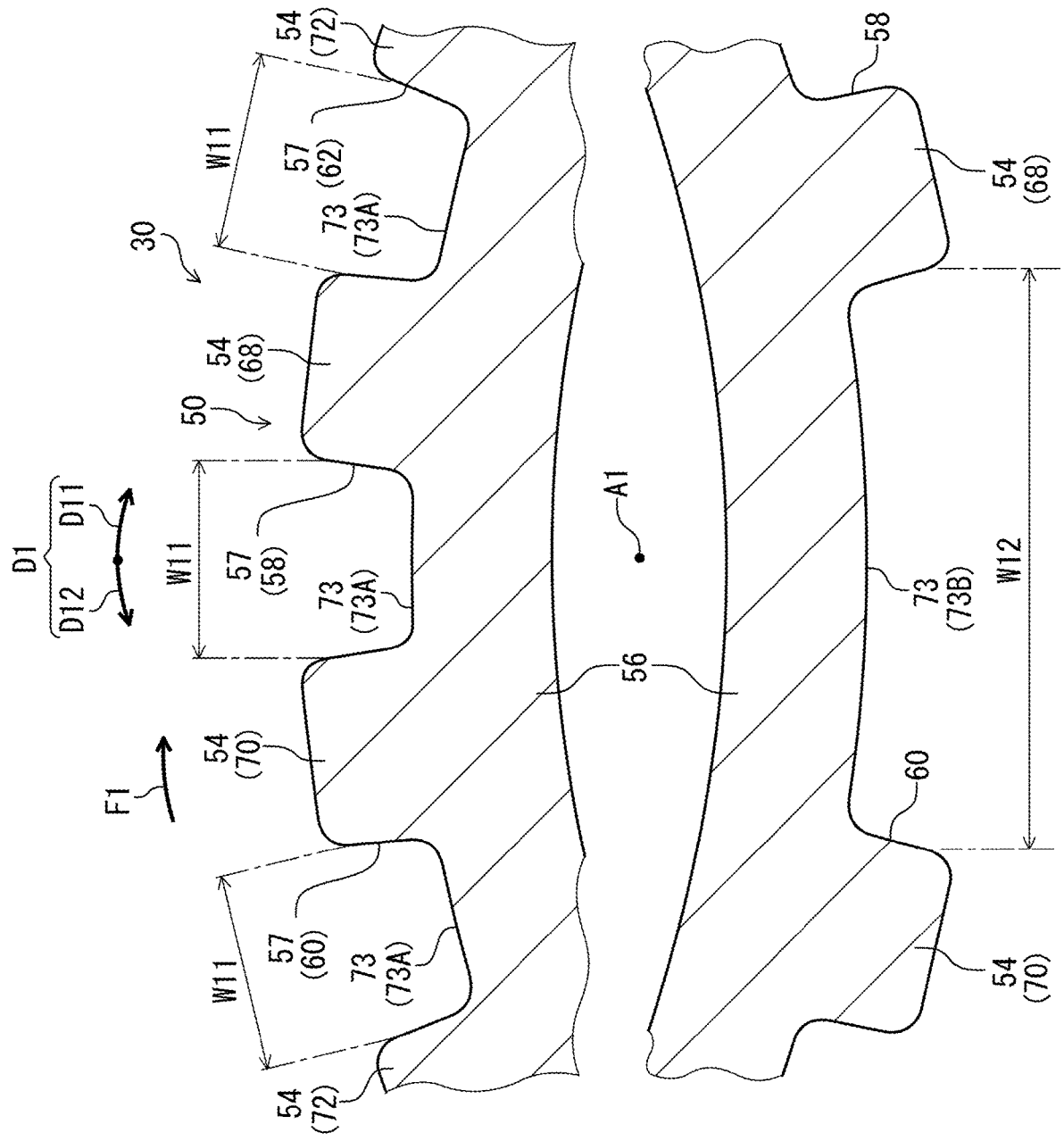
FIG. 14 is a partial enlarged cross-sectional view of the sprocket support body illustrated in FIG. 13.

As seen in FIG. 14, the plurality of external-spline teeth 54 defines a plurality of external-spline recesses 73. Each recess of the plurality of external-spline recesses 73 is provided between adjacent two teeth of the plurality of external-spline teeth 54 in the circumferential direction D1. The plurality of external-spline recesses 73 includes a first external-spline recess 73A and a second external-spline recess 73B. The first external-spline recess 73A has a first circumferential width W11 defined in the circumferential direction D1. The second external-spline recess 73B has a second circumferential width W12 defined in the circumferential direction D1. The second circumferential width W12 is different from the first circumferential width W11. The second circumferential width W12 is larger than the first circumferential width W11. However, the second circumferential width W12 can be equal to or smaller than the first circumferential width W11.

In this embodiment, the plurality of external-spline teeth 54 is integrally provided with the tubular body 56 as a one-piece unitary member. However, at least one of the plurality of external-spline teeth 54 can be a separate member from the tubular body 56.

As seen in FIG. 8, the internal spline 52 of the bicycle sprocket arrangement 14 is at least partly provided to the sprocket SP3. In the sprocket SP3, the internal spline 52 includes a plurality of internal-spline teeth 74. The bicycle sprocket arrangement 14 further comprises the annular body SP3A having the rotational center axis A1. The internal spline 52 is provided on an inner periphery of the annular body SP3A. The plurality of internal-spline teeth 74 extends radially inwardly from the annular body SP3A with respect to the rotational center axis A1.

Figure 15:
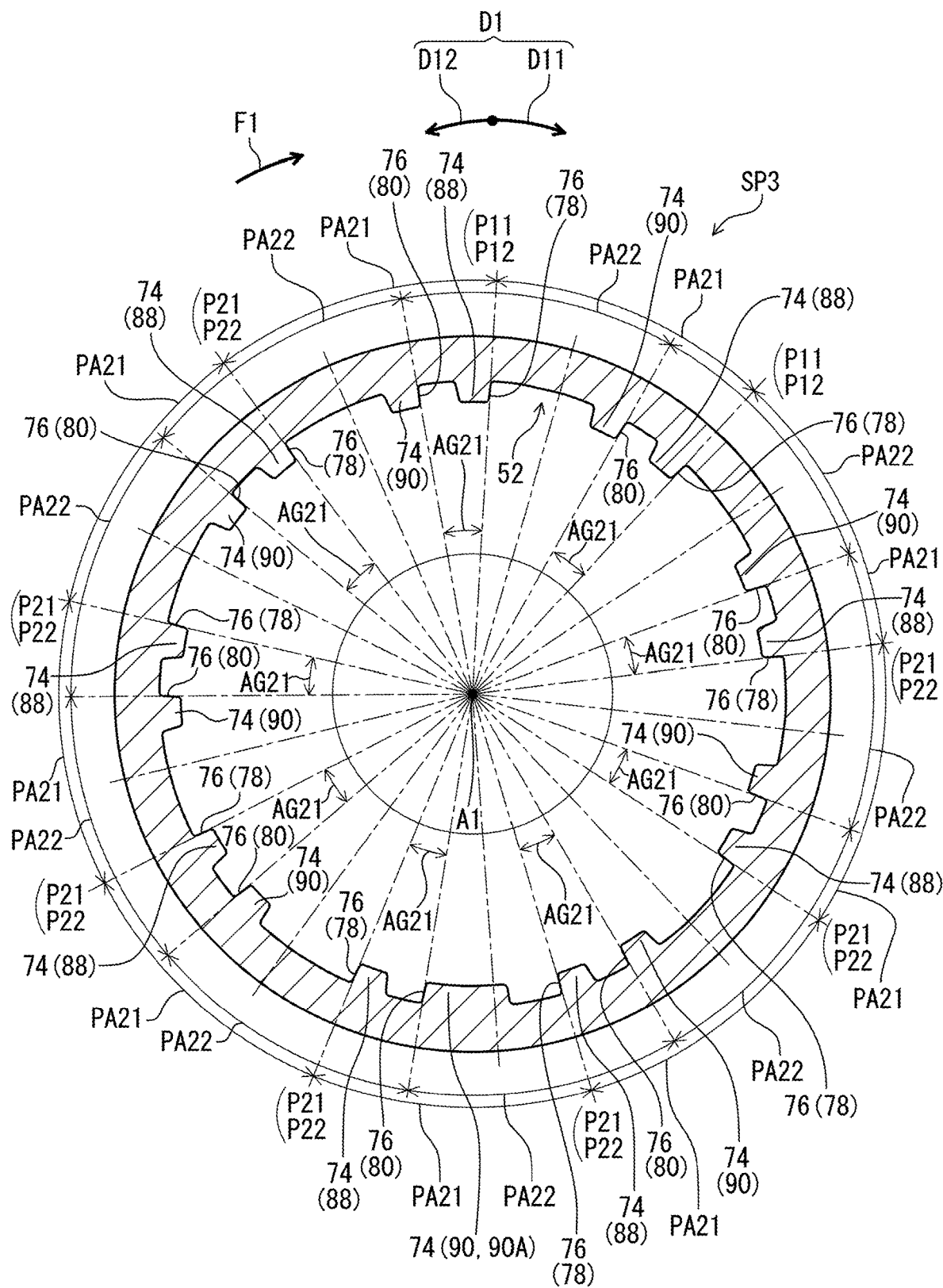
FIG. 15 is a cross-sectional view of an annular body of the sprocket illustrated in FIG. 8 taken along line XV-XV of FIG. 4.

As seen in FIG. 15, the internal spline 52 includes a plurality of internal-spline driving surfaces 76. The plurality of internal-spline driving surfaces 76 is configured to transmit the rotational driving force between the bicycle sprocket arrangement 14 and the bicycle hub assembly 12 in the circumferential direction D1 with respect to the rotational center axis A1 of the bicycle sprocket arrangement 14. In this embodiment, the plurality of internal-spline driving surfaces 76 faces in the driving rotational direction D11 in which the bicycle sprocket arrangement 14 rotates in response to the rotational driving force F1.

The plurality of internal-spline driving surfaces 76 includes at least four first internal-spline driving surfaces 78. The at least four first internal-spline driving surfaces 78 are respectively arranged on at least four of nine first internal-spline driving positions P21 equally arranged in the circumferential direction D1 about the rotational center axis A1 at a first internal-spline pitch angle PA21 which is equal to 40 degrees. In this embodiment, the at least four first internal-spline driving surfaces 78 include nine first internal-spline driving surfaces 78. The nine first internal-spline driving surfaces 78 are equally arranged in the circumferential direction D1 about the rotational center axis A1 at the first internal-spline pitch angle PA21. However, a total number of the first internal-spline driving surfaces 78 is not limited to this embodiment. The first internal-spline pitch angle PA21 is not limited to this embodiment.

The plurality of internal-spline driving surfaces 76 includes at least one second internal-spline driving surface 80. The at least one second internal-spline driving surface 80 offset from the nine first internal-spline driving positions P21 in the circumferential direction D1 about the rotational center axis A1. In this embodiment, the at least one second internal-spline driving surface 80 includes at least three second internal-spline driving surfaces 80. The at least three second internal-spline driving surfaces 80 are offset from the nine first internal-spline driving positions P21 in the circumferential direction D1 about the rotational center axis A1. The at least three second internal-spline driving surfaces 80 are equally arranged in the circumferential direction D1 about the rotational center axis A1 at a second internal-spline pitch angle PA22.

In this embodiment, the at least three second internal-spline driving surfaces 80 include nine second internal-spline driving surfaces 80. The nine second internal-spline driving surfaces 80 are equally arranged in the circumferential direction D1 about the rotational center axis A1 at the second internal-spline pitch angle PA22. The second internal-spline pitch angle PA22 is equal to 40 degrees. However, a total number of the second internal-spline driving surfaces 80 is not limited to this embodiment. The second internal-spline pitch angle PA22 is not limited to this embodiment.

The at least three second internal-spline driving surfaces 80 are offset from the nine first internal-spline driving surfaces 78 in the circumferential direction D1 about the rotational center axis A1 at a first internal-spline offset angle AG21 smaller than the second internal-spline pitch angle PA22. The nine second internal-spline driving surfaces 80 are offset from the nine first internal-spline driving surfaces 78 in the circumferential direction D1 about the rotational center axis A1 at a first internal-spline offset angle AG21. The first internal-spline offset angle AG21 is equal to or smaller than a half of the second internal-spline pitch angle PA22. In this embodiment, the first internal-spline offset angle AG21 is smaller than the half of the second internal-spline pitch angle PA22. The first internal-spline offset angle AG21 is 360/27 degrees. However, the first internal-spline offset angle AG21 is not limited to this embodiment.

The plurality of internal-spline teeth 74 includes at least one first internal-spline tooth 88 and at least one second internal-spline tooth 90. The plurality of internal-spline teeth 74 includes at least four first internal-spline teeth 88 and at least one second internal-spline tooth 90. The at least four first internal-spline teeth 88 respectively are arranged on at least four of nine first internal-spline tooth positions P22 equally arranged in the circumferential direction D1 about the rotational center axis A1 at the first internal-spline pitch angle PA21. The at least one second internal-spline tooth 90 respectively includes the at least one second internal-spline driving surface 80. In this embodiment, the at least four first internal-spline teeth 88 include nine first internal-spline teeth 88. The nine first internal-spline teeth 88 respectively include the nine first internal-spline driving surfaces 78. However, a total number of the first internal-spline teeth 88 is not limited to this embodiment.

The at least one second internal-spline tooth 90 is offset from the nine first internal-spline tooth positions P22 in the circumferential direction D1 about the rotational center axis A1. The at least four first internal-spline teeth 88 respectively include the at least four first internal-spline driving surfaces 78. The at least one second internal-spline tooth 90 includes at least three second internal-spline teeth 90. The at least three second internal-spline teeth 90 are offset from the nine first internal-spline tooth positions P22 in the circumferential direction D1 about the rotational center axis A1. The at least three second internal-spline teeth 90 respectively include the at least three second internal-spline driving surfaces 80. In this embodiment, the at least three second internal-spline teeth 90 include nine second internal-spline teeth 90. The nine second internal-spline teeth 90 are offset from the nine first internal-spline tooth positions P22 in the circumferential direction D1 about the rotational center axis A1. The nine second internal-spline teeth 90 respectively include the nine second internal-spline driving surfaces 90. However, a total number of the second internal-spline teeth 90 is not limited to this embodiment.

The internal spline 52 includes 27 internal-spline driving positions equally arranged in the circumferential direction D1 about the rotational center axis A1. In FIG. 15, the 27 internal-spline driving positions are indicated with chain lines extending radially outwardly from the rotational center axis A1. Nine of the 27 internal-spline driving positions respectively coincide with the nine first internal-spline driving positions P21. Each of the nine first internal-spline driving surfaces 78 and the nine second internal-spline driving surfaces 80 is arranged on any one of the 27 internal-spline driving positions.

In this embodiment, the nine first internal-spline teeth 88 have the same cross-sectional shape as each other on a plane perpendicular to the rotational center axis A1. At least one of the nine second internal-spline teeth 90 has a cross-sectional shape different from a cross-sectional shape of another of the nine second internal-spline teeth 90 on the plane perpendicular to the rotational center axis A1. In this embodiment, the second internal-spline tooth 90A of the nine second internal-spline teeth 90 has a cross-sectional shape different from a cross-sectional shape of another of the nine second internal-spline teeth 90 on the plane perpendicular to the rotational center axis A1. However, at least one first internal-spline tooth 88 of the nine first internal-spline teeth 88 can have a shape different from a shape of another of the nine first internal-spline teeth 88. The nine second internal-spline teeth 90 can have the same cross-sectional shape as each other. The plurality of internal-spline teeth 74 can have the same cross-sectional shape as each other.

Figure 16:
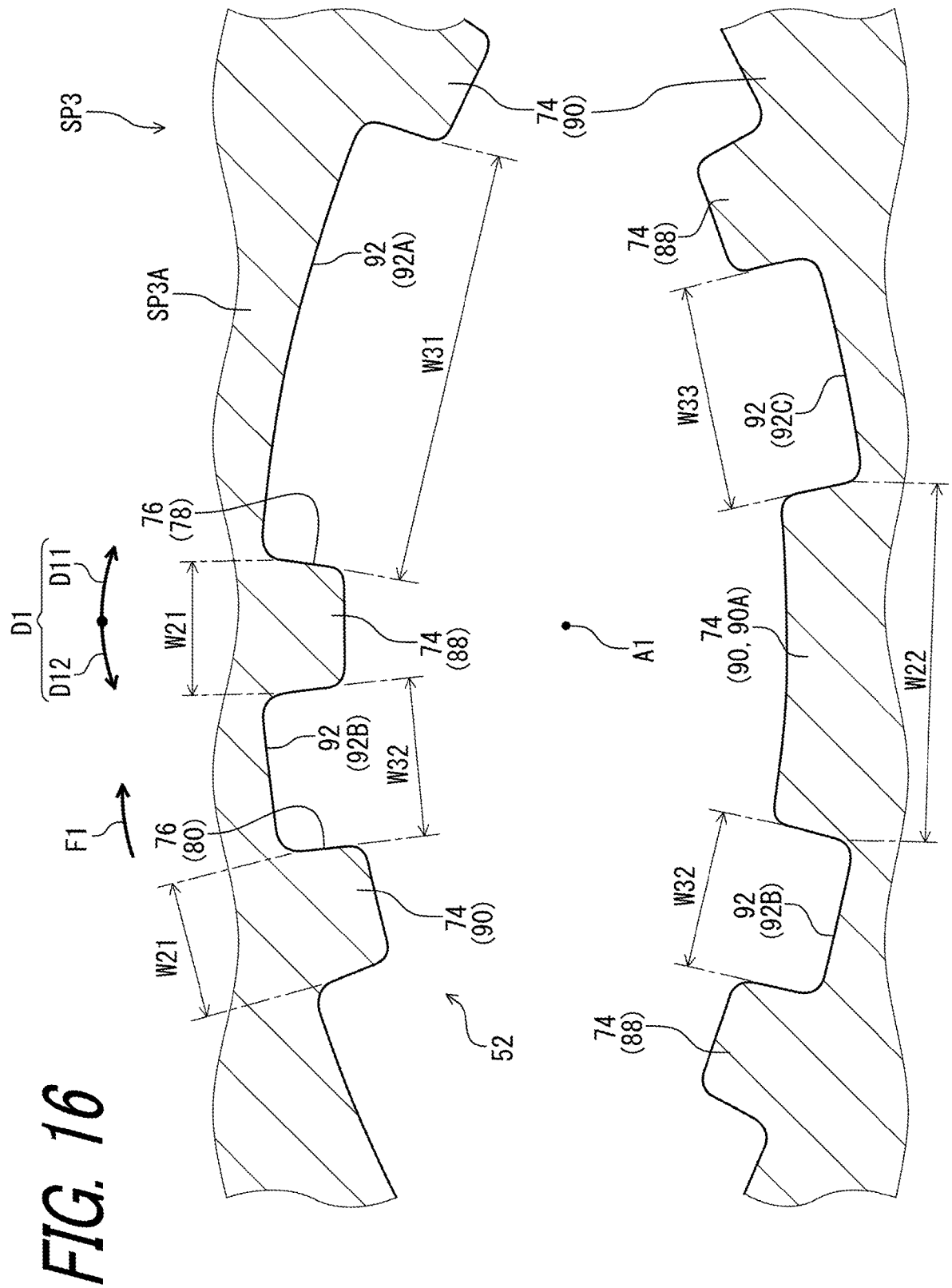
FIG. 16 is a partial enlarged cross-sectional view of the annular body of the sprocket illustrated in FIG. 15.

As seen in FIG. 16, at least one spline tooth of the at least three second internal-spline teeth 90 has a first internal-spline circumferential width W21 defined in the circumferential direction D1. Another spline tooth of the at least three second internal-spline teeth 90 has a second internal-spline circumferential width W22 defined in the circumferential direction D1. The second internal-spline circumferential width W22 is different from the first internal-spline circumferential width W21. In this embodiment, the second internal-spline tooth 90A has the second internal-spline circumferential width W22. The second internal-spline circumferential width W22 is larger than the first internal-spline circumferential width W21. However, the second internal-spline circumferential width W22 can be equal to or smaller than the first internal-spline circumferential width W21.

The plurality of internal-spline teeth 74 defines a plurality of internal-spline recesses 92. Each of the plurality of internal-spline recesses 92 is provided between adjacent two teeth of the plurality of internal-spline teeth 74 in the circumferential direction D1. The plurality of internal-spline recesses 92 includes a first internal-spline recess 92A and a second internal-spline recess 92B. The plurality of internal-spline recesses 92 includes a third internal-spline recess 92C. The first internal-spline recess 92A has a first internal-spline recess width W31 defined in the circumferential direction D1. The second internal-spline recess 92B has a second internal-spline recess width W32 defined in the circumferential direction D1. The third internal-spline recess 92C has a third internal-spline recess width W33 defined in the circumferential direction D1. The second internal-spline recess width W32 is different from the first internal-spline recess width W31. The third internal-spline recess width W33 is different from the first internal-spline recess width W31 and the second internal-spline recess width W32. In this embodiment, the first internal-spline recess width W31 is larger than the second internal-spline recess width W32 and the third internal-spline recess width W33. The third internal-spline recess width W33 is larger than the second internal-spline recess width W32. However, the first internal-spline recess width W31 can be equal to or smaller than the second internal-spline recess width W32 and the third internal-spline recess width W33. The third internal-spline recess width W33 can be equal to or smaller than the second internal-spline recess width W32.

Figure 17:
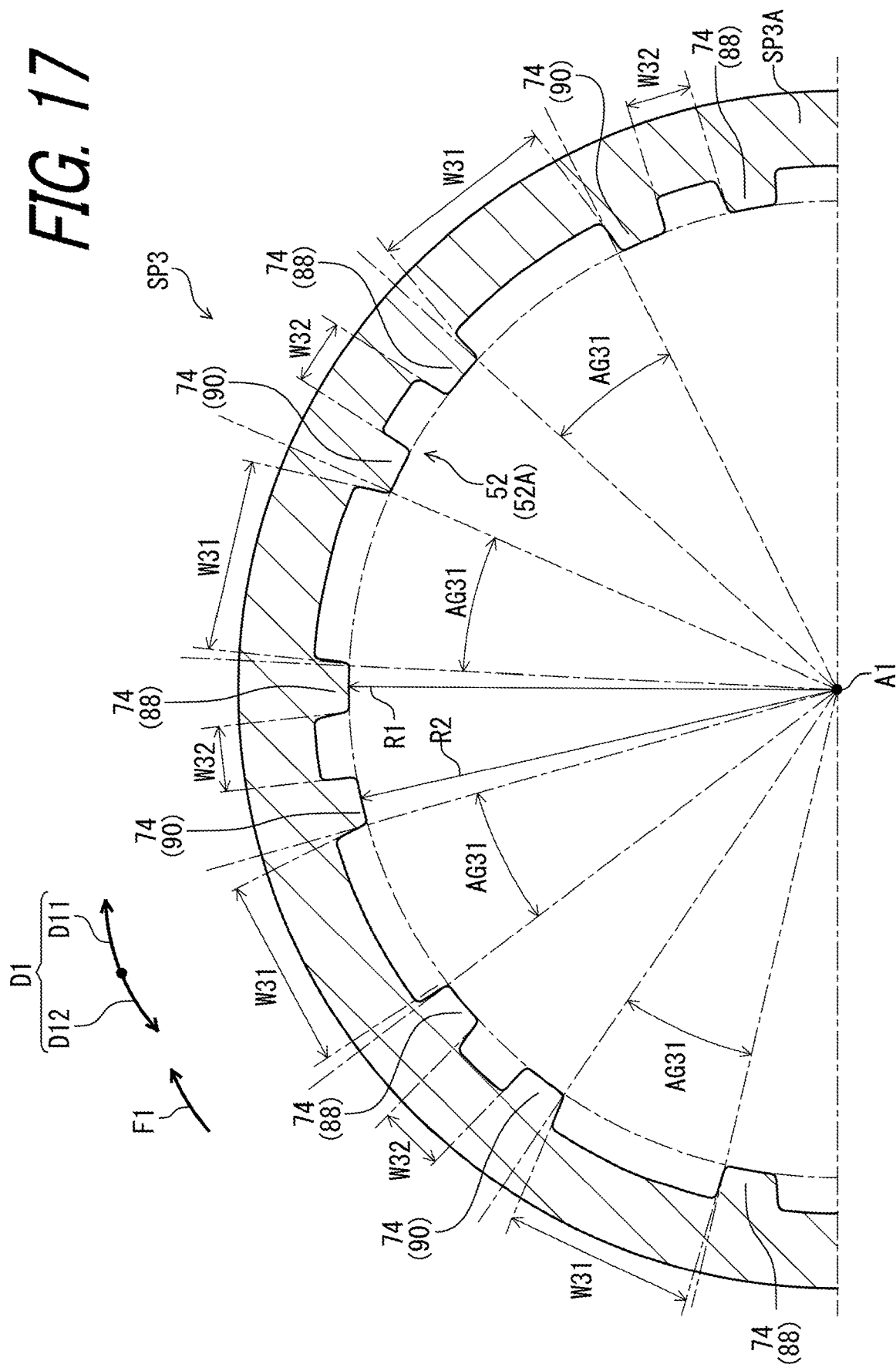
FIG. 17 is another partial enlarged cross-sectional view of the annular body of the sprocket illustrated in FIG. 15.

As seen in FIG. 17, the at least one second internal-spline tooth 90 is arranged between adjacent two first internal-spline teeth 88 adjacently arranged in the circumferential direction D1 at the first internal-spline pitch angle PA21 which is equal to 40 degrees. The at least one second internal-spline tooth 90 and one of the adjacent two first internal-spline teeth 88 defines the first internal-spline recess 92A. The first internal-spline recess width W31 defines a first clearance angle AG31 in the circumferential direction D1 about the rotational center axis A1. The first clearance angle AG31 is larger than 15 degrees. The first clearance angle AG31 is preferably equal to or larger than 18 degrees. The first clearance angle AG31 is more preferably equal to or larger than 20 degrees. In this embodiment, the first clearance angle AG31 is 21 degrees and has tolerance of plus or minus 0.5 degrees. However, the first clearance angle AG31 is not limited to this embodiment and the above ranges.

The at least four first internal-spline teeth 88 include a first innermost radius R1 defined with respect to the rotational center axis A1. The first innermost radius R1 is larger than 32 mm. In this embodiment, the nine first internal-spline teeth 88 define the first innermost radius R1 with respect to the rotational center axis A1. The first innermost radius R1 is 32.5 mm. However, the first innermost radius R1 is not limited to this embodiment and the above range. The first innermost radius R1 is substantially equal to a half of an internal-spline minor diameter of the internal spline 52.

The at least one second internal-spline tooth 90 include a second innermost radius R2 defined with respect to the rotational center axis A1. The second innermost radius R2 is larger than 32 mm. In this embodiment, the nine second internal-spline tooth 90 define the second innermost radius R2 with respect to the rotational center axis A1. The second innermost radius R2 is 32.5 mm and is equal to the first innermost radius R1. However, the second innermost radius R2 is not limited to this embodiment and the above range. The second innermost radius R2 can be different from the first innermost radius R1. The second innermost radius R2 is substantially equal to the half of the internal-spline minor diameter of the internal spline 52.

As seen in FIG. 9, the internal spline 52 of the bicycle sprocket arrangement 14 is at least partly provided to the sprocket SP4. In the sprocket SP4, the internal spline 52 includes a plurality of internal-spline teeth 94. The bicycle sprocket arrangement 14 further comprises the annular body SP4A having the rotational center axis A1. The internal spline 52 is provided on an inner periphery of the annular body SP4A of the sprocket SP3. The plurality of internal-spline teeth 94 extends radially inwardly from the annular body SP4A with respect to the rotational center axis A1. The internal spline 52 of the sprocket SP4 has substantially the same structure as the structure of the internal spline 52 of the sprocket SP3. The description and depiction of the internal spline 52 of the sprocket SP3 can apply to the internal spline 52 of the sprocket SP4 by replacing "74" with "94." Thus, it will not be described in detail here for the sake of brevity.

Figure 18:
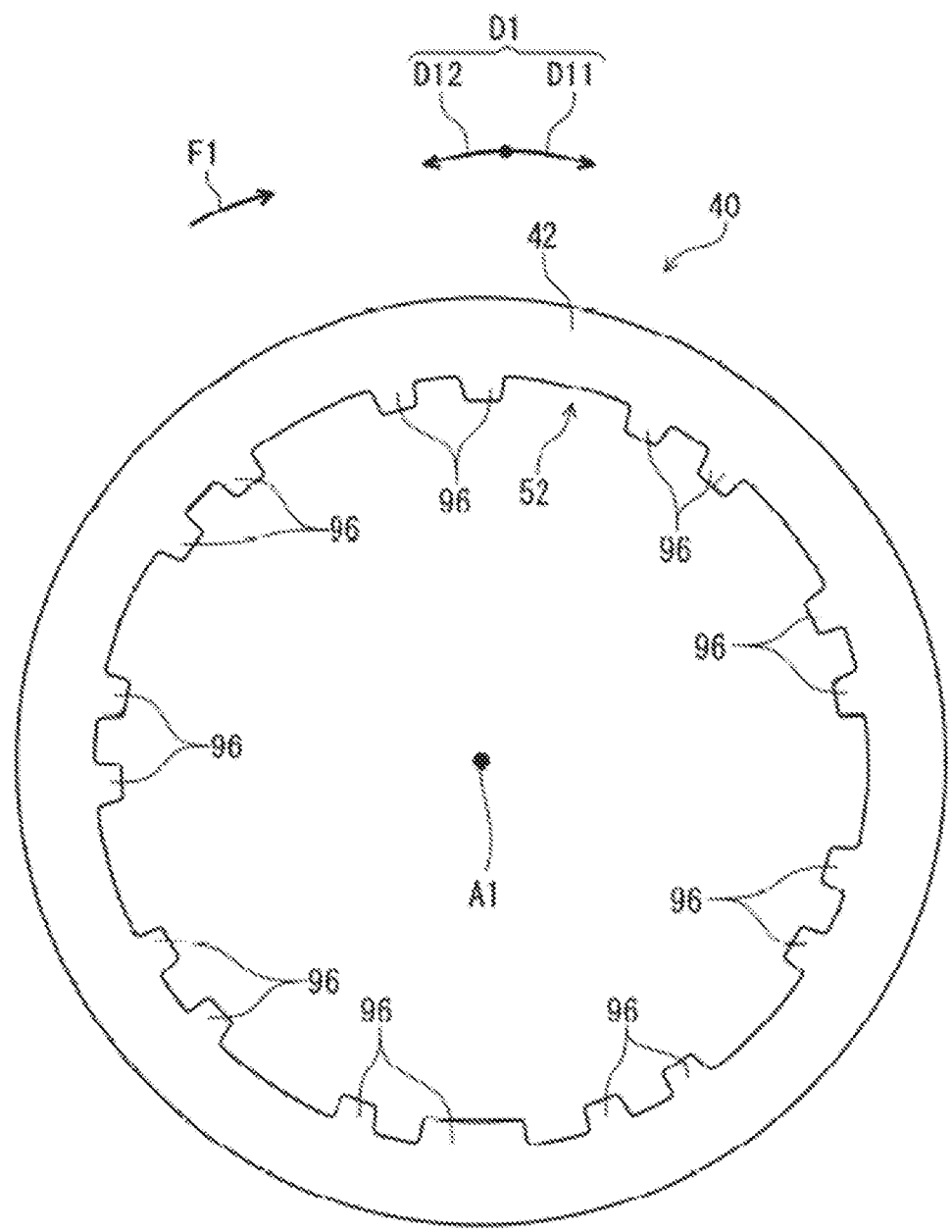
FIG. 18 is a side elevational view of an annular body of a sprocket carrier of the bicycle sprocket arrangement illustrated in FIG. 2.

As seen in FIG. 18, the internal spline 52 of the bicycle sprocket arrangement 14 is at least partly provided to the sprocket carrier 40. In the sprocket carrier 40, the internal spline 52 includes a plurality of internal-spline teeth 96. The bicycle sprocket arrangement 14 further comprises the annular body 42 having the rotational center axis A1. The internal spline 52 is provided on an inner periphery of the annular body 42 of the sprocket carrier 40. The plurality of internal-spline teeth 96 extends radially inwardly from the annular body 42 with respect to the rotational center axis A1. The internal spline 52 of the sprocket carrier 40 has substantially the same structure as the structure of the internal spline 52 of the sprocket SP3. The description and depiction of the internal spline 52 of the sprocket SP3 can apply to the internal spline 52 of the sprocket carrier 40 by replacing "74" with "96." Thus, it will not be described in detail here for the sake of brevity.

Figure 19:
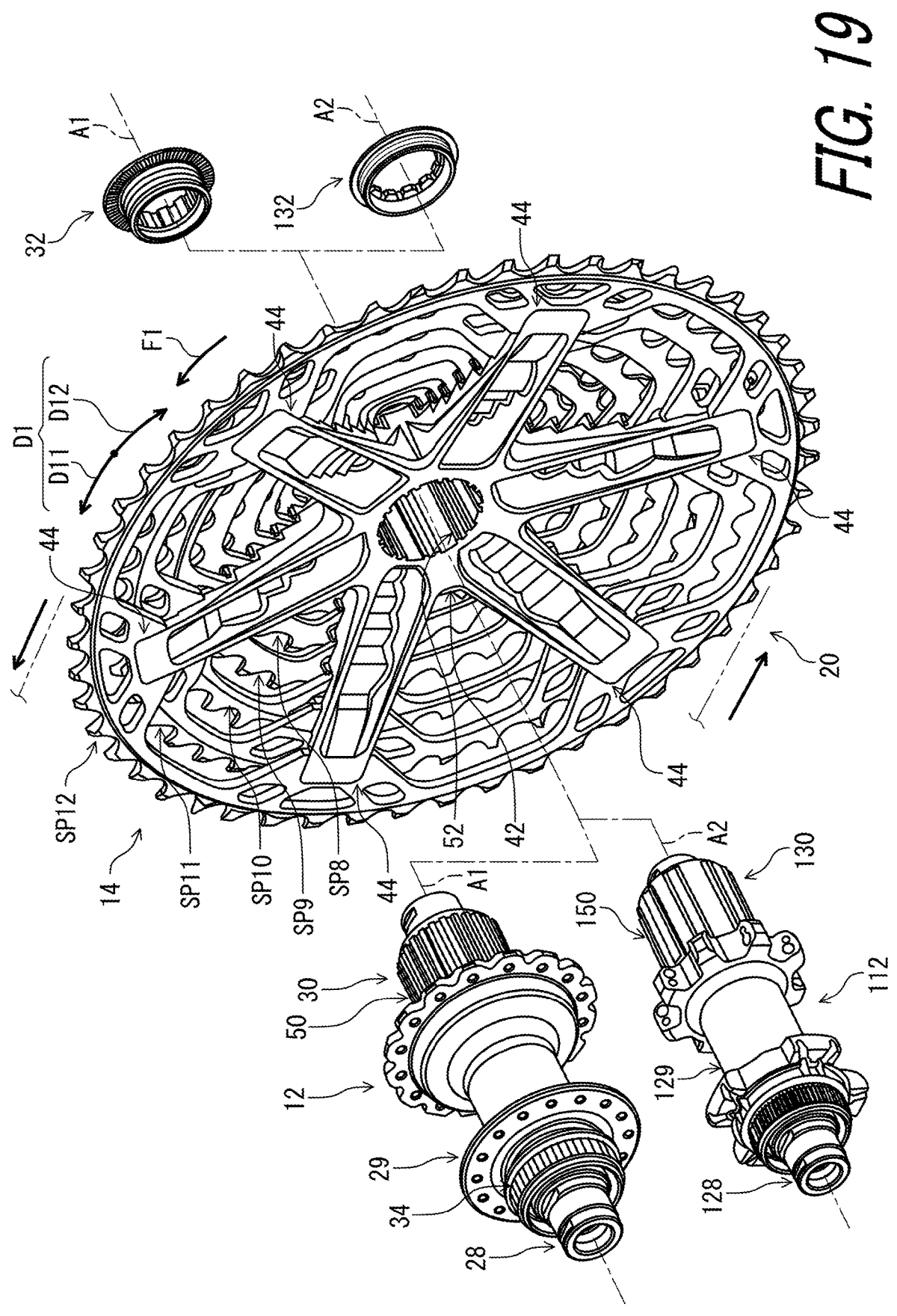

As seen in FIG. 19, the bicycle sprocket arrangement 14 is configured to be mounted to each of the bicycle hub assembly 12 and an additional bicycle hub assembly 112. The additional bicycle hub assembly 112 includes an additional sprocket support body 130. The additional sprocket support body 130 includes an additional external spline 150. The external spline 50 of the bicycle hub assembly 12 and the additional external spline 150 of the additional bicycle hub assembly 112 are different from each other. However, the additional external spline 150 is configured to be engaged with the internal spline 52 of the bicycle sprocket arrangement 14.

Figure 20:
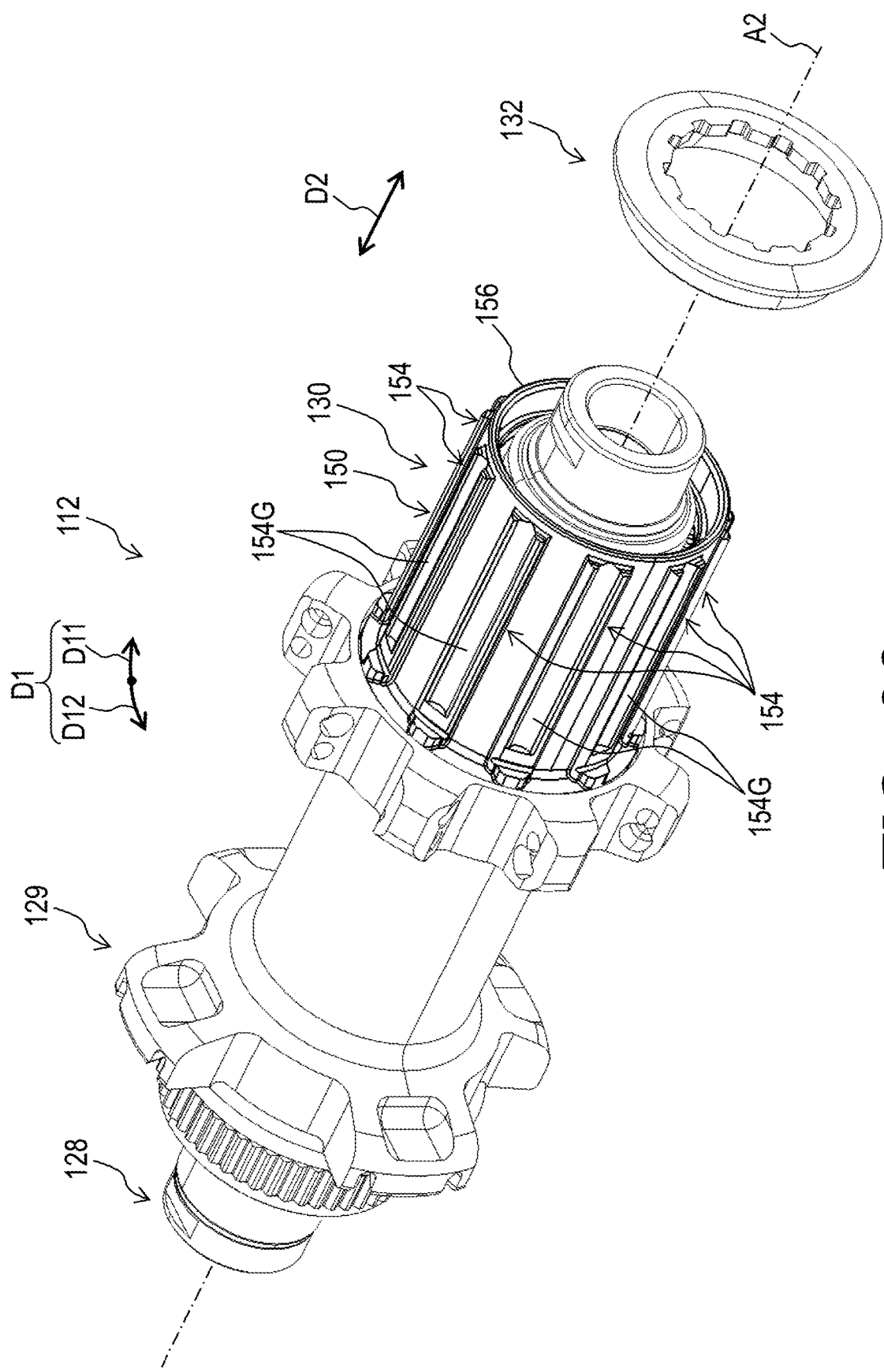
FIG. 20 is a perspective view of the additional bicycle hub assembly illustrated in FIG. 19.

As seen in FIG. 20, the additional sprocket support body 130 includes a hub axle 128, a hub body 129, and a lock member 132. The hub axle 128, the hub body 129, and the lock member 132 have substantially the same structures as the structures of the hub axle 28, the hub body 29, and the lock member 32 of the bicycle hub assembly 12, respectively. The additional sprocket support body 130 is rotatably mounted on the hub axle 128 about a rotational center axis A2.

The additional external spline 150 includes a plurality of external-spline teeth 154. The additional sprocket support body 130 further comprises a tubular body 156 having the rotational center axis A2. The additional external spline 150 is provided on the tubular body 156. The plurality of external-spline teeth 154 extends radially outwardly from the tubular body 156 with respect to the rotational center axis A2. The additional external-spline tooth 154 includes an intermediate groove 154G.

Figure 21:
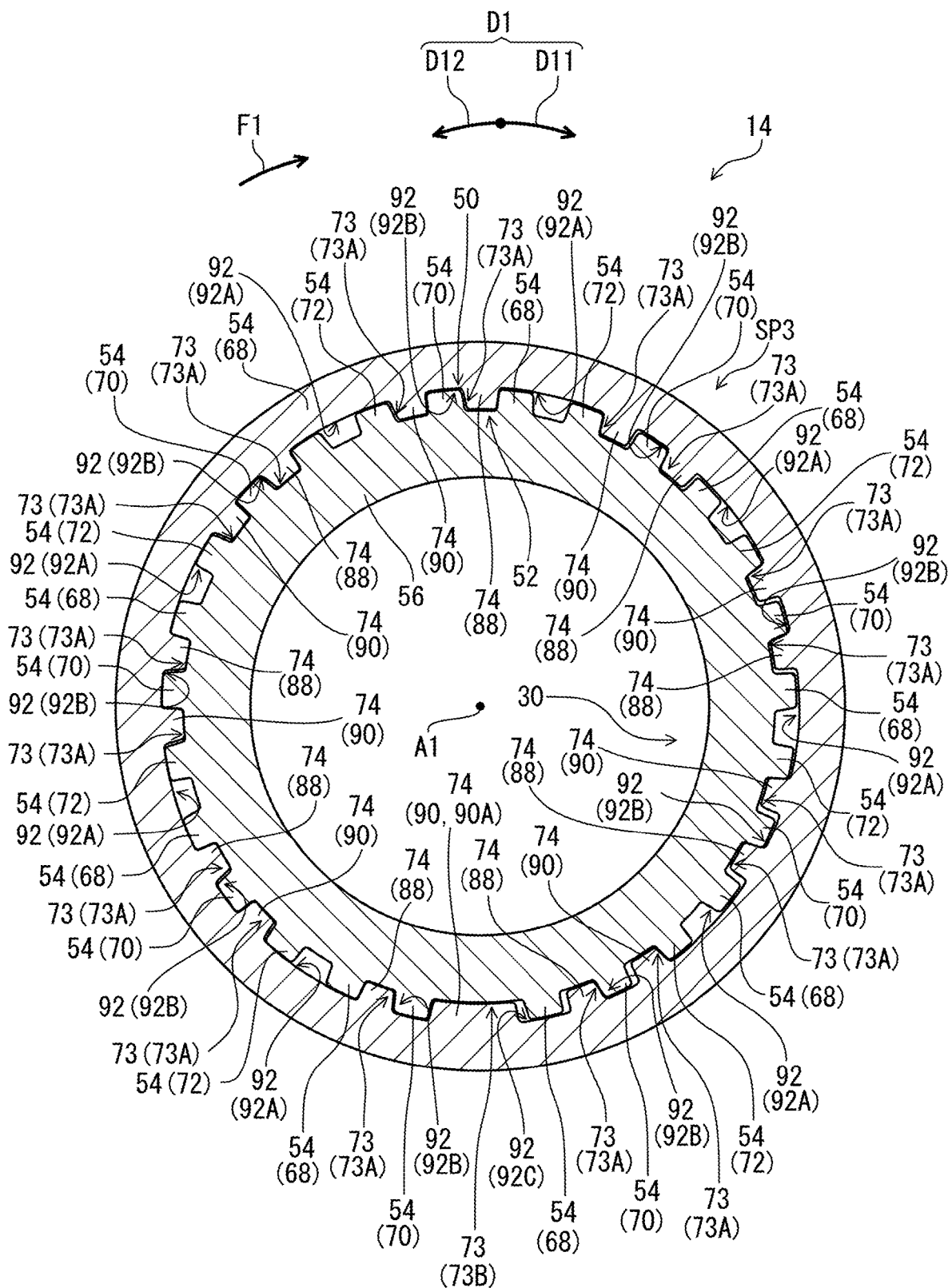
FIG. 21 is a cross-sectional view of the sprocket support body illustrated in FIG. 13 and the annular body of the sprocket illustrated in FIG. 15 taken along line XV-XV of FIG. 4.

As seen in FIG. 21, the internal spline 52 is configured to be engaged with the external spline 50 of the sprocket support body 30 of the bicycle hub assembly 12 in a first state where the bicycle sprocket arrangement 14 is mounted to the bicycle hub assembly 12. The at least one first internal-spline tooth 88 is configured to be engaged with at least one first external-spline tooth 68 of the external spline 50 in the first state where the bicycle sprocket arrangement 14 is mounted to the bicycle hub assembly 12. The at least one second internal-spline tooth 90 is configured to be engaged with at least one second external-spline tooth 70 of the external spline 50 in the first state where the bicycle sprocket arrangement 14 is mounted to the bicycle hub assembly 12. The at least one second internal-spline tooth 90 is configured not to be engaged with at least one first external-spline tooth 68 of the external spline 50 in the first state where the bicycle sprocket arrangement 14 is mounted to the bicycle hub assembly 12. The second internal-spline tooth 90 of the internal spline 52 is spaced apart from the first external-spline tooth 68 of the external spline 50 in the first state.

The first external-spline tooth 68 and the second external-spline tooth 70 which are adjacent to each other without another external-spline tooth are provided in the first internal-spline recess 92A defined between the first internal-spline tooth 88 and the second internal-spline tooth 90. The second external-spline tooth 70 is provided in the second internal-spline recess 92B defined between the first internal-spline tooth 88 and the second internal-spline tooth 90.

The first internal-spline tooth 88 is provided in the first external-spline recess 73A defined between the first external-spline tooth 68 and the second external-spline tooth 70. The second internal-spline tooth 90 is provided in the first external-spline recess 73A defined between the second external-spline tooth 70 and the third external-spline tooth 72. The second internal-spline tooth 90A of the nine second internal-spline teeth 90 is provided in the second external-spline recess 73B defined between the second external-spline tooth 70 and the third external-spline tooth 72.

Figure 22:
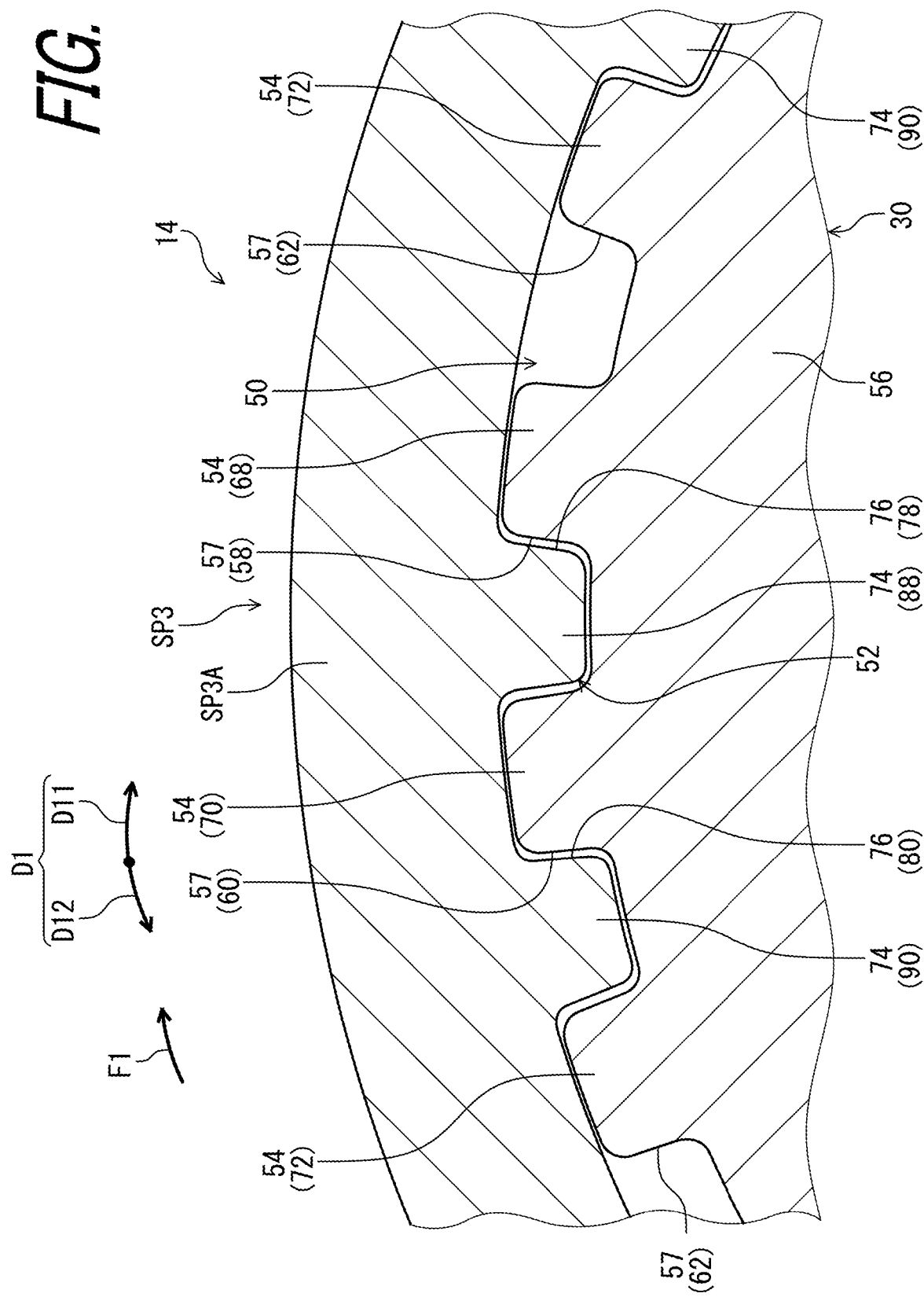
FIG. 22 is a partial enlarged cross-sectional view of the sprocket support body and the annular body of the sprocket illustrated in FIG. 21.

As seen in FIG. 22, the first external-spline driving surface 58 of the first external-spline tooth 68 is contactable with the first internal-spline driving surface 78 of the first internal-spline tooth 88 to transmit the rotational driving force F1 from the bicycle sprocket arrangement 14 to the sprocket support body 30. The second external-spline driving surface 60 of the second external-spline tooth 70 is contactable with the second internal-spline driving surface 78 of the second internal-spline tooth 90 to transmit the rotational driving force F1 from the bicycle sprocket arrangement 14 to the sprocket support body 30. The third external-spline driving surface 62 of the third external-spline tooth 72 is configured not to transmit the rotational driving force F1 in the first state where the bicycle sprocket arrangement 14 is mounted to the bicycle hub assembly 12.

Figure 23:
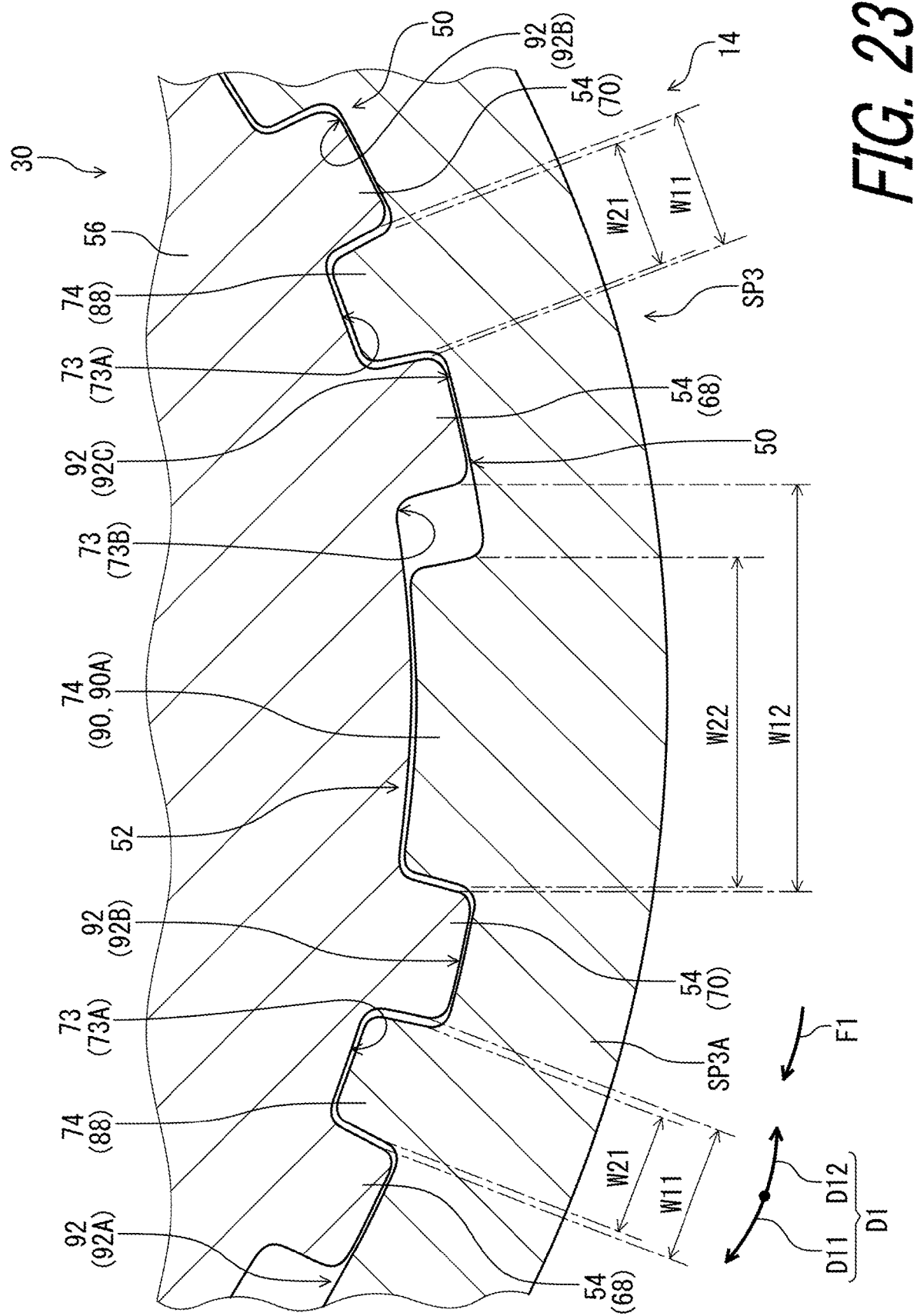
FIG. 23 is another partial enlarged cross-sectional view of the sprocket support body and the annular body of the sprocket illustrated in FIG. 21.

As seen in FIG. 23, the second circumferential width W12 of the second external-spline recess 73B is larger than the second internal-spline circumferential width W22 of the second internal-spline tooth 90A. Thus, the second circumferential width W12 allows the second internal-spline tooth 90A to be provided in the second external-spline recess 73B. However, the first circumferential width W11 of the first external-spline recess 73A is smaller than the second internal-spline circumferential width W22 of the second internal-spline tooth 90A. Thus, the first circumferential width W11 prevents the second internal-spline tooth 90A from being inserted into the first external-spline recess 73A.

Figure 24:
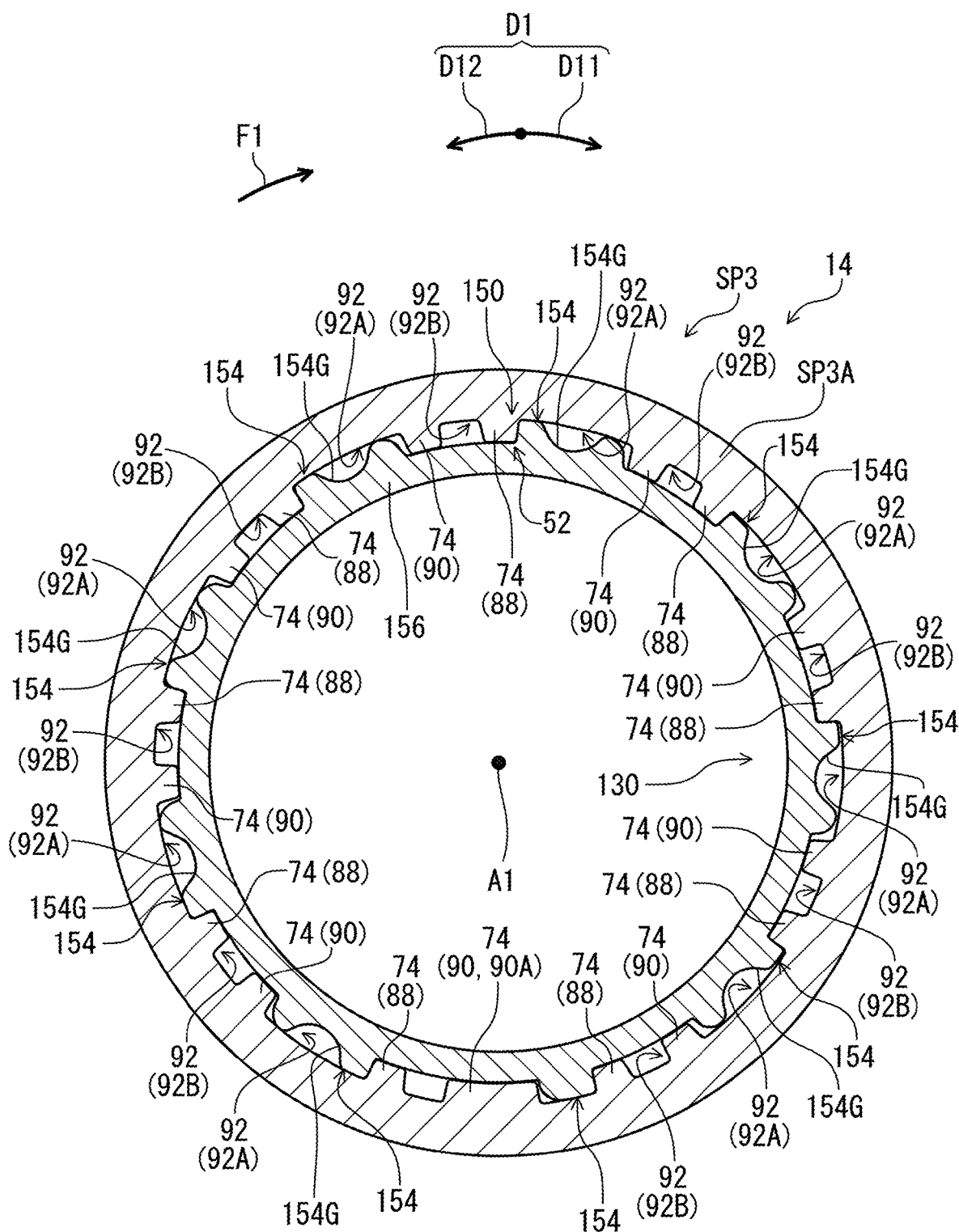
FIG. 24 is a cross-sectional view of an additional sprocket support body of the additional bicycle hub assembly illustrated in FIG. 20 and the annular body of the sprocket illustrated in FIG. 15 taken along line XV-XV of FIG. 4.

As seen in FIG. 24, the internal spline 52 is configured to be engaged with the additional external spline 150 of the additional sprocket support body 130 of the additional bicycle hub assembly 112 in a second state where the bicycle sprocket arrangement 14 is mounted to the additional bicycle hub assembly 112. The at least one first internal-spline tooth 88 is configured to be engaged with at least one external-spline tooth 154 of the additional external spline 150 in the second state where the bicycle sprocket arrangement 14 is mounted to the additional bicycle hub assembly 112. However, the at least one second internal-spline tooth 90 is configured not to be engaged with the at least one external-spline tooth 154 of the additional external spline 150 in the second state where the bicycle sprocket arrangement 14 is mounted to the additional bicycle hub assembly 112. The second internal-spline tooth 90 of the internal spline 52 is spaced apart from the external-spline tooth 154 of the external spline 50 in the second state.

Figure 25:
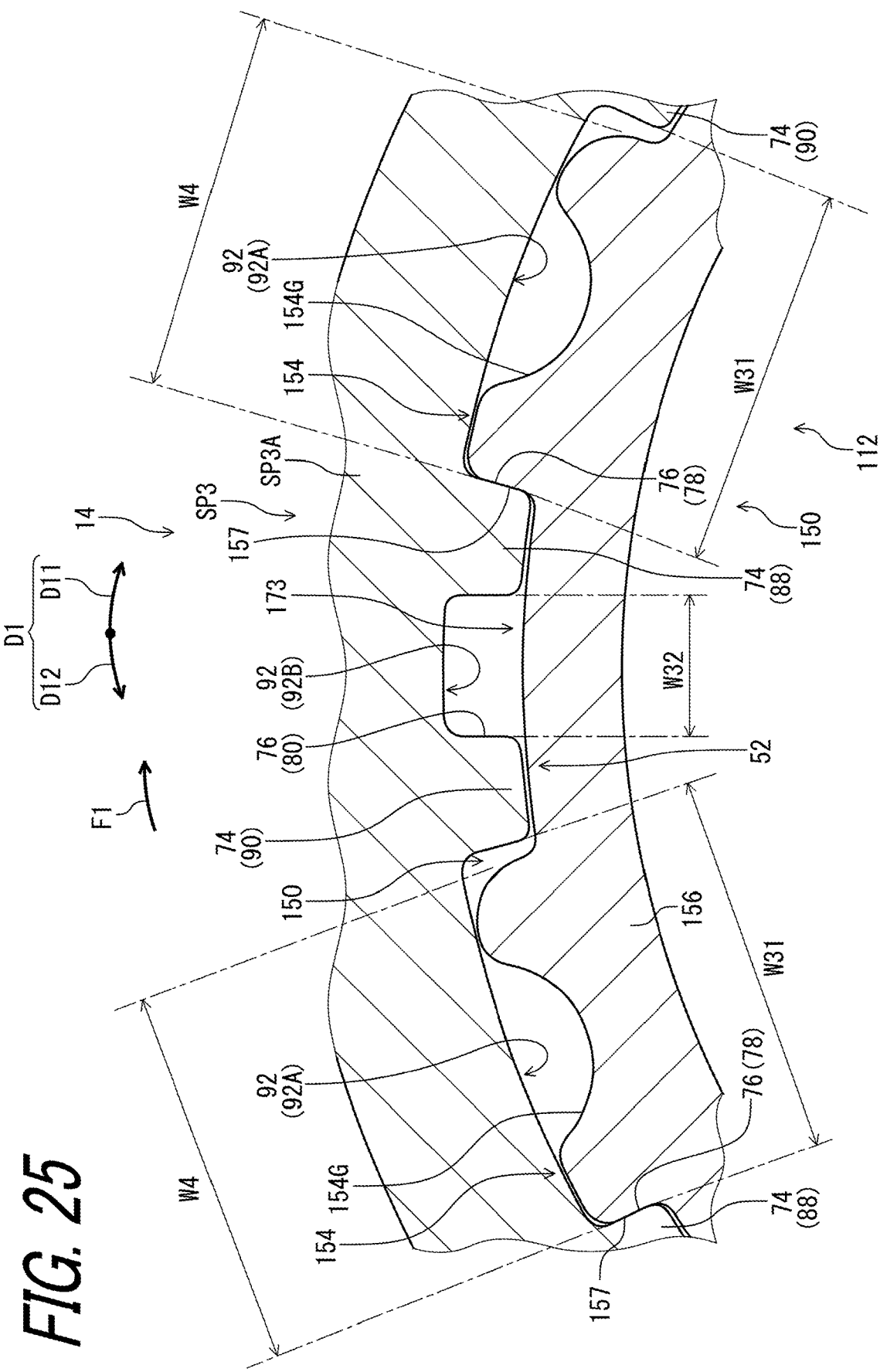
FIG. 25 is a partial enlarged cross-sectional view of the additional sprocket support body and the annular body of the sprocket illustrated in FIG. 24.

As seen in FIG. 25, the external-spline tooth 154 is provided in the first internal-spline recess 92A defined between the first internal-spline tooth 88 and the second internal-spline tooth 90. The first internal-spline tooth 88 and the second internal-spline tooth 90 are provided in a recess 173 provided between adjacent two of the plurality of external-spline teeth 154.

The external-spline tooth 154 has a circumferential width W4 defined in the circumferential direction D1. The first internal-spline recess width W31 of the first internal-spline recess 92A is larger than the circumferential width W4 of the external-spline tooth 154. Thus, the first internal-spline recess width W31 allows the external-spline tooth 154 to be provided in the first internal-spline recess 92A. However, the second internal-spline recess width W32 of the second internal-spline recess 92B is smaller than the circumferential width W4 of the external-spline tooth 154. Thus, the second internal-spline recess width W32 prevents the external-spline tooth 154 from being inserted into the second internal-spline recess 92B.

The external-spline tooth 154 of the additional external spline 150 includes an external-spline driving surface 157. The external-spline driving surface 157 of the external-spline tooth 154 is contactable with the first internal-spline driving surface 78 of the first internal-spline tooth 88 to transmit the rotational driving force F1 from the bicycle sprocket arrangement 14 to the additional sprocket support body 130. The external-spline driving surface 157 of the external-spline tooth 154 is spaced apart from the second internal-spline driving surface 80 of the second internal-spline tooth 90 so as not to transmit the rotational driving force F1 from the bicycle sprocket arrangement 14 to the additional sprocket support body 130.

As seen in FIGS. 21 and 23, the additional external spline 150 has a cross-sectional shape different from the cross-sectional shape of the external spline 50 of the sprocket support body 30. Since the internal spline 52 of the bicycle sprocket arrangement 14 includes the above-mentioned structure, however, the internal spline 52 is configured to be compatible with each of the external spline 50 of the bicycle hub assembly 12 and the additional external spline 150 of the additional bicycle hub assembly 112.

Figure 26:
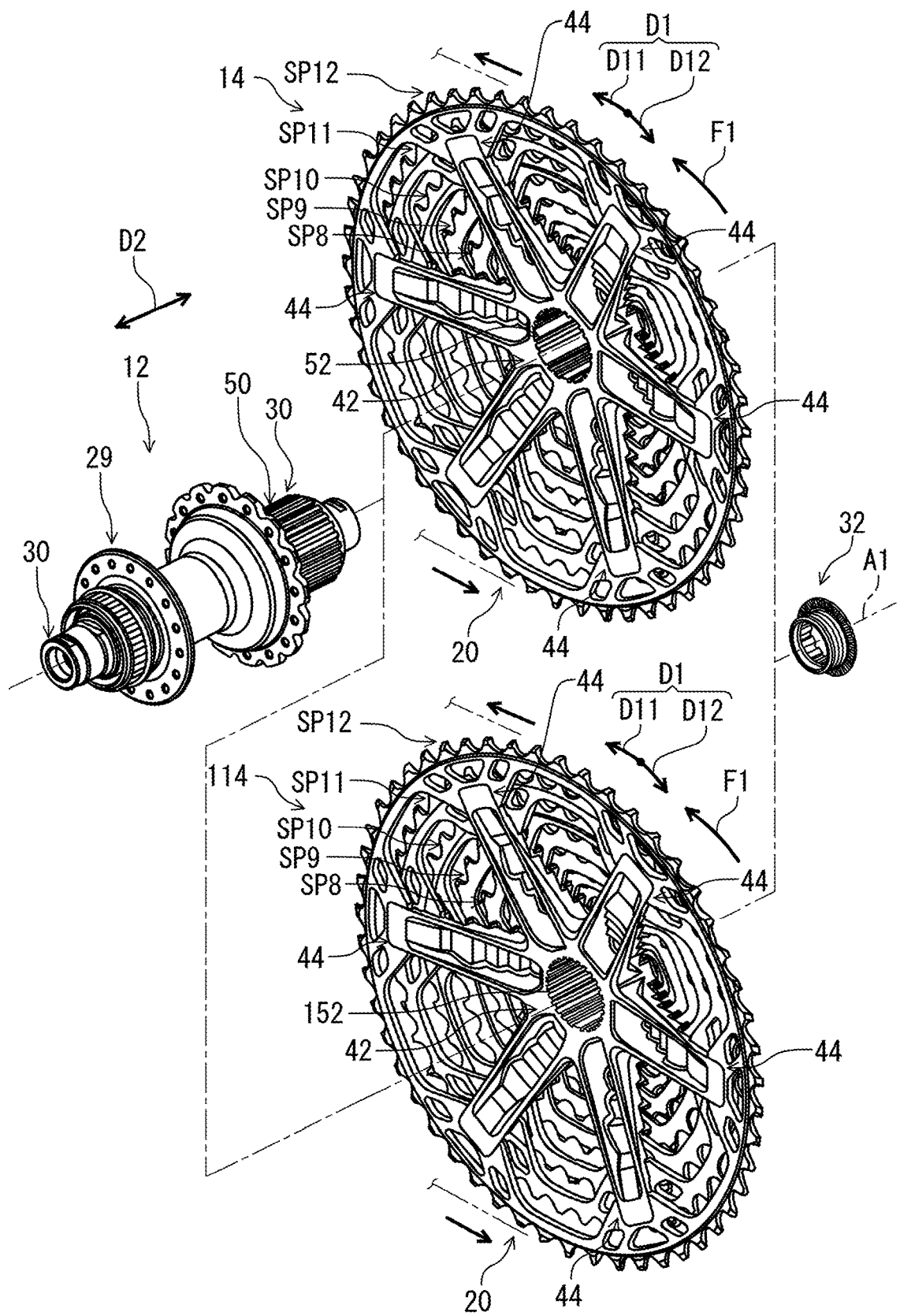
FIG. 26 is an exploded perspective view showing compatibility of the bicycle hub assembly with each of the bicycle sprocket arrangement illustrated in FIG. 3 and an additional bicycle sprocket arrangement.

As seen in FIG. 26, the bicycle hub assembly 12 is configured to be compatible with each of the bicycle sprocket arrangement 14 and an additional bicycle sprocket arrangement 114. The additional bicycle sprocket arrangement 114 includes an additional internal spline 152. The internal spline 52 of the bicycle sprocket arrangement 14 and the additional internal spline 152 of the additional bicycle sprocket arrangement 114 are different from each other. However, the additional internal spline 152 is configured to be engaged with the external spline 50 of the bicycle hub assembly 12. The additional bicycle sprocket arrangement 114 has substantially the same structure as the structure of the bicycle sprocket arrangement 14 except for the additional internal spline 152. The additional internal spline 152 can also be referred to as an internal spline 152.

Figure 27:
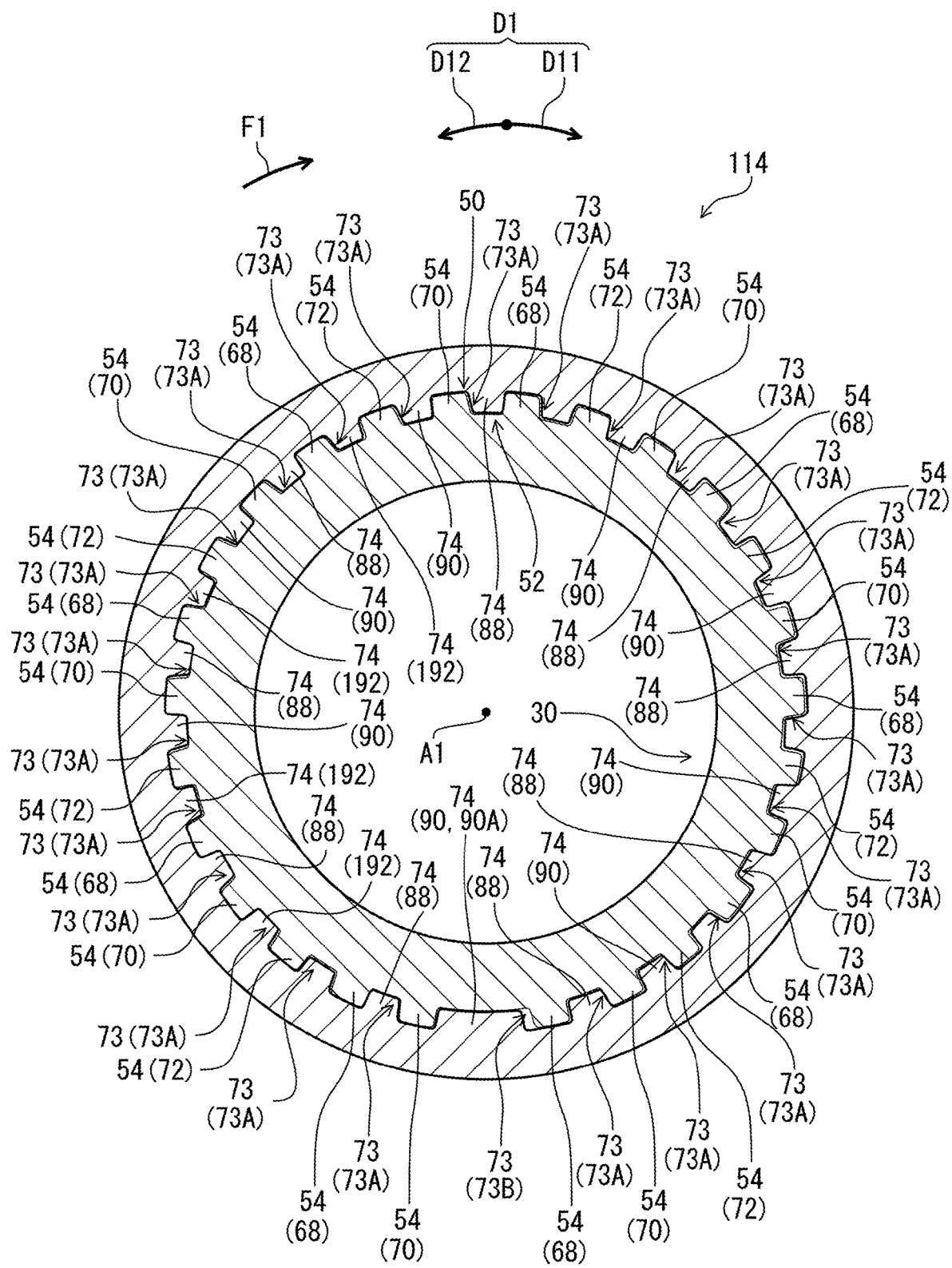
FIG. 27 is a cross-sectional view of the sprocket support body and an annular body of a sprocket of the additional bicycle sprocket arrangement illustrated in FIG. 26 taken along a line at a same location as line XV-XV of FIG. 4.

As seen in FIG. 27, the additional internal spline 152 is configured to be engaged with the external spline 50 of the sprocket support body 30 of the bicycle hub assembly 12 in a first state where the additional bicycle sprocket arrangement 114 is mounted to the bicycle hub assembly 12. As with the internal spline 52 of the bicycle sprocket arrangement 14, the additional internal spline 152 includes the plurality of internal-spline teeth 74. The plurality of internal-spline teeth 174 includes at least one first internal-spline tooth 88 and at least one second internal-spline tooth 90. The plurality of internal-spline teeth 74 includes the nine first internal-spline teeth 88 and the nine second internal-spline teeth 90. However, the plurality of internal-spline teeth 74 of the additional internal spline 152 further includes at least one third internal-spline tooth 192. In this embodiment, the at least one third internal-spline tooth 192 includes eight third internal-spline teeth 192. The third internal-spline tooth 192 is provided between the first internal-spline tooth 88 and the second internal-spline tooth 90 in the circumferential direction D1.

The at least one first internal-spline tooth 88 is configured to be engaged with at least one first external-spline tooth 68 of the external spline 50. The at least one second internal-spline tooth 90 is configured to be engaged with at least one second external-spline tooth 70 of the external spline 50. The at least one third internal-spline tooth 192 is configured to be engaged with at least one third external-spline tooth 72 of the external spline 50.

The first internal-spline tooth 88 is provided in the first external-spline recess 73A defined between the first external-spline tooth 68 and the second external-spline tooth 70. The second internal-spline tooth 90 is provided in the first external-spline recess 73A defined between the second external-spline tooth 70 and the third external-spline tooth 72. The third internal-spline tooth 192 is provided in the first external-spline recess 73A defined between the first external-spline tooth 68 and the third external-spline tooth 72. The second internal-spline tooth 90A of the nine second internal-spline teeth 90 is provided in the second external-spline recess 73B defined between the second external-spline tooth 70 and the third external-spline tooth 72.

The first external-spline driving surface 58 of the first external-spline tooth 68 is contactable with the first internal-spline driving surface 78 of the first internal-spline tooth 88 to transmit the rotational driving force F1 from the bicycle sprocket arrangement 14 to the sprocket support body 30. The second external-spline driving surface 60 of the second external-spline tooth 70 is contactable with the second internal-spline driving surface 78 of the second internal-spline tooth 90 to transmit the rotational driving force F1 from the bicycle sprocket arrangement 14 to the sprocket support body 30. The third external-spline driving surface 62 of the third external-spline tooth 72 is configured not to transmit the rotational driving force F1 in the first state where the bicycle sprocket arrangement 14 is mounted to the bicycle hub assembly 12.

Figure 31:
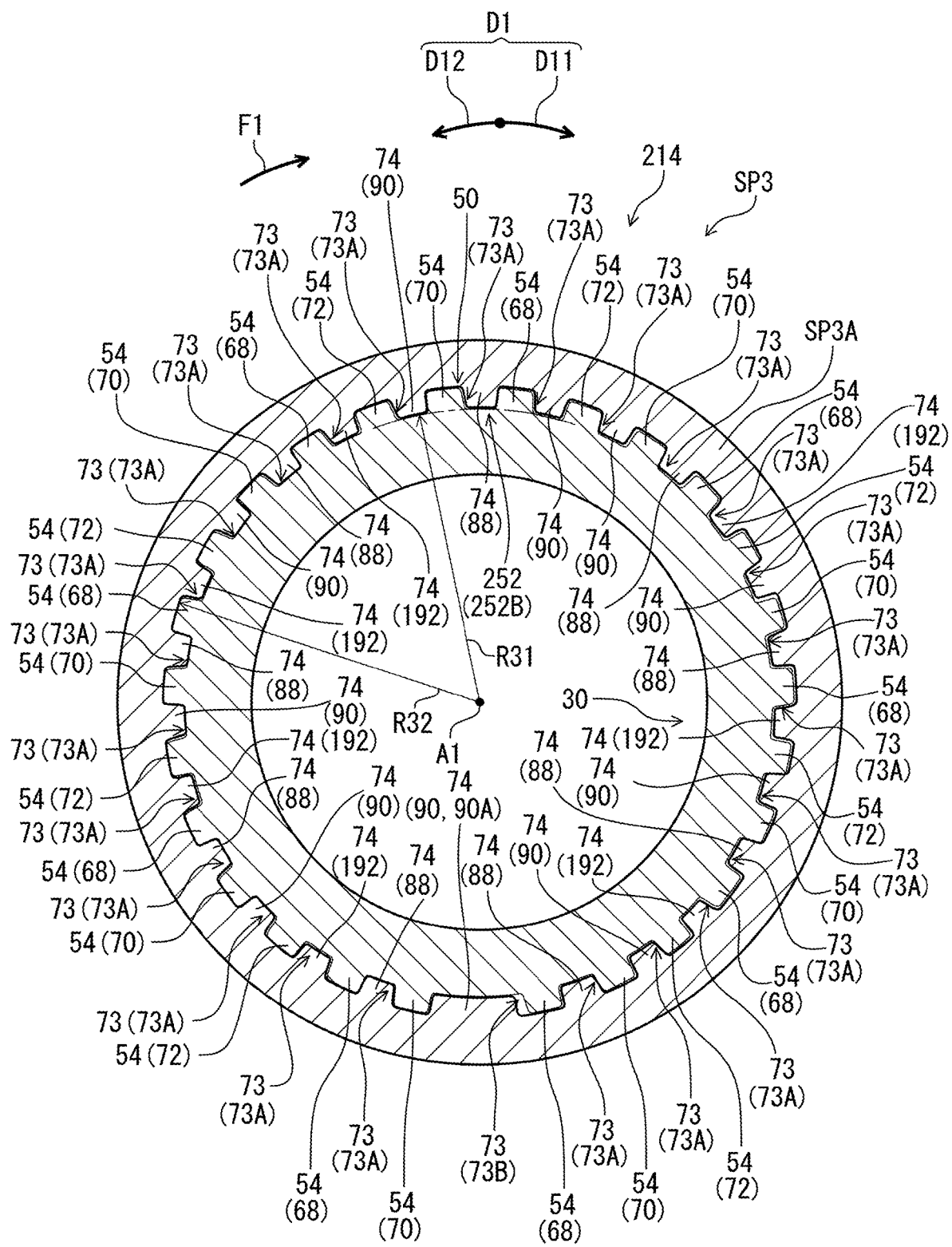
FIG. 31 is a cross-sectional view of the sprocket support body and an annular body of another sprocket of the bicycle sprocket arrangement illustrated in FIG. 28 taken along line XXXI-XXXI in FIG. 29.

As seen in FIGS. 21 and 31, the additional internal spline 152 of the additional bicycle sprocket arrangement 114 has a cross-sectional shape different from the cross-sectional shape of the internal spline 52 of the bicycle sprocket arrangement 14. Since the external spline 50 of the bicycle hub assembly 12 includes the above-mentioned structure, however, the external spline 50 is configured to be compatible with each of the internal spline 52 of the bicycle sprocket arrangement 14 and the additional internal spline 152 of the additional bicycle sprocket arrangement 114.

Second Embodiment

A bicycle sprocket arrangement 214 in accordance with a second embodiment will be described below referring to FIGS. 28 to 31. The bicycle sprocket arrangement 214 has the same structure and/or configuration as those of the bicycle sprocket arrangement 14 except for the internal spline 52. Thus, elements having substantially the same function as those in the first embodiment will be numbered the same here and will not be described and/or illustrated again in detail here for the sake of brevity.

Figure 28:
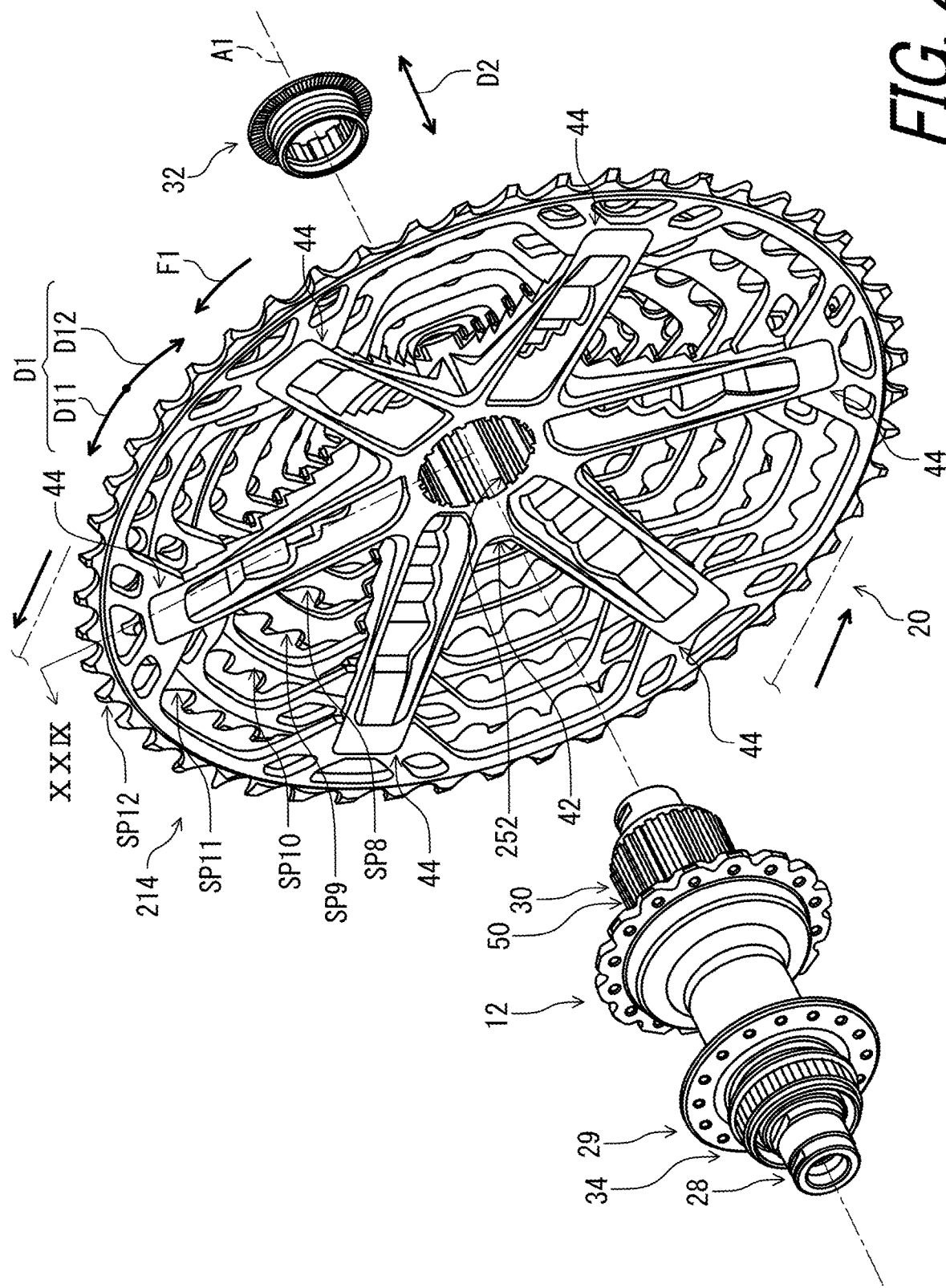
FIG. 28 is an exploded perspective view of a bicycle drive train in accordance with a second embodiment.

As seen in FIG. 28, the bicycle sprocket arrangement 14 comprises an internal spline 252. The internal spline 252 is configured to be engaged with the external spline 50 of the sprocket support body 30 of the bicycle hub assembly 12. The first internal spline 252A and the second internal spline 252B are arranged in the axial direction D2 with respect to the rotational center axis A1 of the bicycle sprocket arrangement 14. The internal spline 252 has a structure different from the structure of the internal spline 52 of the bicycle sprocket arrangement 14 of the first embodiment.

Figure 29:
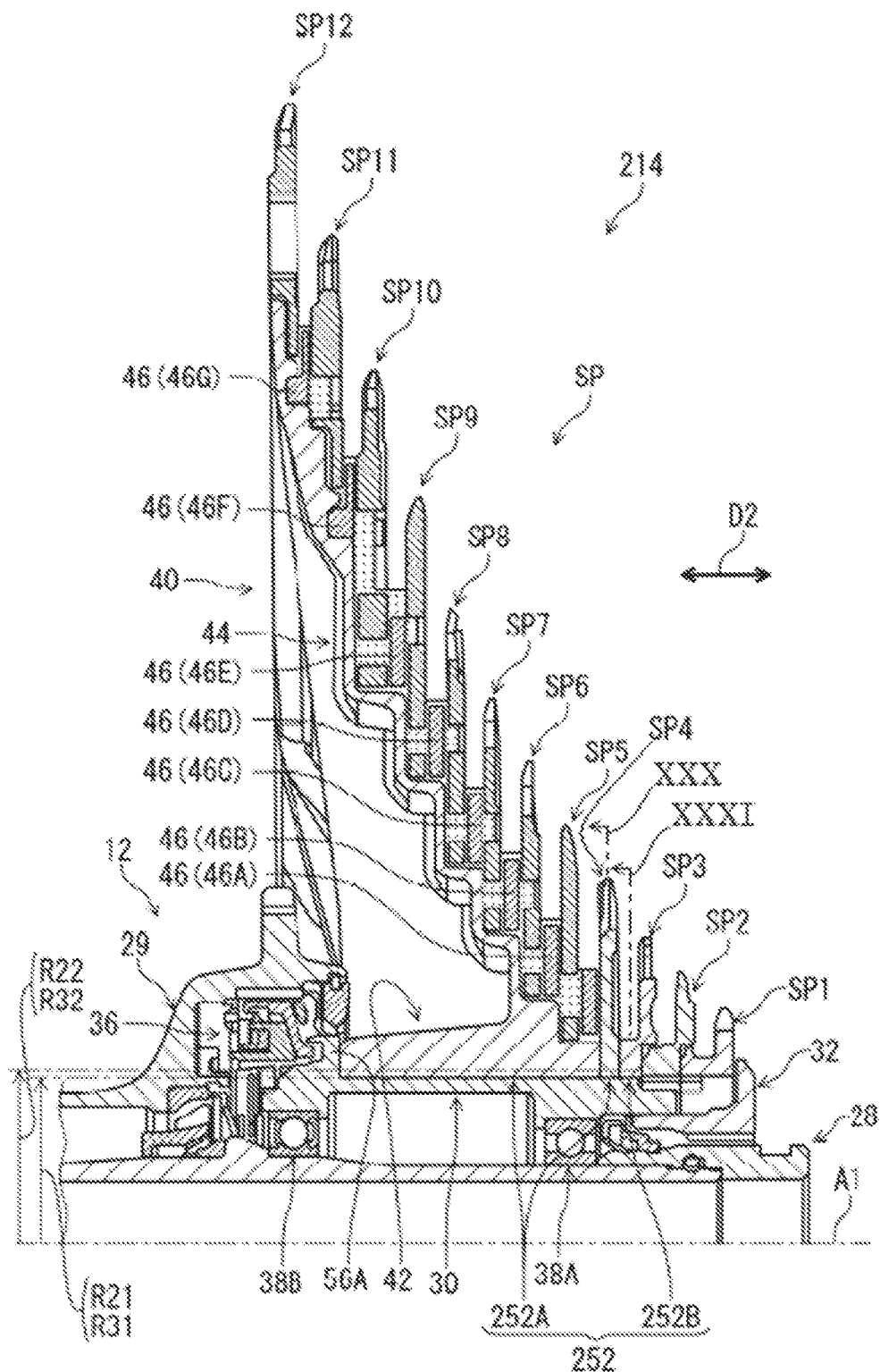
FIG. 29 is a cross-sectional view of the bicycle drive train taken along line XXIX-XXIX of FIG. 28.

As seen in FIG. 29, the internal spline 252 includes a first internal spline 252A and a second internal spline 252B. In this embodiment, the sprocket SP4 and the sprocket carrier 40 include the first internal spline 252A. The sprocket SP3 includes the second internal spline 252B. However, at least one of the sprocket SP4 and the sprocket carrier 40 can include the second internal spline 252B. The sprocket SP3 can include the first internal spline 252A.

Figure 30:
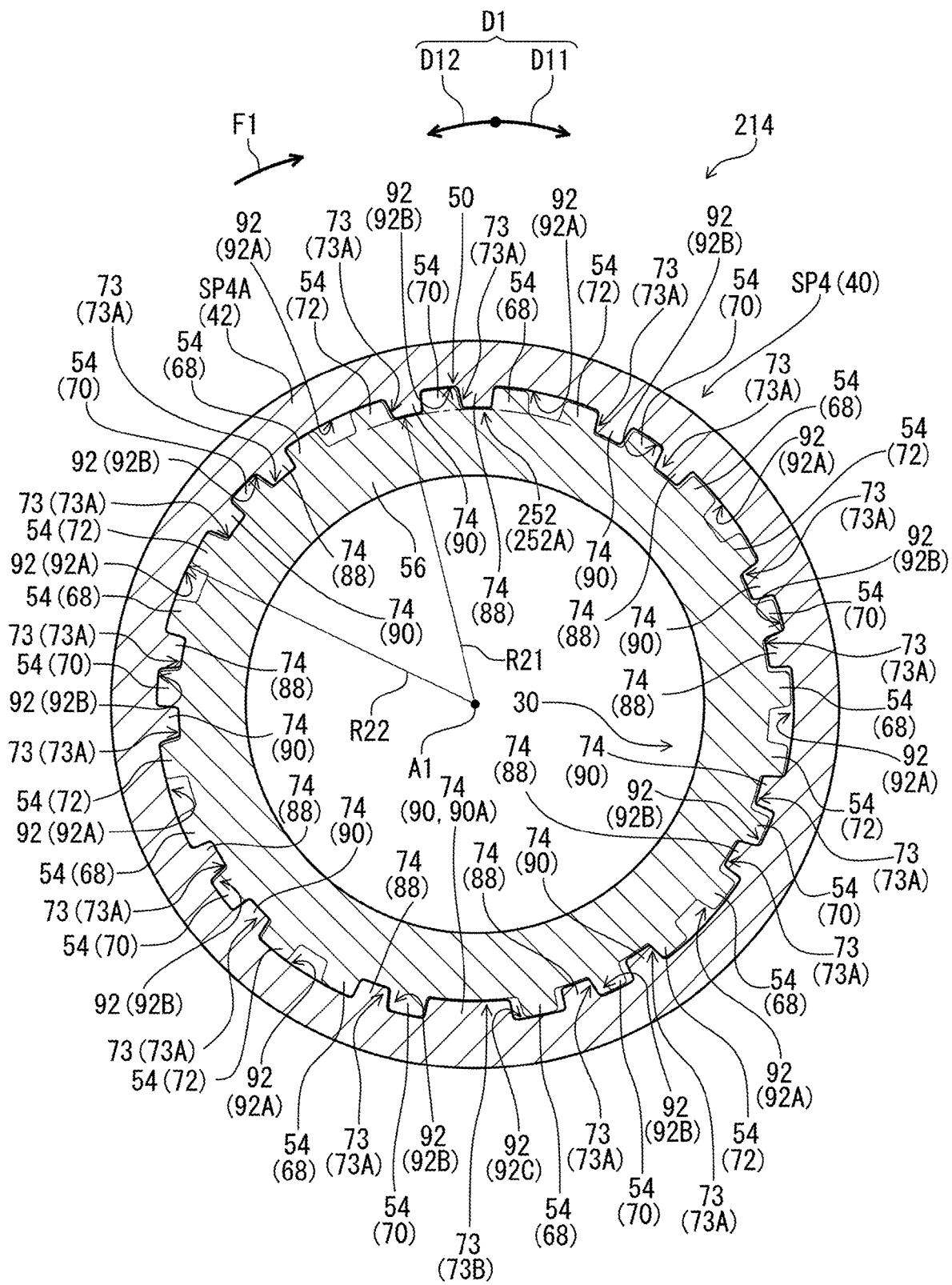
FIG. 30 is a cross-sectional view of the sprocket support body and an annular body of a sprocket or a sprocket carrier of the bicycle sprocket arrangement illustrated in FIG. 28 taken along line XXX-XXX in FIG. 29.

As seen in FIGS. 30 and 31, the second internal spline 252B is different from the first internal spline 252A. The internal spline 252 includes the at least one first internal-spline tooth 88, the at least one second internal-spline tooth 90 and the at least one third internal-spline tooth 192. The at least one first internal-spline tooth 88 is configured to be engaged with the at least one first external-spline tooth 68 of the external spline 50. The at least one second internal-spline tooth 90 is configured to be engaged with the at least one second external-spline tooth 70 of the external spline 50. The at least one third internal-spline tooth 192 is configured to be engaged with the at least one third external-spline tooth 72 of the external spline 50.

As seen in FIG. 30, the first internal spline 252A includes the at least one first internal-spline tooth 88. The first internal spline 252A includes the at least one second internal-spline tooth 90. However, the first internal spline 252A is free of the at least one third internal-spline tooth 192. Namely, the first internal spline 252A has substantially the same structure as the structure of the internal spline 52 of the bicycle sprocket arrangement 14 of the first embodiment. In this embodiment, the first internal spline 252A includes the nine first internal-spline teeth 88 and the nine second internal-spline teeth 90.

As seen in FIG. 31, the second internal spline 252B includes the at least one first internal-spline tooth 88 and the at least second internal-spline tooth 90. The second internal spline 252B includes the at least one third internal-spline tooth 192. Namely, the second internal spline 252B has substantially the same structure as the structure of the additional internal spline 152 of the additional bicycle sprocket arrangement 114 described in the first embodiment. In this embodiment, the first internal spline 252A includes the nine first internal-spline teeth 88, the nine second internal-spline teeth 90, and the eight third internal-spline teeth 192.

As seen in FIG. 30, the first internal spline 252A includes a first innermost radius R21 and a first outermost radius R22 which are defined with respect to the rotational center axis A1 of the bicycle sprocket arrangement 14. Each of the first internal-spline tooth 88 and the second internal-spline tooth 90 defines the first innermost radius R21. Each of the annular body SP4A of the sprocket SP4 and the annular body 42 of the sprocket carrier 40 defines the first outermost radius R22. The first outermost radius R22 is larger than the first innermost radius R21. The first innermost radius R21 is substantially equal to a half of an internal-spline minor diameter of the first internal spline 252A. The first outermost radius R22 is substantially equal to a half of an internal-spline major diameter of the first internal spline 252A.

As seen in FIG. 31, the second internal spline 252B includes a second innermost radius R31 and a second outermost radius R32 which are defined with respect to the rotational center axis A1. Each of the first internal-spline tooth 88, the second internal-spline tooth 90, and the third internal-spline tooth 192 defines the second innermost radius R31. The annular body SP3A of the sprocket SP3 defines the second outermost radius R32. The second outermost radius R32 is larger than the second innermost radius R31. The second innermost radius R31 is substantially equal to a half of an internal-spline minor diameter of the second internal spline 252B. The second outermost radius R32 is substantially equal to a half of an internal-spline major diameter of the second internal spline 252B.

As seen in FIG. 29, the first innermost radius R21 is substantially equal to the second innermost radius R31. The first outermost radius R22 is substantially equal to the second outermost radius R32. The first outermost radius R22 is larger than the second innermost radius R31. The second outermost radius R32 is larger than the first innermost radius R21. However, the relationship between the first outermost radius R22 and the second innermost radius R31 is not limited this embodiment. The relationship between the second outermost radius R32 and the first innermost radius R21 is not limited this embodiment.

As seen in FIG. 30, the first internal spline 252A has a first total number of internal-spline teeth. In this embodiment, the first total number of the internal-spline teeth of the first internal spline 252A is 18. As seen in FIG. 31, the second internal spline 252B has a second total number of internal-spline teeth. In this embodiment, the second total number of the internal-spline teeth of the second internal spline 252B is 26. Thus, the second total number is larger than the first total number. However, the first total number of the internal-spline teeth of the first internal spline 252A is not limited to this embodiment. The second total number of the internal-spline teeth of the second internal spline 252B is not limited to this embodiment.

Third Embodiment

A bicycle hub assembly 312 in accordance with a third embodiment will be described below referring to FIGS. 32 to 36. The bicycle hub assembly 312 has the same structure and/or configuration as those of the bicycle hub assembly 12 except for the sprocket support body 30. Thus, elements having substantially the same function as those in the first embodiment will be numbered the same here and will not be described and/or illustrated again in detail here for the sake of brevity.

Figure 32:
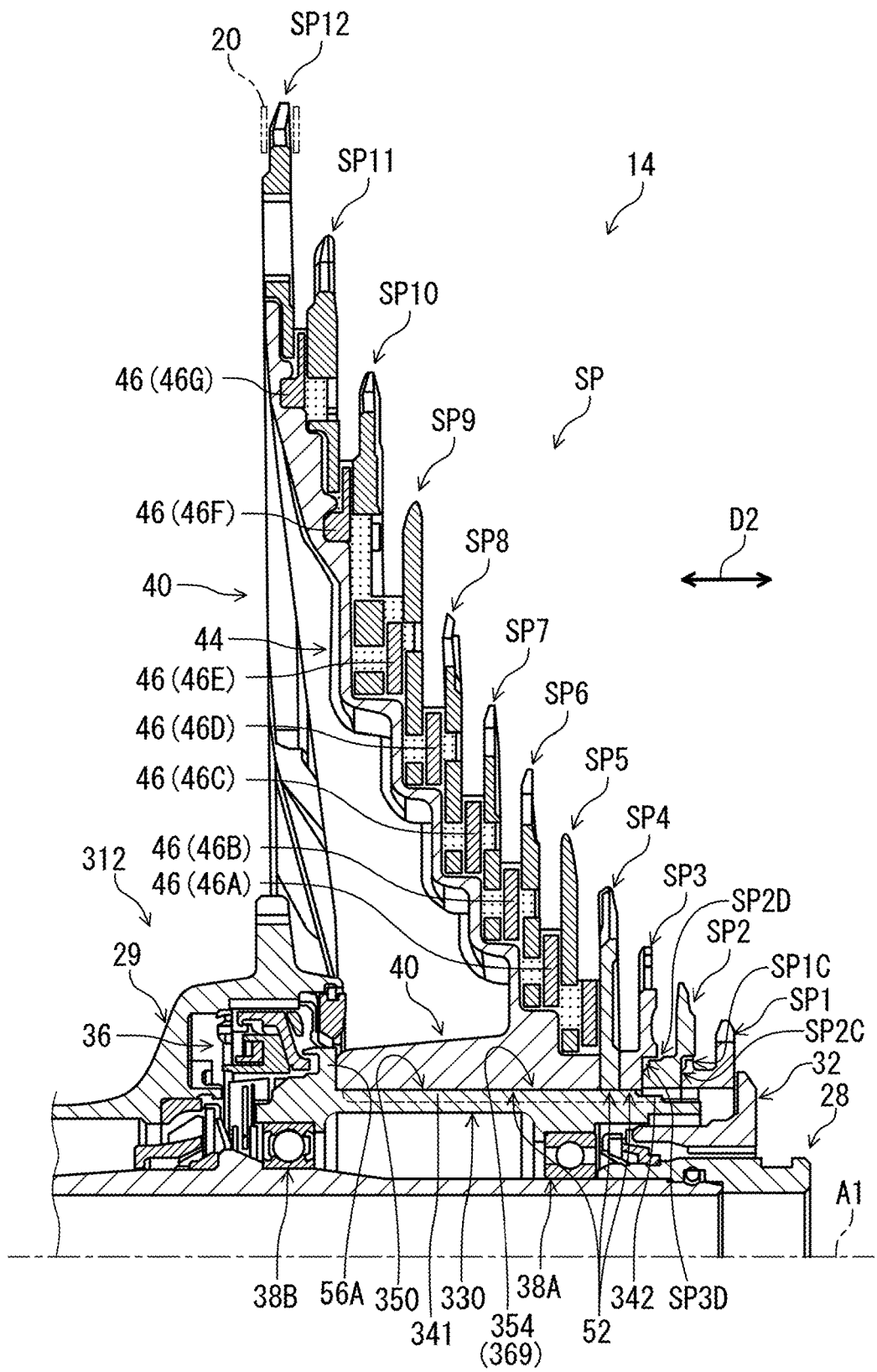
FIG. 32 is a cross-sectional view of a bicycle drive train including a bicycle hub assembly in accordance with a third embodiment.

As seen in FIG. 32, a sprocket support body 330 for the bicycle hub assembly 312 comprises an external spline 350. The sprocket support body 330 has substantially the same structure as that of the sprocket support body 30 of the first embodiment. The external spline 350 has substantially the same structure as that of the external spline 50 of the first embodiment.

Figure 33:
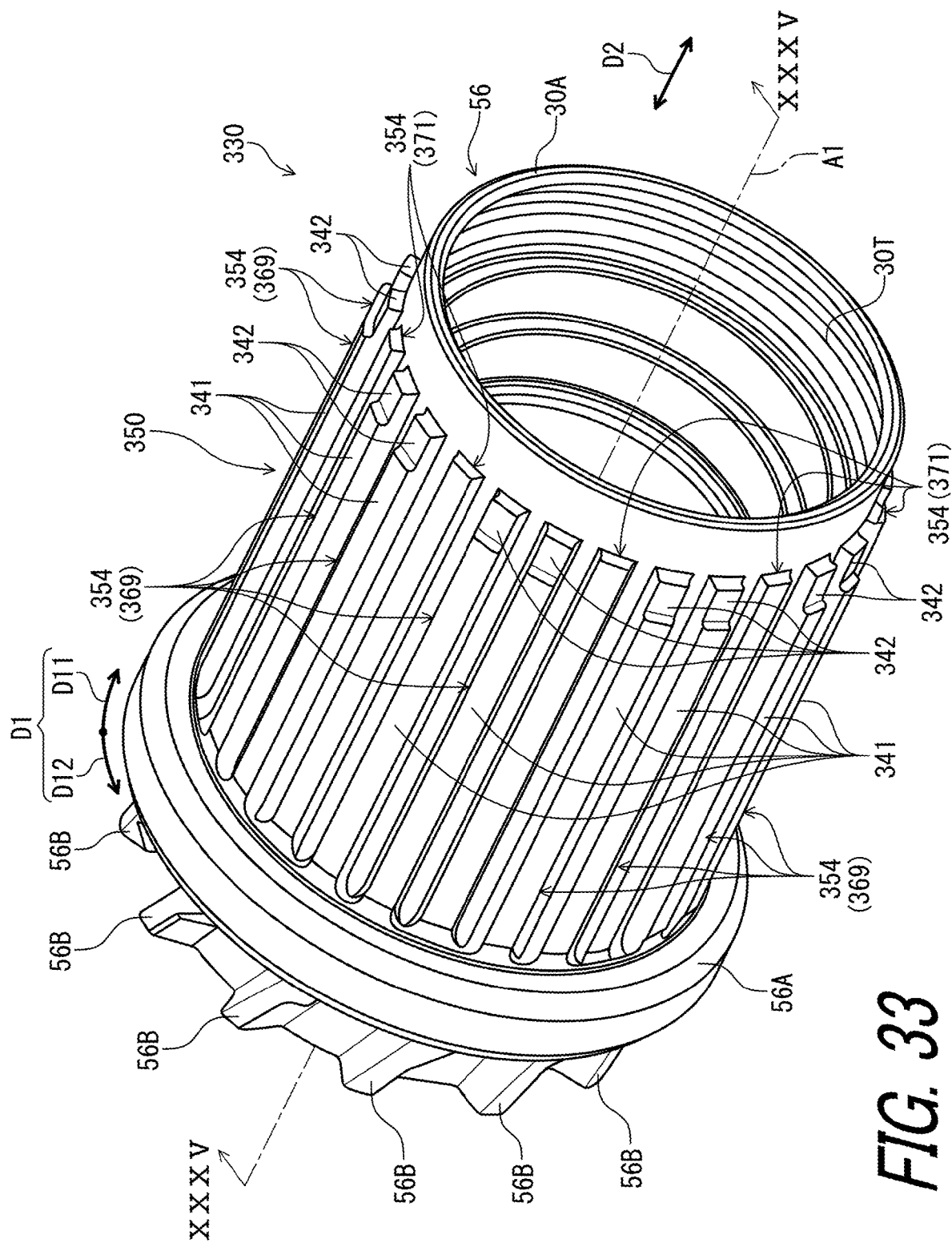
FIG. 33 is a perspective view of a sprocket support body of the bicycle hub assembly illustrated in FIG. 32.

As seen in FIG. 33, the external spline 350 includes a plurality of external-spline teeth 354. The plurality of external-spline teeth 354 includes at least one first spline tooth 369 and at least one second spline tooth 371 that is different from the at least one first spline tooth 369. In this embodiment, the at least one first spline tooth 369 includes a plurality of first spline teeth 369. The at least one second spline tooth 371 includes a plurality of second spline teeth 371.

Figure 34:
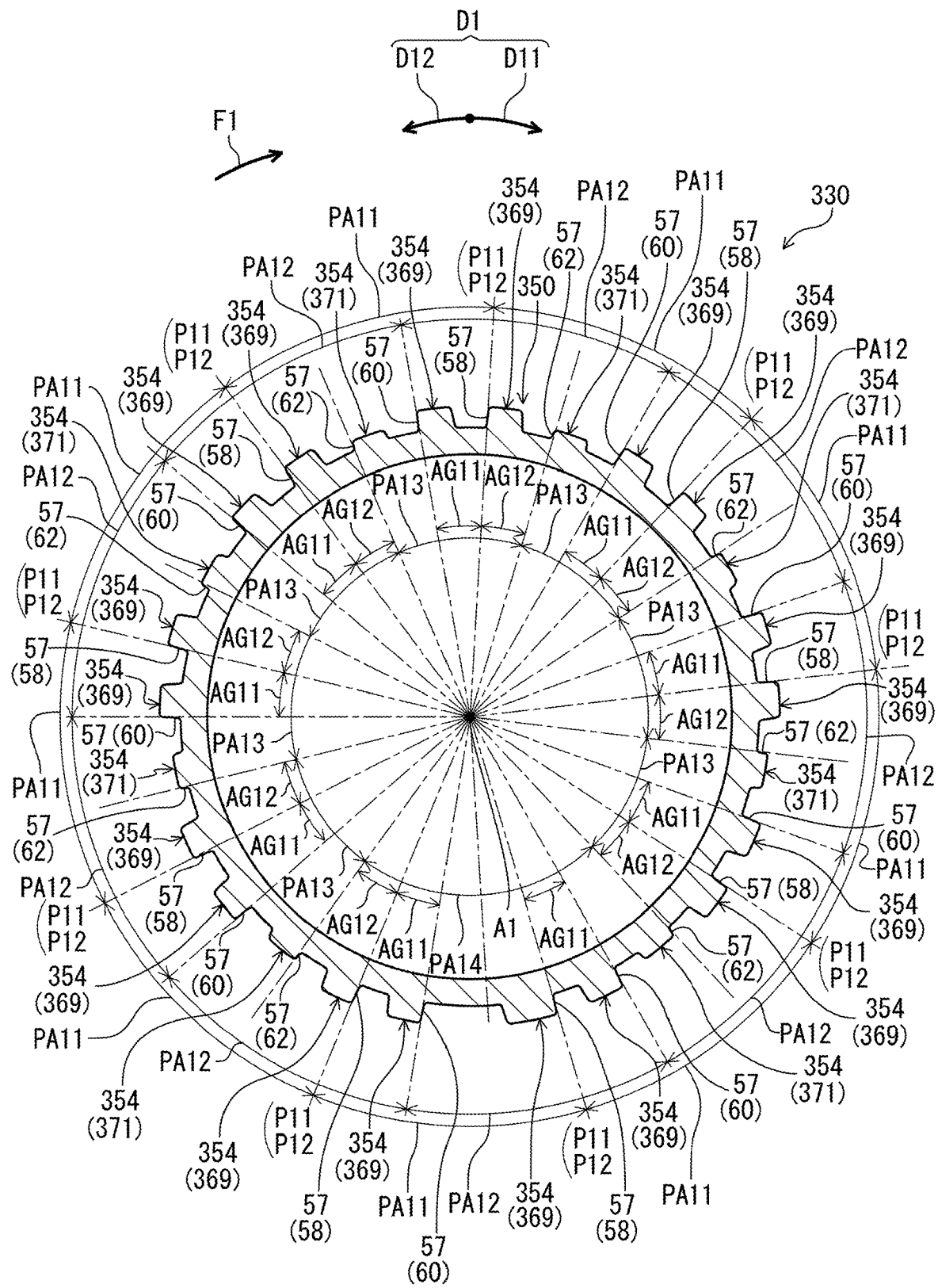
FIG. 34 is a cross-sectional view of the sprocket support of the bicycle hub assembly taken along line XXXIV-XXXIV of FIG. 35.

As seen in FIG. 34, a total number of the at least one first spline tooth 369 is larger than a total number of the at least one second spline tooth 371. The total number of the at least one first spline tooth 369 is equal to or larger than twice of the total number of the at least one second spline tooth 371. The total number of the at least one first spline tooth 369 is 18. The total number of the at least one second spline tooth 371 is eight. However, the total number of the at least one first spline tooth 369 is not limited to this embodiment. The total number of the at least one second spline tooth 371 is not limited to this embodiment.

As seen in FIG. 33, at least one of the plurality of external-spline teeth 354 includes a first spline portion 341 and a second spline portion 342. The second spline portion 342 is aligned with the first spline portion 341 in the axial direction D2 with respect to the rotational center axis A1. In this embodiment, each of the plurality of first spline teeth 369 includes the first spline portion 341 and the second spline portion 342. Each of the plurality of second spline teeth 371 does not include the first spline portion 341 and the second spline portion 342. The second spline portion 342 is provided between the first axial end 30A and the first spline portion 341 in the axial direction D2. However, the arrangement of the first spline portions 341 and the second spline portions 342 is not limited to this embodiment. The positional relationship between the first spline portion 341 and the second spline portion 342 is not limited to this embodiment.

Figure 35:
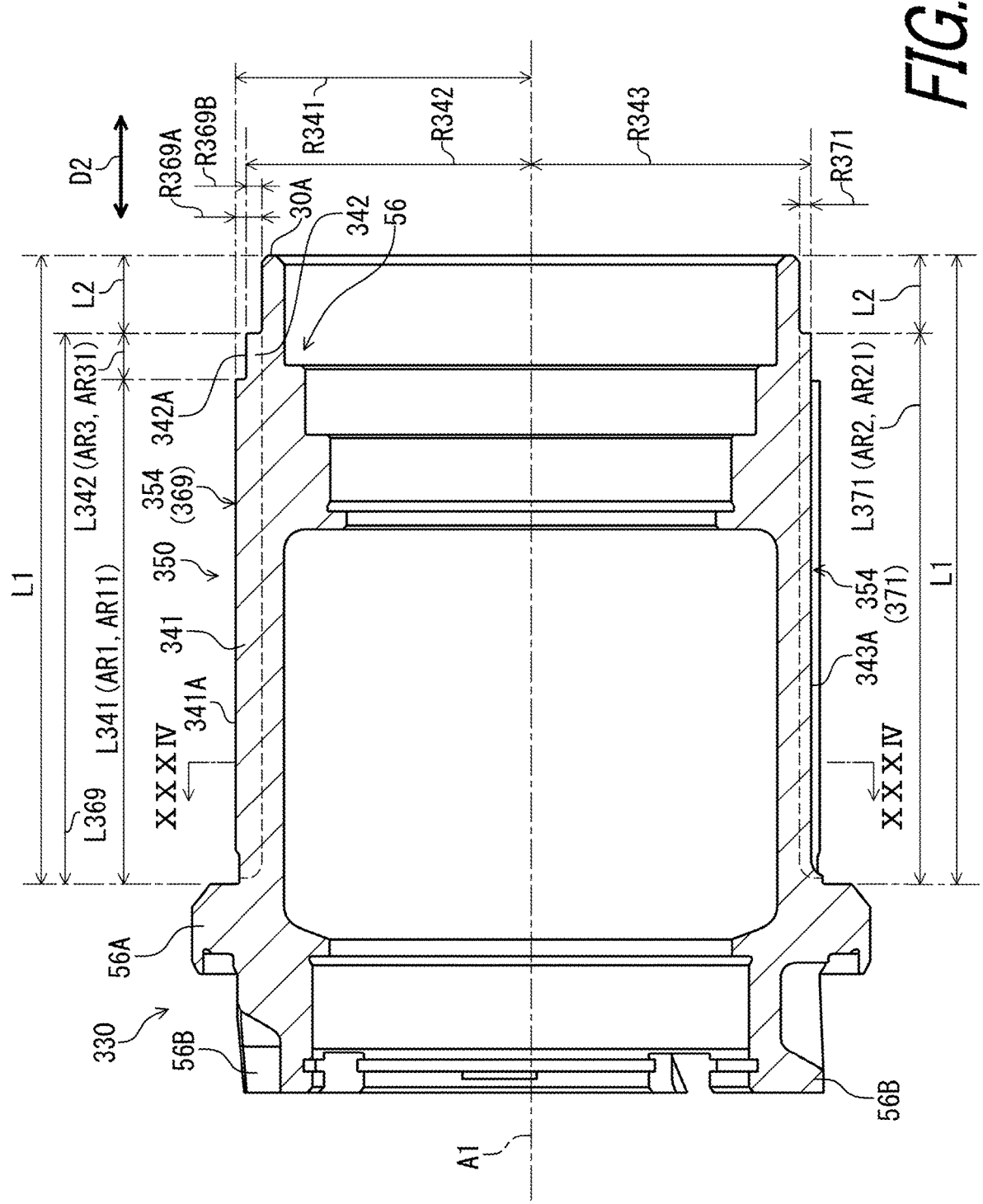
FIG. 35 is a cross-sectional view of the sprocket support of the bicycle hub assembly taken along line XXXV-XXXV of FIG. 34.

As seen in FIG. 35, the first spline portion 341 includes a first radially outer surface 341A. A first radial distance R341 is defined from the rotational center axis A1 to the first radially outer surface 341A. The second spline portion 342 includes a second radially outer surface 342A. A second radial distance R342 is defined from the rotational center axis A1 to the second radially outer surface 342A. The first radial distance R341 is different from the second radial distance R342. In this embodiment, the first radial distance R341 is larger than the second radial distance R342. However, the first radial distance R341 can be smaller than the second radial distance R342.

The second spline tooth 371 includes a third radially outer surface 343A. A third radial distance R343 is defined from the rotational center axis A1 to the third radially outer surface 343A. In this embodiment, the first radial distance R341 is larger than the third radial distance R343. The second radial distance R342 is larger than the third radial distance R343. However, the relationship among the first radial distance R341, the second radial distance R342, and the third radial distance R343 are not limited to this embodiment.

The first spline tooth 369 has a first axial tooth-length L369 defined from the axial support 56A in the axial direction D2. The second spline tooth 371 has a second axial tooth-length L371 defined from the axial support 56A in the axial direction D2. The first spline portion 341 has a first axial length L341 defined from the axial support 56A in the axial direction D2. The second spline portion 342 has a second axial length L342 defined from the first spline portion 341 in the axial direction D2. In this embodiment, the first axial tooth-length L369 is equal to the second axial tooth-length L371. The first axial length L341 is longer than the second axial length L342. However, the first axial length L341 can be equal to or shorter than the second axial length L342. The first axial tooth-length L369 can be different from the second axial tooth-length L371.

The tubular body 56 has an axial length L1 defined from the axial support 56A to the first axial end 30A in the axial direction D2. The tubular body 56 has an additional axial length L2 defined from the second spline portion 342 to the first axial end 30A in the axial direction D2. The tubular body 56 has an additional axial length L2 defined from the second spline tooth 371 to the first axial end 30A in the axial direction D2. The axial length L1 is longer than the additional axial length L2. The first axial length L341 is shorter than the axial length L1. The first axial length L341 is longer than the additional axial length L2. The second axial length L342 is shorter than the axial length L1. The second axial length L342 is shorter than the additional axial length L2. In this embodiment, the axial length L1 is 37.65 mm. The additional axial length L2 is 4.65 mm. However, the axial length L1 and the additional axial length L2 are not limited to this embodiment.

As seen in FIG. 34, the external spline 350 includes the plurality of external-spline driving surfaces 57. The plurality of external-spline driving surfaces 57 includes at least four first external-spline driving surfaces 58 and at least one second external-spline driving surface 60. The plurality of external-spline driving surfaces 57 includes at least one third external-spline driving surface 62. In this embodiment, each of the plurality of first spline teeth 369 includes one of the first external-spline driving surfaces 58 and the second external-spline driving surface 60. Each of the plurality of second spline teeth 371 includes the third external-spline driving surface 62.

As seen in FIG. 32, the first spline portion 341 is configured to directly or indirectly engage with the first sprocket SP12. The second spline portion 342 is configured to directly or indirectly engage with the second sprocket SP2 that is smaller than the first sprocket SP12. In this embodiment, the first spline portion 341 is configured to indirectly engage with the first sprocket SP12 through the sprocket carrier 40. The second spline portion 342 is configured to directly engage with the second sprocket SP2. However, the first spline portion 341 can be configured to directly engage with the first sprocket SP12. The second spline portion 342 can be configured to indirectly engage with the second sprocket SP2.

The bicycle hub assembly 312 includes the hub body 29. The first spline portion 341 is positioned closer to the hub body 29 than the second spline portion 342 in an assembled state where the sprocket support body 330 and the hub body 29 are assembled. The first spline portion 341 is positioned between the hub body 29 and the second spline portion 342 in the assembled state. However, the positional relationship among the hub body 29, the first spline portion 341, and the second spline portion 342 is not limited to this embodiment.

Figure 36:
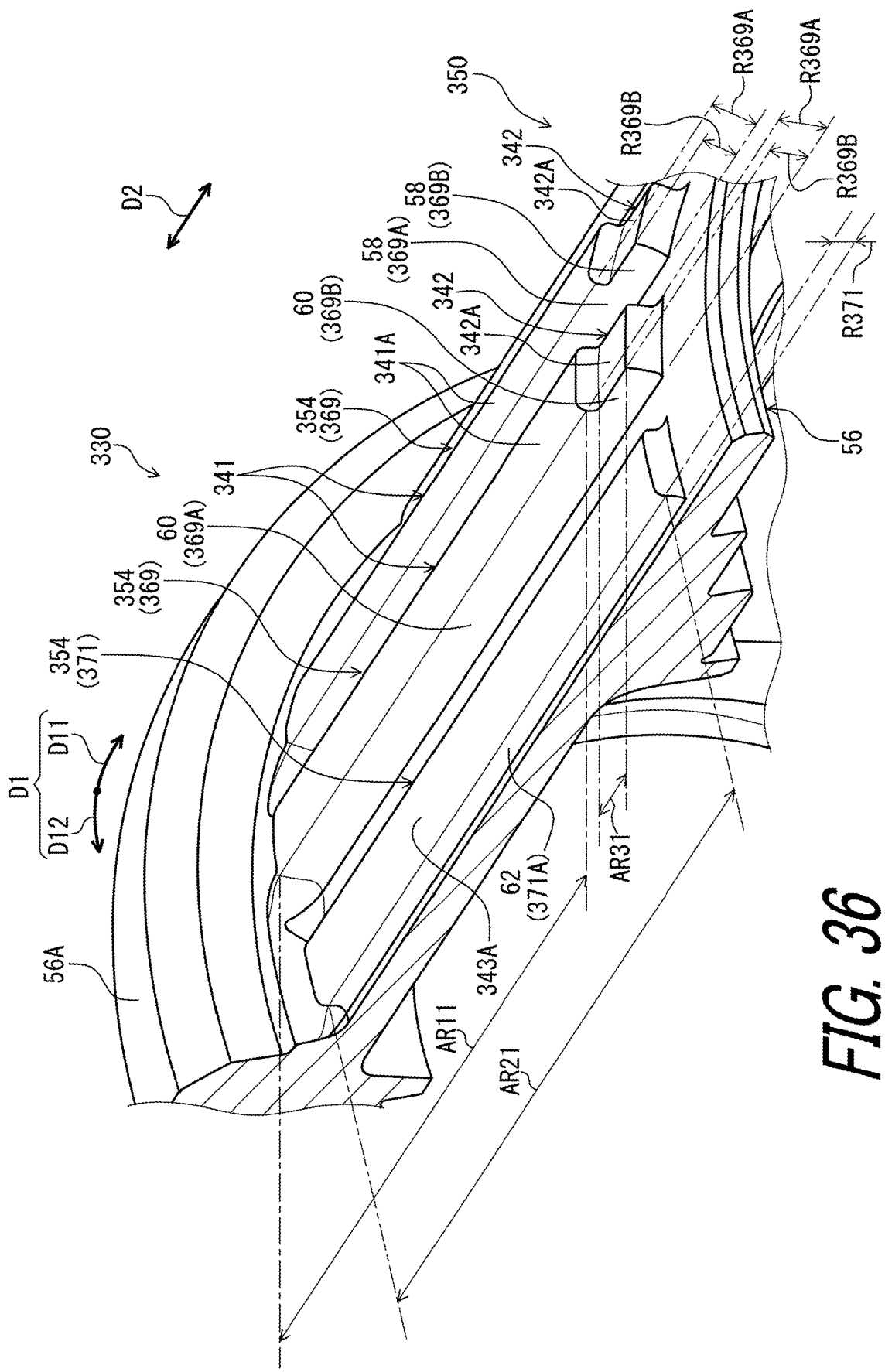
FIG. 36 is a perspective cross-sectional view of the sprocket support body of the bicycle hub assembly illustrated in FIG. 32.

As seen in FIG. 36, the at least one first spline tooth 369 includes a first driving surface 369A having a first radial tooth-length R369A defined radially outwardly from the tubular body 56 with respect to the rotational center axis A1. The at least one first spline tooth 369 includes a first additional driving surface 369B having a first additional radial tooth-length R369B defined radially outwardly from the tubular body 56 with respect to the rotational center axis A1. In this embodiment, the first radial tooth-length R369A is radially defined from the tubular body 56 to the first radially outer surface 341A. The first additional radial tooth-length R369B is radially defined from the tubular body 56 to the second radially outer surface 342A. The first driving surface 369A is provided on the first spline portion 341 of the first spline tooth 369. The first additional driving surface 369B is provided on the second spline portion 342 of the first spline tooth 369. The at least one second spline tooth 371 includes a second driving surface 371A having a second radial tooth-length R371 defined radially outwardly from the tubular body 56 with respect to the rotational center axis A1. In this embodiment, the second radial tooth-length R371 is radially defined from the tubular body 56 to the third radially outer surface 343A.

In this embodiment, the first radial tooth-length R369A is different from the second radial tooth-length R371 at the same axial position defined with respect to the rotational center axis A1. The first additional radial tooth-length R369B is different from the second radial tooth-length R371 at the same axial position defined with respect to the rotational center axis A1. The first radial tooth-length R369A is different from the first additional radial tooth-length R369B. The first radial tooth-length R369A is larger than the second radial tooth-length R371 at the same axial position defined with respect to the rotational center axis A1. The first additional radial tooth-length R369B is larger than the second radial tooth-length R371 at the same axial position defined with respect to the rotational center axis A1. The first radial tooth-length R369A is larger than the first additional radial tooth-length R369B. However, at least one of the first radial tooth-length R369A and the first additional radial tooth-length R369B can be equal to or smaller than the second radial tooth-length R371 at the same axial position defined with respect to the rotational center axis A1.

The first external-spline driving surface 58 of the first spline tooth 369 includes the first driving surface 369A and the first additional driving surface 369B. The second external-spline driving surface 60 of the first spline tooth 369 includes the first driving surface 369A and the first additional driving surface 369B. The third external-spline driving surface 62 of the second spline tooth 371 includes the second driving surface 371A.

As seen in FIG. 35, when viewed in a direction perpendicular to the rotational center axis A1, an axial region AR1 of the first spline portion 341 at least partly overlaps with an axial region AR2 of the second spline tooth 371 with respect to the axial direction D2. When viewed in the direction perpendicular to the rotational center axis A1, an axial region AR3 of the second spline portion 342 at least partly overlaps with an axial region AR2 of the second spline tooth 371 with respect to the axial direction D2. The axial region AR1 of the first spline portion 341 is defined in the axial direction D2. The axial region AR2 of the second spline portion 371 is defined in the axial direction D2. The axial region AR3 of the second spline portion 342 is defined in the axial direction D2. In this embodiment, the axial region AR1 of the first spline portion 341 overlaps with the axial region AR2 of the second spline tooth 371 with respect to the axial direction D2. The axial region AR3 of the second spline portion 342 overlaps with the axial region AR2 of the second spline tooth 371 with respect to the axial direction D2. Thus, as seen in FIG. 36, a first axial region AR11 of the first driving surface 369A at least partly overlaps with a second axial region AR21 of the second driving surface 371A with respect to the axial direction D2. The first axial region AR11 of the first driving surface 369A partly overlaps with the second axial region AR21 of the second driving surface 371A. A third axial region AR31 of the first additional driving surface 369B at least partly overlaps with a second axial region AR21 of the second driving surface 371A with respect to the axial direction D2. The third axial region AR31 of the first additional driving surface 369B partly overlaps with the second axial region AR21 of the second driving surface 371A. The first axial region AR11 of the first driving surface 369A is defined in the axial direction D2. The second axial region AR21 of the second driving surface 371A is defined in the axial direction D2. The third axial region AR31 of the first additional driving surface 369B is defined in the axial direction D2. However, the first axial region AR11 of the first driving surface 369A can entirely overlap with the second axial region AR21 of the second driving surface 371A.

In this embodiment, the first axial region AR11 is coincident with the axial region AR1. The second axial region AR21 is coincident with the axial region AR2. The third axial region AR31 is coincident with the axial region AR3. However, the first axial region AR11 can be offset from the axial region AR1. The second axial region AR21 can be offset from the axial region AR2. The third axial region AR31 can be offset from the axial region AR3.

The term "comprising" and its derivatives, as used herein, are intended to be open ended terms that specify the presence of the stated features, elements, components, groups, integers, and/or steps, but do not exclude the presence of other unstated features, elements, components, groups, integers and/or steps. This concept also applies to words of similar meaning, for example, the terms "have," "include" and their derivatives.

The terms "member," "section," "portion," "part," "element," "body" and "structure" when used in the singular can have the dual meaning of a single part or a plurality of parts.

The ordinal numbers such as "first" and "second" recited in the present application are merely identifiers, but do not have any other meanings, for example, a particular order and the like. Moreover, for example, the term "first element" itself does not imply an existence of "second element," and the term "second element" itself does not imply an existence of "first element."

The term "pair of," as used herein, can encompass the configuration in which the pair of elements have different shapes or structures from each other in addition to the configuration in which the pair of elements have the same shapes or structures as each other.

The terms "a" (or "an"), "one or more" and "at least one" can be used interchangeably herein.

The phrase "at least one of" as used in this disclosure means "one or more" of a desired choice. For one example, the phrase "at least one of" as used in this disclosure means "only one single choice" or "both of two choices" if the number of its choices is two. For other example, the phrase "at least one of" as used in this disclosure means "only one single choice" or "any combination of equal to or more than two choices" if the number of its choices is equal to or more than three. For instance, the phrase "at least one of A and B" encompasses (1) A alone, (2), B alone, and (3) both A and B. The phrase "at least one of A, B, and C" encompasses (1) A alone, (2), B alone, (3) C alone, (4) both A and B, (5) both B and C, (6) both A and C, and (7) all A, B, and C. In other words, the phrase "at least one of A and B" does not mean "at least one of A and at least one of B" in this disclosure.

Finally, terms of degree such as "substantially," "about" and "approximately" as used herein mean a reasonable amount of deviation of the modified term such that the end result is not significantly changed. All of numerical values described in the present application can be construed as including the terms such as "substantially," "about" and "approximately."

Obviously, numerous modifications and variations of the present invention are possible in light of the above teachings. It is therefore to be understood that within the scope of the appended claims, the invention may be practiced otherwise than as specifically described herein.

What is claimed is:

1. A bicycle sprocket arrangement comprising:
an internal spline configured to be engaged with an external spline of a sprocket support body of a bicycle hub assembly, the internal spline including a plurality of internal-spline driving surfaces configured to transmit a rotational driving force between the bicycle sprocket arrangement and the bicycle hub assembly in a circumferential direction with respect to a rotational center axis of the bicycle sprocket arrangement,
the plurality of internal-spline driving surfaces including
at least four first internal-spline driving surfaces respectively arranged on at least four of nine first internal-spline driving positions equally arranged in the circumferential direction about the rotational center axis at a first internal-spline pitch angle which is equal to 40 degrees, and
at least one second internal-spline driving surface offset from the nine first internal-spline driving positions in the circumferential direction about the rotational center axis.

2. The bicycle sprocket arrangement according to claim 1, wherein
the at least four first internal-spline driving surfaces include nine first internal-spline driving surfaces, and
the nine first internal-spline driving surfaces are equally arranged in the circumferential direction about the rotational center axis at the first internal-spline pitch angle.

3. The bicycle sprocket arrangement according to claim 1, wherein
the at least one second internal-spline driving surface includes at least three second internal-spline driving surfaces offset from the nine first internal-spline driving positions in the circumferential direction about the rotational center axis.

4. The bicycle sprocket arrangement according to claim 3, wherein
the at least three second internal-spline driving surfaces are equally arranged in the circumferential direction about the rotational center axis at a second internal-spline pitch angle.

5. The bicycle sprocket arrangement according to claim 4, wherein
the at least three second internal-spline driving surfaces include nine second internal-spline driving surfaces equally arranged in the circumferential direction about the rotational center axis at the second internal-spline pitch angle.

6. The bicycle sprocket arrangement according to claim 4, wherein
the second internal-spline pitch angle is equal to 40 degrees.

7. The bicycle sprocket arrangement according to claim 4, wherein
the at least three second internal-spline driving surfaces are offset from the nine first internal-spline driving surfaces in the circumferential direction about the rotational center axis at a first internal-spline offset angle smaller than the second internal-spline pitch angle.

8. The bicycle sprocket arrangement according to claim 7, wherein
the first internal-spline offset angle is equal to or smaller than a half of the second internal-spline pitch angle.

9. The bicycle sprocket arrangement according to claim 1, wherein
the internal spline includes a plurality of internal-spline teeth.

10. The bicycle sprocket arrangement according to claim 9, wherein
the plurality of internal-spline teeth includes
at least four first internal-spline teeth respectively arranged on at least four of nine first internal-spline tooth positions equally arranged in the circumferential direction about the rotational center axis at the first internal-spline pitch angle, and
at least one second internal-spline tooth offset from the nine first internal-spline tooth positions in the circumferential direction about the rotational center axis,
the at least four first internal-spline teeth respectively include the at least four first internal-spline driving surfaces, and
the at least one second internal-spline tooth respectively includes the at least one second internal-spline driving surface.

11. The bicycle sprocket arrangement according to claim 10, wherein
the at least four first internal-spline teeth include nine first internal-spline teeth,
the at least four first internal-spline driving surfaces include nine first internal-spline driving surfaces,
the nine first internal-spline driving surfaces are equally arranged in the circumferential direction about the rotational center axis at the first internal-spline pitch angle, and
the nine first internal-spline teeth respectively include the nine first internal-spline driving surfaces.

12. The bicycle sprocket arrangement according to claim 10, wherein
the at least one second internal-spline driving surface includes at least three second internal-spline driving surfaces offset from the nine first internal-spline driving surfaces in the circumferential direction about the rotational center axis, and
the at least one second internal-spline tooth includes at least three second internal-spline teeth respectively including the at least three second internal-spline driving surfaces.

13. The bicycle sprocket arrangement according to claim 12, wherein
at least one spline tooth of the at least three second internal-spline teeth has a first internal-spline circumferential width defined in the circumferential direction, and
another spline tooth of the at least three second internal-spline teeth has a second internal-spline circumferential width defined in the circumferential direction, the second internal-spline circumferential width being different from the first internal-spline circumferential width.

14. The bicycle sprocket arrangement according to claim 11, wherein
the nine first internal-spline teeth have the same cross-sectional shape as each other on a plane perpendicular to the rotational center axis.

15. The bicycle sprocket arrangement according to claim 9, further comprising
an annular body having the rotational center axis, wherein
the plurality of internal-spline teeth extends radially inwardly from the annular body with respect to the rotational center axis.

16. The bicycle sprocket arrangement according to claim 1, wherein
the plurality of internal-spline driving surfaces faces in a driving rotational direction in which the bicycle sprocket arrangement rotates in response to the rotational driving force.

17. The bicycle sprocket arrangement according to claim 9, wherein
the plurality of internal-spline teeth defines a plurality of internal-spline recesses,
each of the plurality of internal-spline recesses is provided between adjacent two teeth of the plurality of internal-spline teeth in the circumferential direction,
the plurality of internal-spline recesses includes
a first internal-spline recess having a first internal-spline recess width defined in the circumferential direction, and
a second internal-spline recess having a second internal-spline recess width defined in the circumferential direction, and
the second internal-spline recess width is different from the first internal-spline recess width.

18. The bicycle sprocket arrangement according to claim 17, wherein
the at least one second internal-spline tooth is arranged between adjacent two first internal-spline teeth adjacently arranged in the circumferential direction at the first internal-spline pitch angle which is equal to 40 degrees,
the at least one second internal-spline tooth and one of the adjacent two first internal-spline teeth defines the first internal-spline recess,
the first internal-spline recess width defines a first clearance angle in the circumferential direction about the rotational center axis, and
the first clearance angle is larger than 15 degrees.

19. The bicycle sprocket arrangement according to claim 10, wherein
the at least four first internal-spline teeth include a first innermost radius defined with respect to the rotational center axis, and
the first innermost radius is larger than 32 mm.

20. The bicycle sprocket arrangement according to claim 10, wherein
the at least one second internal-spline tooth includes a second innermost radius defined with respect to the rotational center axis, and
the second innermost radius is larger than 32 mm.

21. A bicycle sprocket arrangement comprising:
an internal spline configured to be engaged with an external spline of a sprocket support body of a bicycle hub assembly in a first state where the bicycle sprocket arrangement is mounted to the bicycle hub assembly, the internal spline being configured to be engaged with an additional external spline of an additional sprocket support body of an additional bicycle hub assembly in a second state where the bicycle sprocket arrangement is mounted to the additional bicycle hub assembly,
the external spline of the bicycle hub assembly and the additional external spline of the additional bicycle hub assembly being different from each other.

22. The bicycle sprocket arrangement according to claim 21, wherein
the internal spline includes a plurality of internal-spline teeth,
the plurality of internal-spline teeth includes at least one first internal-spline tooth and at least one second internal-spline tooth,
the at least one first internal-spline tooth is configured to be engaged with at least one first external-spline tooth of the external spline in the first state where the bicycle sprocket arrangement is mounted to the bicycle hub assembly,
the at least one first internal-spline tooth is configured to be engaged with at least one external-spline tooth of the additional external spline in the second state where the bicycle sprocket arrangement is mounted to the additional bicycle hub assembly, and
the at least one second internal-spline tooth is configured not to be engaged with the at least one external-spline tooth of the additional external spline in the second state where the bicycle sprocket arrangement is mounted to the additional bicycle hub assembly.

23. A bicycle sprocket arrangement comprising:
an internal spline configured to be engaged with an external spline of a sprocket support body of a bicycle hub assembly, the internal spline including a first internal spline and a second internal spline different from the first internal spline,
the first internal spline including a first innermost radius and a first outermost radius which are defined with respect to a rotational center axis of the bicycle sprocket arrangement,
the second internal spline including a second innermost radius and a second outermost radius which are defined with respect to the rotational center axis,
the first outermost radius being larger than the second innermost radius, and
the second outermost radius being larger than the first innermost radius.

24. The bicycle sprocket arrangement according to claim 23, wherein
the internal spline includes at least one first internal-spline tooth, at least one second internal-spline tooth and at least one third internal-spline tooth,
the at least one first internal-spline tooth is configured to be engaged with at least one first external-spline tooth of the external spline,
the at least one second internal-spline tooth is configured to be engaged with at least one second external-spline tooth of the external spline, and
the at least one third internal-spline tooth is configured to be engaged with at least one third external-spline tooth of the external spline.

25. The bicycle sprocket arrangement according to claim 23, wherein
the first internal spline includes the at least one first internal-spline tooth,
the second internal spline includes the at least one third internal-spline tooth, and
the first internal spline is free of the at least one third internal-spline tooth.

26. The bicycle sprocket arrangement according to claim 23, wherein
the first internal spline and the second internal spline are arranged in an axial direction with respect to a rotational center axis of the bicycle sprocket arrangement.

27. The bicycle sprocket arrangement according to claim 23, wherein
the first internal spline has a first total number of internal-spline teeth, the second internal spline has a second total number of internal-spline teeth, and the second total number is larger than the first total number.

\* \* \* \* \*